(12) United States Patent
Harris

(10) Patent No.: US 6,604,094 B1
(45) Date of Patent: Aug. 5, 2003

(54) SIMULATING HUMAN INTELLIGENCE IN COMPUTERS USING NATURAL LANGUAGE DIALOG

(75) Inventor: Henry M. Harris, Pasadena, CA (US)

(73) Assignee: Symbionautics Corporation, Washington, DC (US)

( * ) Notice: Subject to any disclaimer, the term of this patent is extended or adjusted under 35 U.S.C. 154(b) by 462 days.

(21) Appl. No.: 09/634,896

(22) Filed: Aug. 9, 2000

Related U.S. Application Data

(63) Continuation-in-part of application No. 09/579,325, filed on May 25, 2000.

(51) Int. Cl.[7] ............ G06F 15/18; G06F 17/00
(52) U.S. Cl. .................... 706/48; 706/12
(58) Field of Search ................ 706/48, 12

(56) References Cited

U.S. PATENT DOCUMENTS 5,619,718 A * 4/1997 Correa .................. 704/9
6,233,545 B1 * 5/2001 Datig ..................... 704/2
6,341,372 B1 * 1/2002 Datig ..................... 717/136

* cited by examiner

Primary Examiner—George B. Davis
(74) Attorney, Agent, or Firm—Thomas N. Giaccherini; Alan H Sochel

(57) ABSTRACT

A method and apparatus for simulating human intelligence and natural language dialog capability is disclosed. The present invention contains a cognitive model of human intelligence (20), a mathematical model of information abstraction, synthetic dialog interaction (202), a method of language-independent computer learning through training (201), interaction and document reading (203) and a method of efficient computer implementation (200) of all preceding parts. The cognitive model (20) is the theoretical basis of the entire invention, describes the way humans learn and interact in general terms, provides a mathematical basis for natural language (40) learning and interaction and establishes a basis for detailed computer implementation of the theory.

20 Claims, 41 Drawing Sheets

SIMULATING HUMAN INTELLIGENCE IN COMPUTERS USING NATURAL LANGUAGE DIALOG

CROSS-REFERENCE TO A RELATED PATENT APPLICATION & CLAIM FOR PRIORITY

The Applicant hereby claims the benefit of priority under Section 120 of Title 35 of the United States Code of Laws for any and all subject matter which is commonly disclosed in the present Application and in pending continuation-in-part patent application U.S. Ser. No. 09/579,325 entitled Simulating Human Intelligence in Computers Using Natural Language Dialog by Henry M. Harris, which was filed on May 25, 2000.

FEDERALLY SPONSORED RESEARCH OR DEVELOPMENT

None.

FIELD OF THE INVENTION

The present invention relates to the field of Artificial Intelligence (AI) and the use of Interactive Computer Systems, Computational Linguistics and Natural Language Processing. More particularly, this invention comprises methods and apparatus for modeling human-like interactions on a computer for commercial applications.

BACKGROUND OF THE INVENTION

Introduction

The French philosopher-mathematician René Descartes in 1637 predicted that it would never be possible to make a machine that thinks as humans do. British mathematician and computer pioneer Alan Turing in 1950 declared that one day there would be a machine that could duplicate human intelligence in every way.

By the early 1990's, Artificial Intelligence (AI) itself had not been achieved, but logic programs called expert systems were devised to allow computers to "make decisions" by interpreting data and selecting from among alternatives. Technicians can now run programs used, for example, in complex medical diagnosis, language translation, mineral exploration and computer design.

Computers can outperform mental functions in limited areas, notably in the speed of mathematical calculations. Most computers operate by logic steps or algorithms. They do serial processing; operations of recognition and processing are performed one at a time. The brain appears to do parallel processing, that is, performing operations simultaneously. Critics of the computational approach insist that a person who solves a problem indicates understanding, something that solving a computation does not indicate. Some proponents, therefore suggest that for computers to duplicate human reasoning which involves not only logic but perception, awareness, emotional preferences, values, ability to generalize, etc., they must be patterned after the brain, which essentially comprises a network of nerve cells.

However, there is no universally accepted theory of human intelligence. Some researchers have even suggested that our current knowledge of fundamental physics, that is, the language that we use to describe and understand the universe, is not adequate to describe the complexity of the human brain. If this were true, it would seem that any hope of developing artificial intelligence is doomed to failure. While this postulate may be at least partially correct, and it is even possible that some human capabilities arise from the non-local aspects of the quantum field, the inventor believes that most aspects of human intelligence can be modeled and that these aspects can be simulated by implementation on conventional computers to do useful tasks. The present invention comprises such modeling and implementation.

Background Technology

The present theory of intelligence abandons many, if not most, of the assumptions of conventional technology made in the last fifty years by the AI community.

Most of the conventional technology starts with the recognition that an important feature of human intelligence is its ability to construct and make sense of strings of symbols, that is language. Many have assumed there is a syntactic "parser engine" in the human brain that mysteriously decodes strings of symbols into meanings and that this capability is somehow built into the brain. This is called the Universal Grammar (UG) theory. As evidence of this, many researchers point to papers that "prove" that the learning of language is impossible since it is too complex and confusing to be learned inductively. Some researchers have claimed that even scientists cannot understand grammar without first reading papers on the subject.

The problem of providing a practical, veracious method and apparatus for simulating human intelligence has presented a major challenge to the artificial intelligence community. The development of such a method and system that offers significant commercial benefits would constitute a major technological advance and would satisfy a long felt need in the information, communications, entertainment and many other businesses.

SUMMARY OF THE INVENTION

The present invention includes methods and apparatus for simulating human intelligence using natural language processing. The invention comprises:

(1) a cognitive model of human intelligence;

(2) a mathematical model of information abstraction and synthetic dialog interaction;

(3) a method of language-independent computer learning through training, interaction and document reading; and (4) a method of efficient computer implementation of all preceding parts.

A novel theory of human intelligence is developed that is concrete and practical enough to be incorporated into machines that employ intelligent, directed use of language. The methods and apparatus disclosed provide enabling information to implement the theory in a conventional computer.

The cognitive model is a theoretical basis of the entire invention. It describes the way humans learn and interact in general terms. The mathematical model of information abstraction and synthetic dialog interaction and method of language-independent computer learning through training, interaction and document reading provide a mathematical basis for natural language learning and interaction between humans and a computer. It also provides the basis for machine translation from one language to another, the detection of patterns of speech for the purpose of identification, and provides the basis for personality simulations.

A working prototype of an "Automated Dialog Adaptive Machine" (ADAM) has been created. The cognitive model of human intelligence is referred to herein as the Associative Abstraction Sensory Model (AASM). The description of the invention is organized onto three parts: (1) a description of the theory of intelligence that the computer algorithms are based on; (2) a mathematical model and (3) a computer implementation.

Using the AASM in the present invention, it is shown that pattern recognition, associative capabilities and sensory memory of the human brain alone can be used to describe the ability of humans to use ideas and language effectively.

Many working in the cognitive science and AI fields have assumed that cognition involves the encoding into the brain an unknown deep representation of knowledge sometimes called "mentalese." Language production is seen as decoding mentalese into strings of symbols and language understanding as coding mentalese from symbols. Therefore cognition must reside in a hidden, unknown mechanism of the human brain. No such assumption is made in the AASM. The model does not require that hidden mechanisms are necessary to explain human comprehension.

The model posits that human-like intelligent behavior comes from the language itself. That is, it is the ability of humans to use language, i.e. strings of symbols, as representations of meaning in combination with other characteristics of the brain that define human intelligent behavior. How language is combined with other sensory information is the key to describing a working model of intelligence as well as reproducing it on a computer. The description of this process lies at the heart of the AASM.

Much previous work by others has concentrated on the encoding and decoding of symbol strings in a particular target language. For example, Noam Chomsky's book, *Syntactic Structures,* is the classic work of transformational grammars and also the work of Terry Winograd (1971, 1972) who created the precursors of today's commercial language interfaces. We are taught in school that only certain symbol sequences are correct and rules that describe "legal" sequences are called a grammar. A large portion of every human being's education is learning the correct rules of their native language. Yet it is well known that children can produce legal sequences without formal training. A discussion of this may be found in Chapter 4 of *Symbolic Species* by Terrence W. Deacon who also has a very complete description of the origins of the Universal Grammar Theory. Simply being exposed to others that speak a particular grammar is enough for the average child to generate grammatical sentences. Yet almost the entire body of work in computational linguistics and artificial intelligence requires recognizing parts of speech as defined in formal grammars.

The AASM does not require knowing parts of speech, and, in particular, specialized knowledge of any kind. The capabilities of the AASM follow from the modeling of cognition and language learning, not any specialized knowledge of a target language, or any other knowledge for that matter.

An appreciation of other aims and objectives of the present invention and a more complete and comprehensive understanding of this invention may be achieved by studying the following description of a preferred and alternate embodiments and by referring to the accompanying drawings.

A BRIEF DESCRIPTION OF THE DRAWINGS

Figure 2:
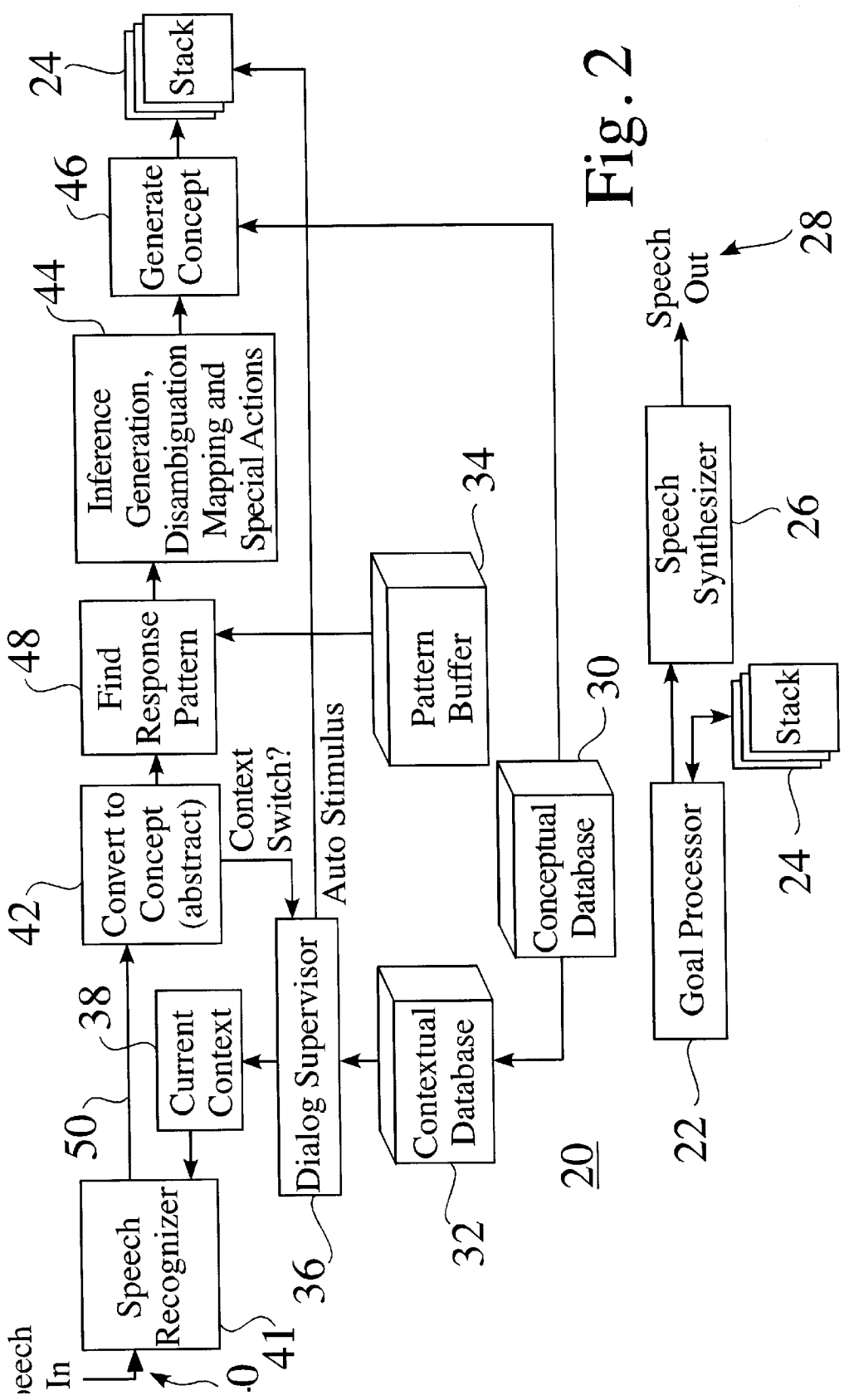
FIG. 2 depicts a block diagram at a high level, of the Associative Abstract Sensory Model (AASM) implemented in a conventional computer.
Figure 3A:
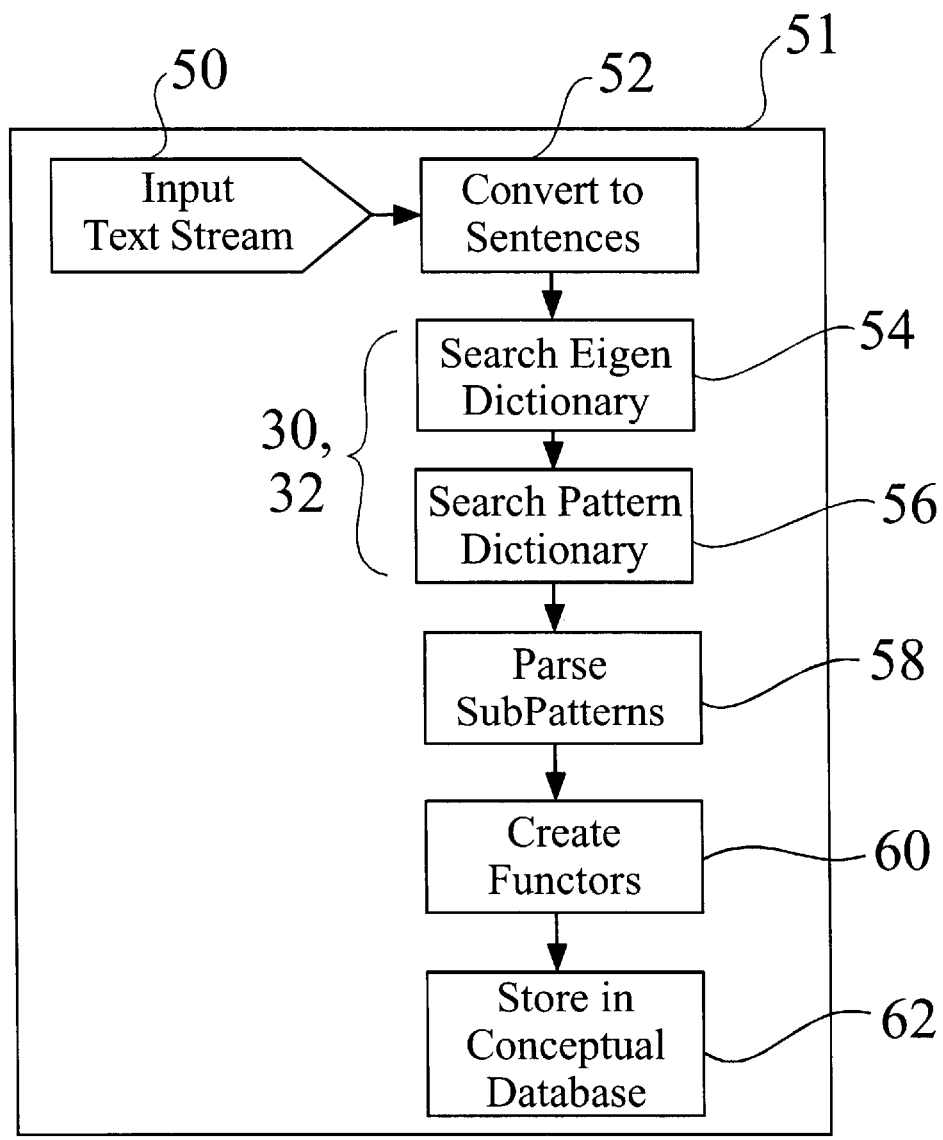

FIG. 3A reveals a flow diagram depicting how a computer such as ADAM "reads" an input text stream. FIG. 3 is an expansion of block 42 in FIG. 2.

Figure 3B:
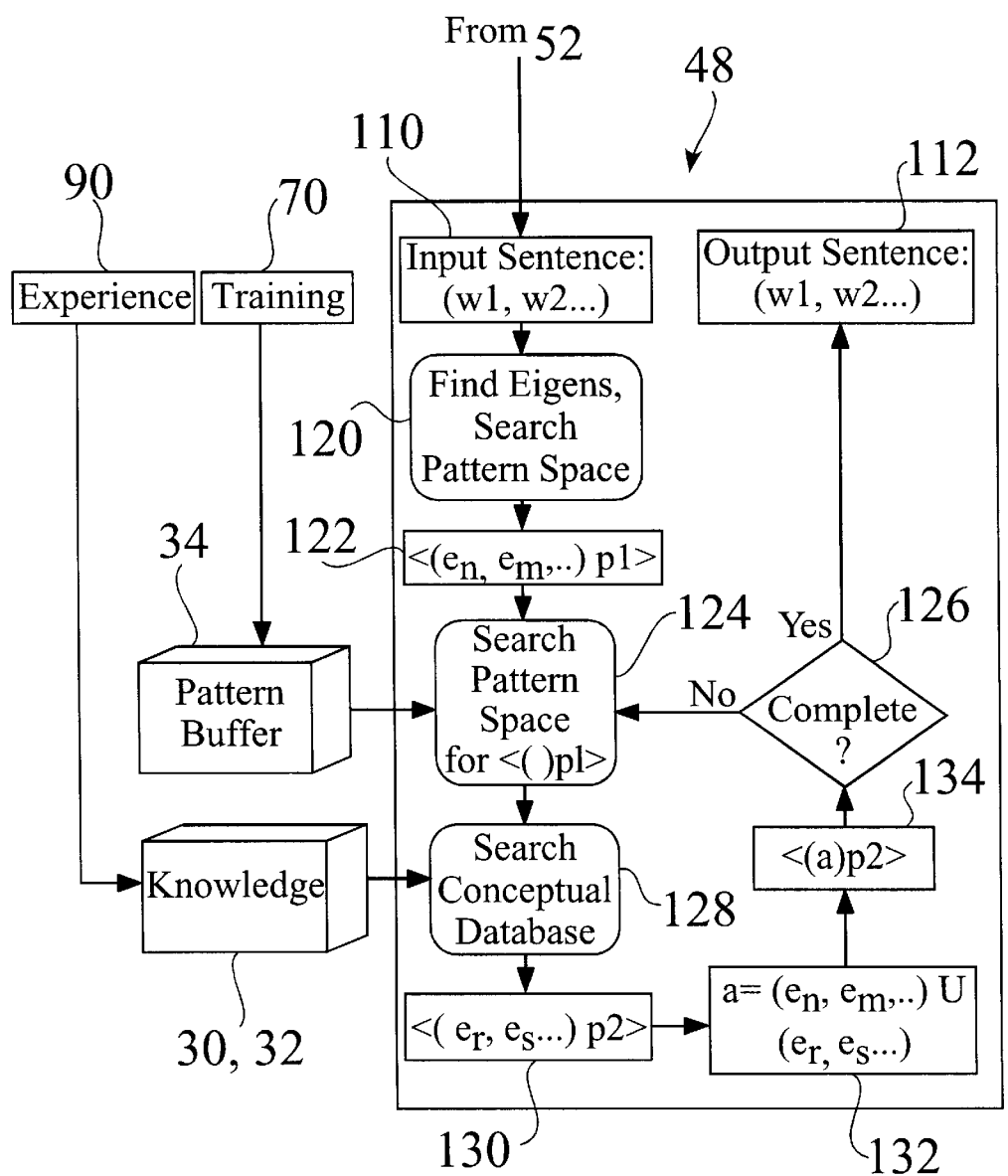

FIG. 3B is an expansion of the "Find Response" block 48 of the flow diagram shown in FIG. 2, illustrating how eigen words and patterns in an input sentence are identified, patterns and concepts are drawn from data bases and an output sentence is generated.

Figure 4A:
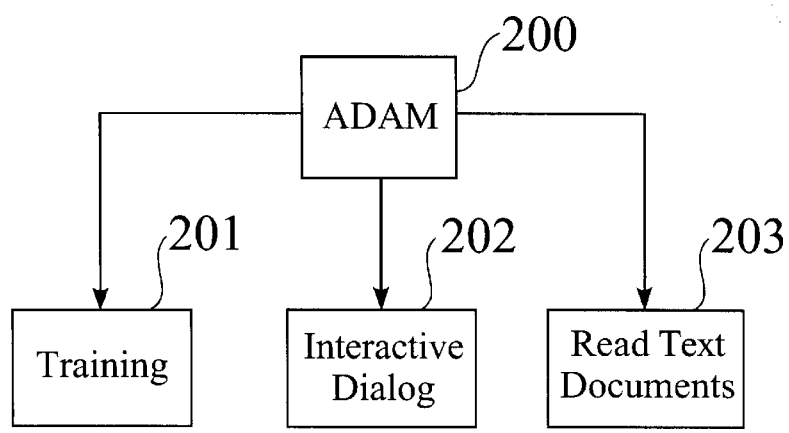

FIG. 4A depicts the three broad areas of capability of the Automated Dialog Adaptive Machine (ADAM) of this invention.

Figure 4B:
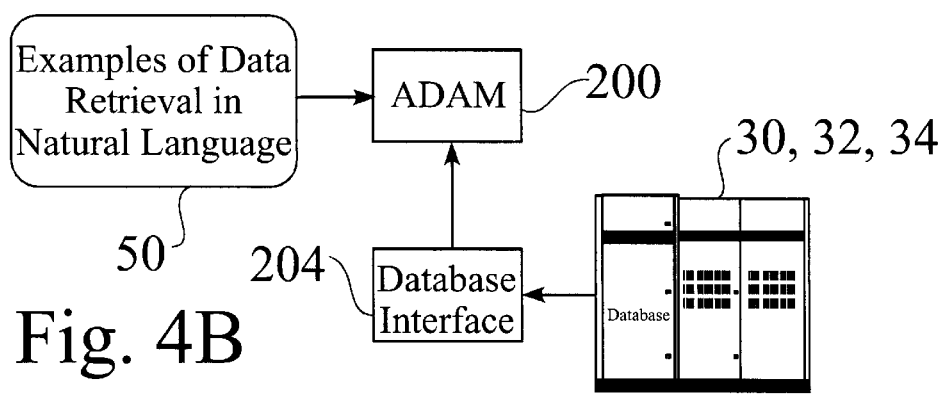

FIG. 4B is a flow diagram showing how the data base is applied in ADAM to inputs of data in natural language in training mode.

Figure 4C:
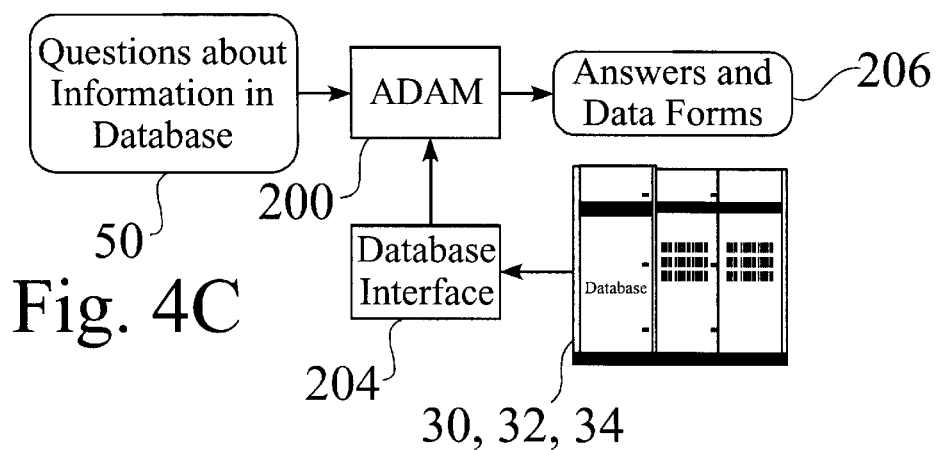

FIG. 4C is a flow diagram showing how the data base is applied in ADAM to inputs of questions about information in the database in operational mode.

Figure 5A:
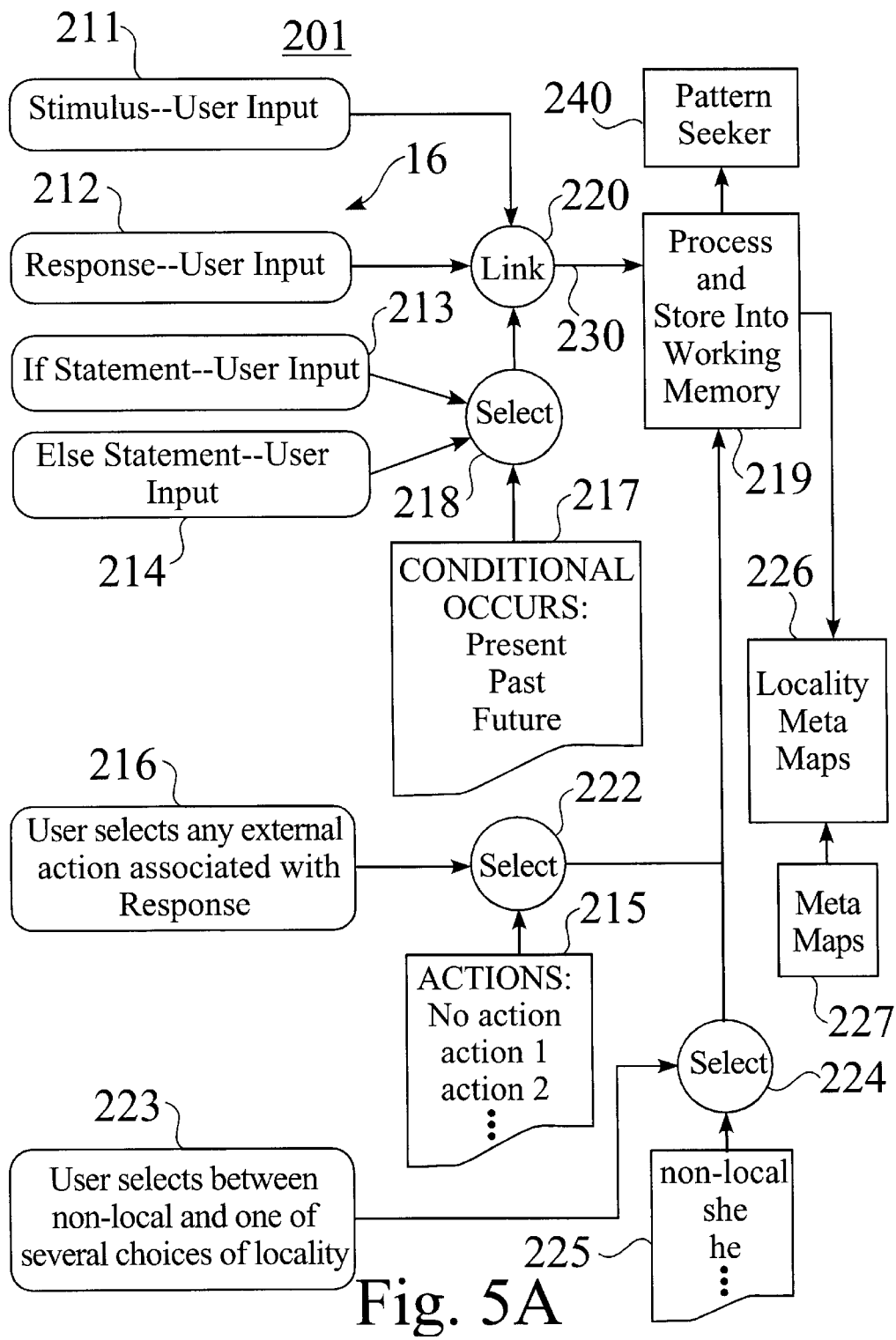

FIG. 5A is a flow diagram illustrating at a top level the Training process of ADAM.

Figure 5B:
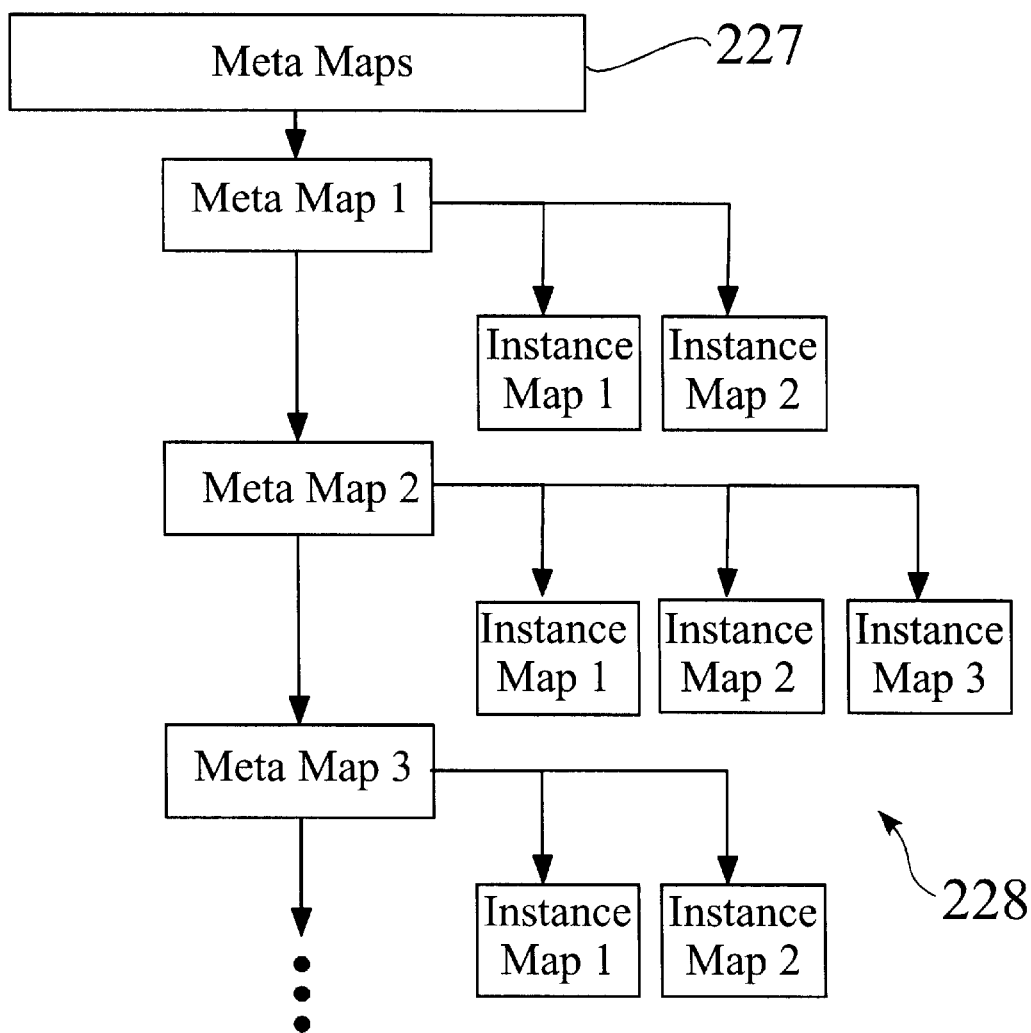

FIG. 5B is a flow diagram depicting the construction of Meta Maps in ADAM.

Figure 6:
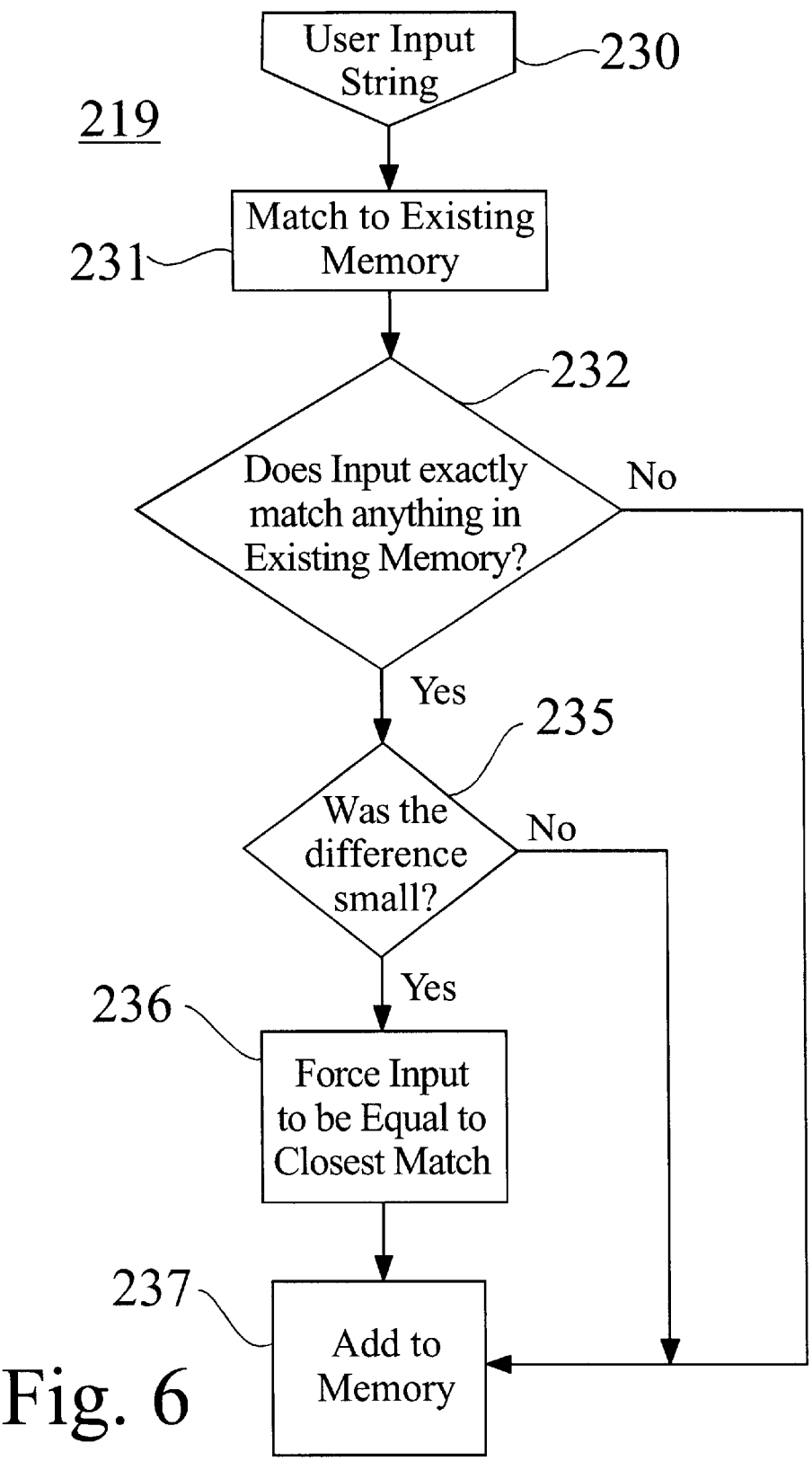

FIG. 6 is a further detailed flow diagram of the training process describing the process of storing user input in working memory.

Figure 7:
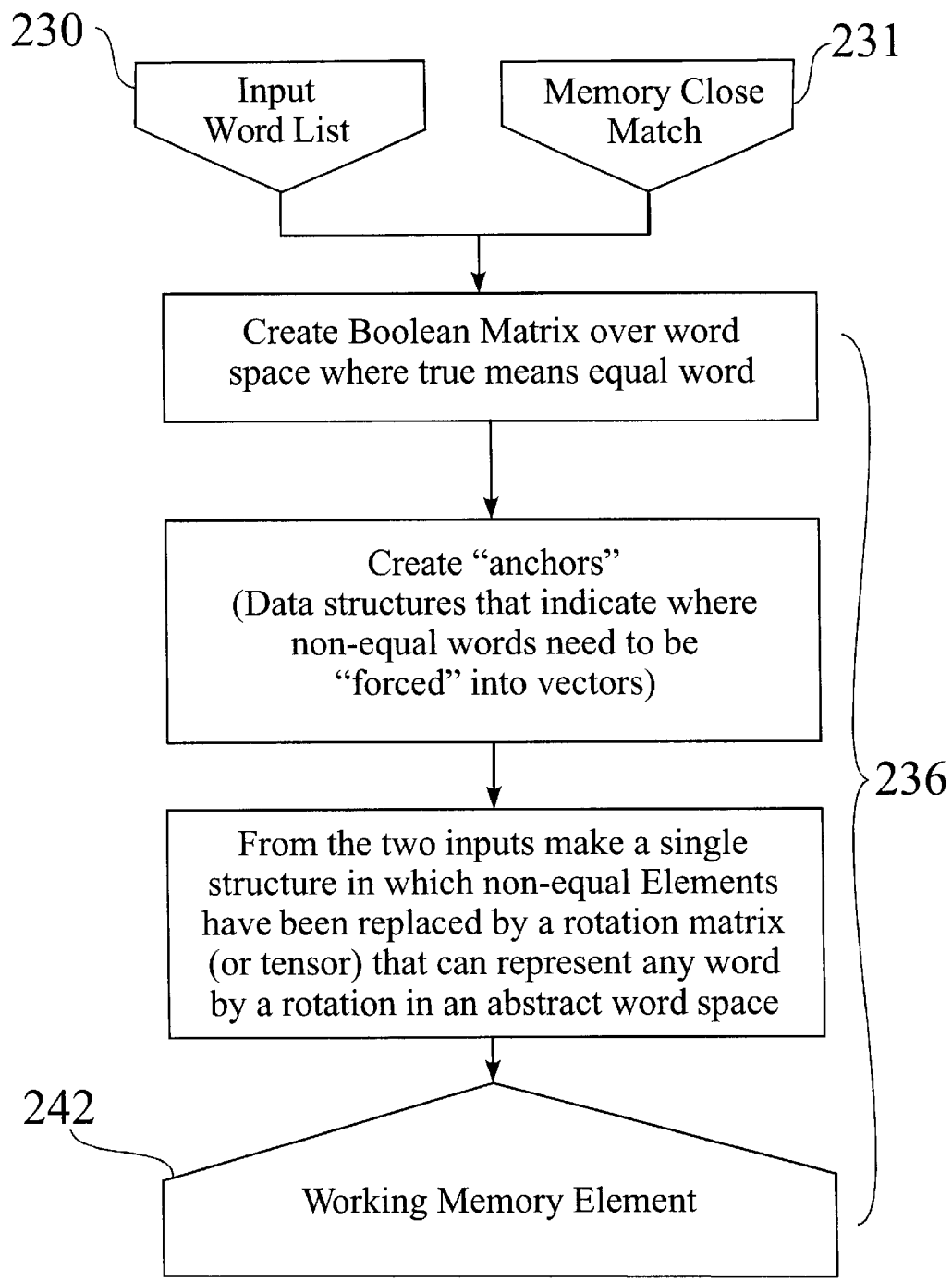

FIG. 7 is a flow diagram showing further detail of the conversion of user input to working memory elements.

Figure 8:
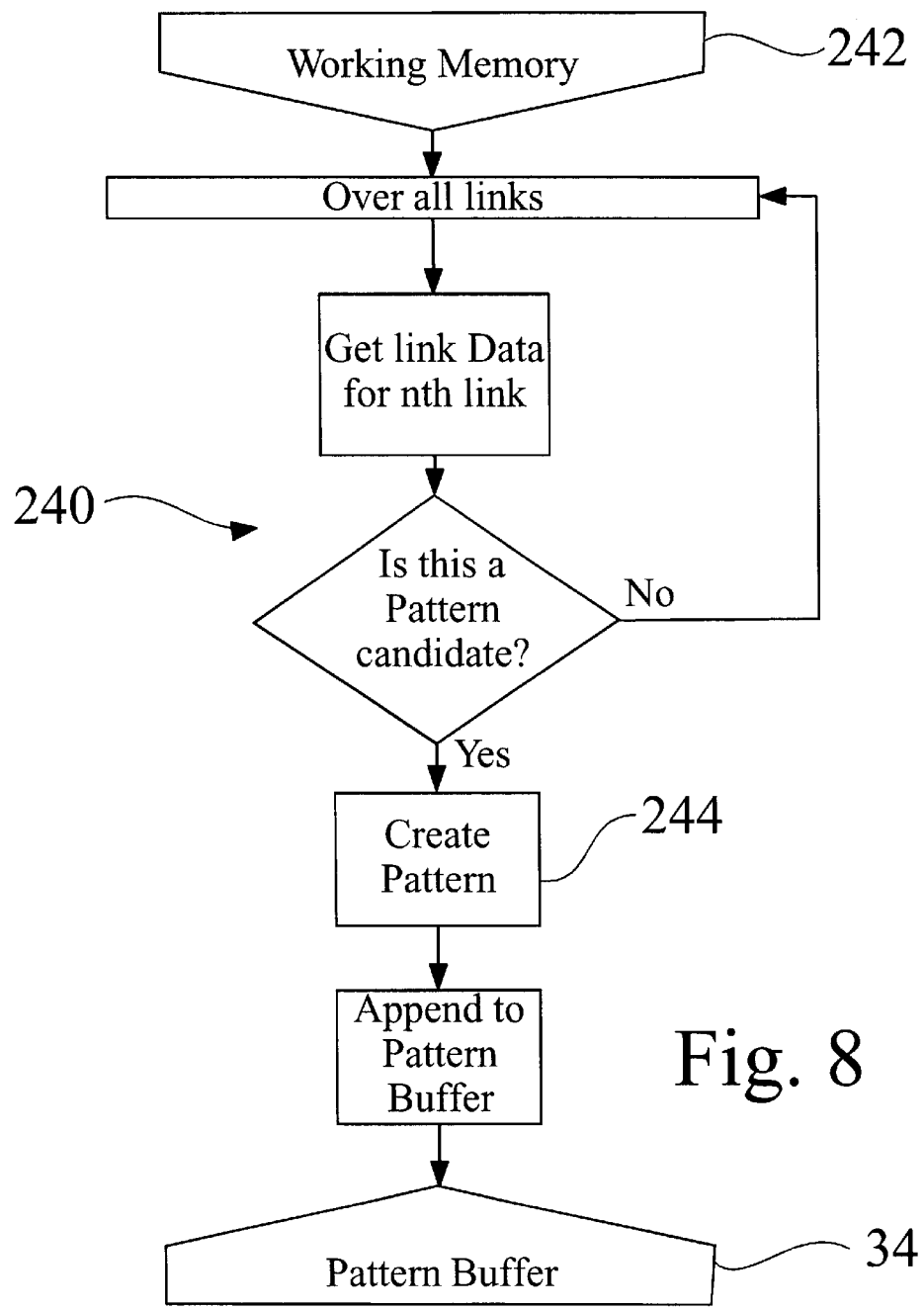

FIG. 8 is a flow diagram revealing details of the pattern seeker process.

FIGS. 8–12 detail the steps necessary to produce patterns and the process of creation of a Functor 256 from the element set 252 of the memory segment.

Figure 13:
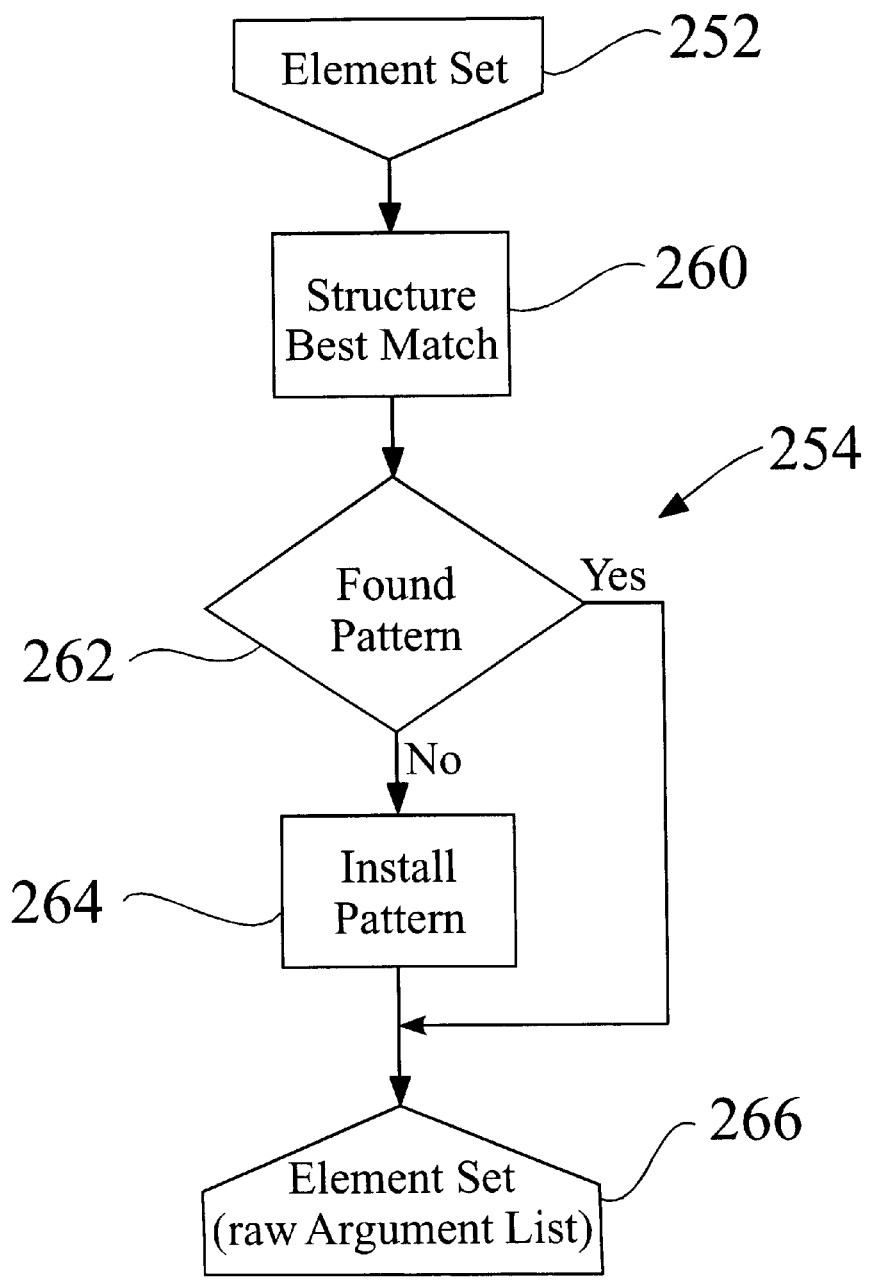

FIG. 13 depicts details of the Structure Pattern Match 254 process.

Figure 14:
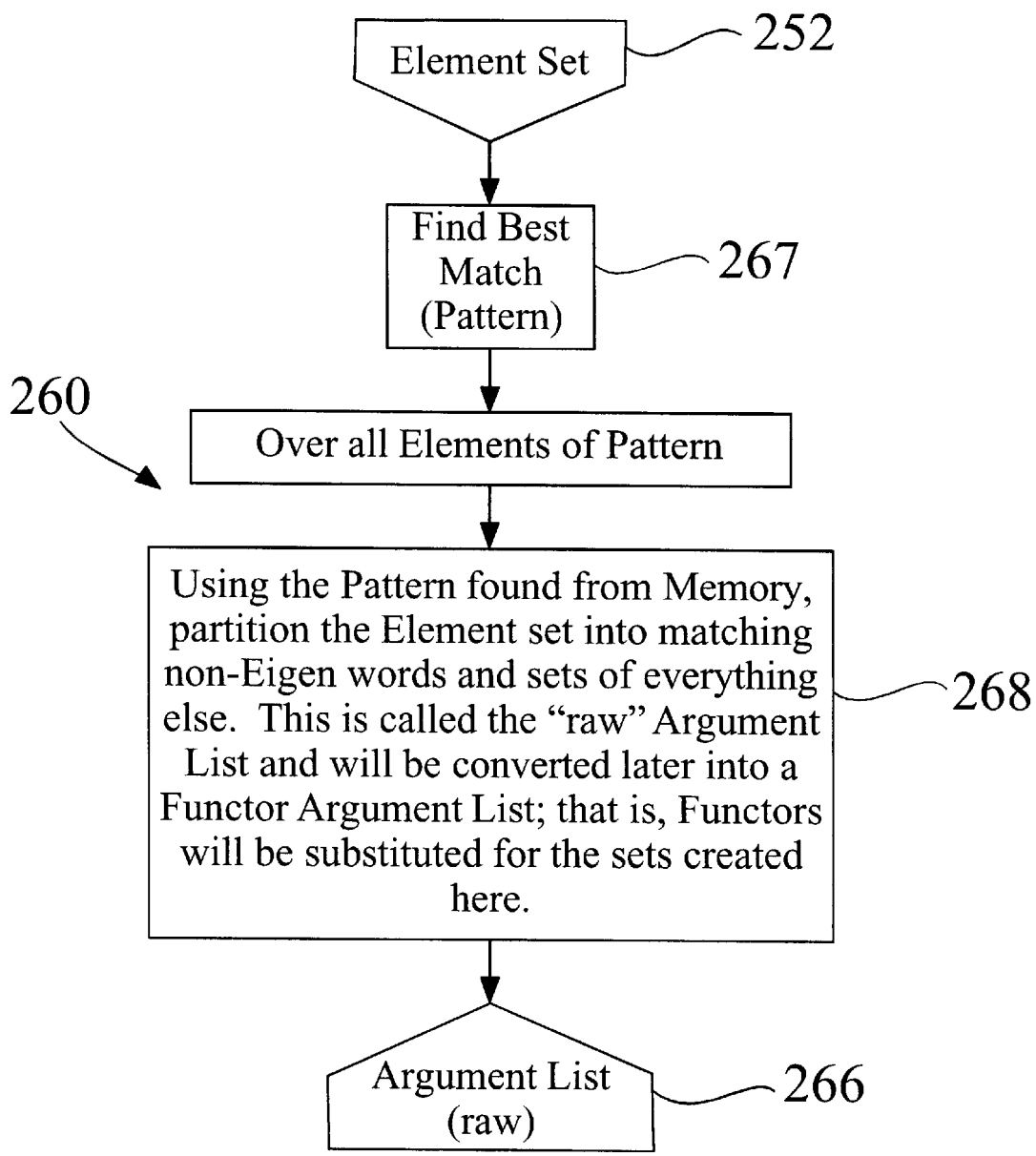
Figure 15:
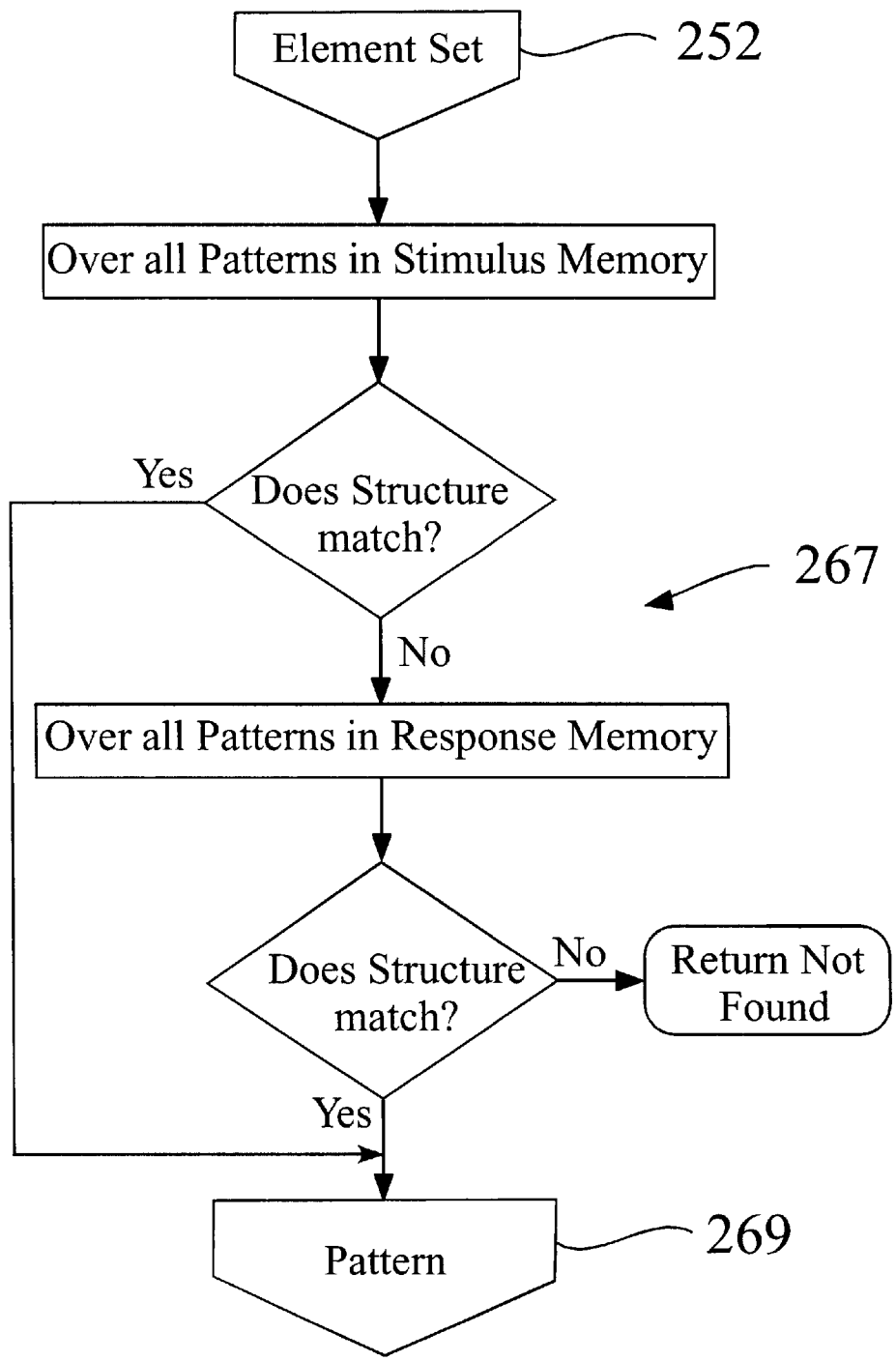

FIGS. 14 & 15 show details of the Structure Best Match process.

Figure 16:
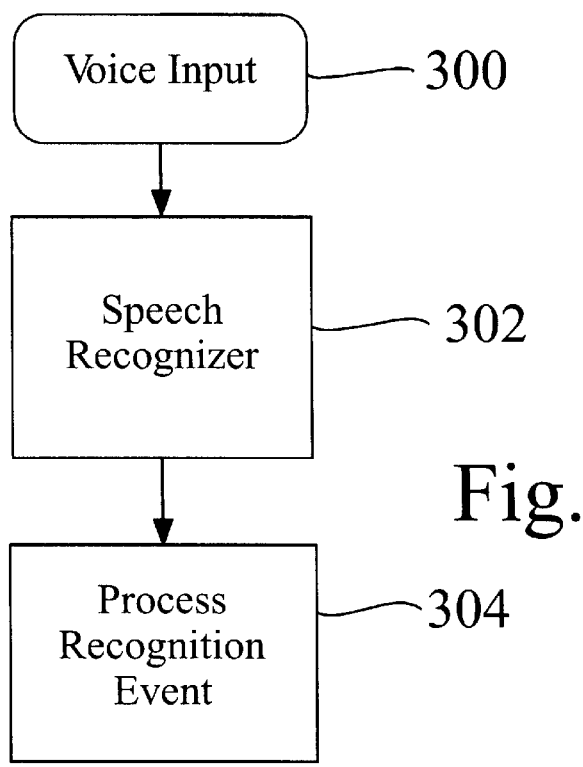

FIG. 16 shows a diagram which describes the flow of interactive voice input to a speaker-independent, continuous speech recognizer, external to ADAM.

Figure 17:
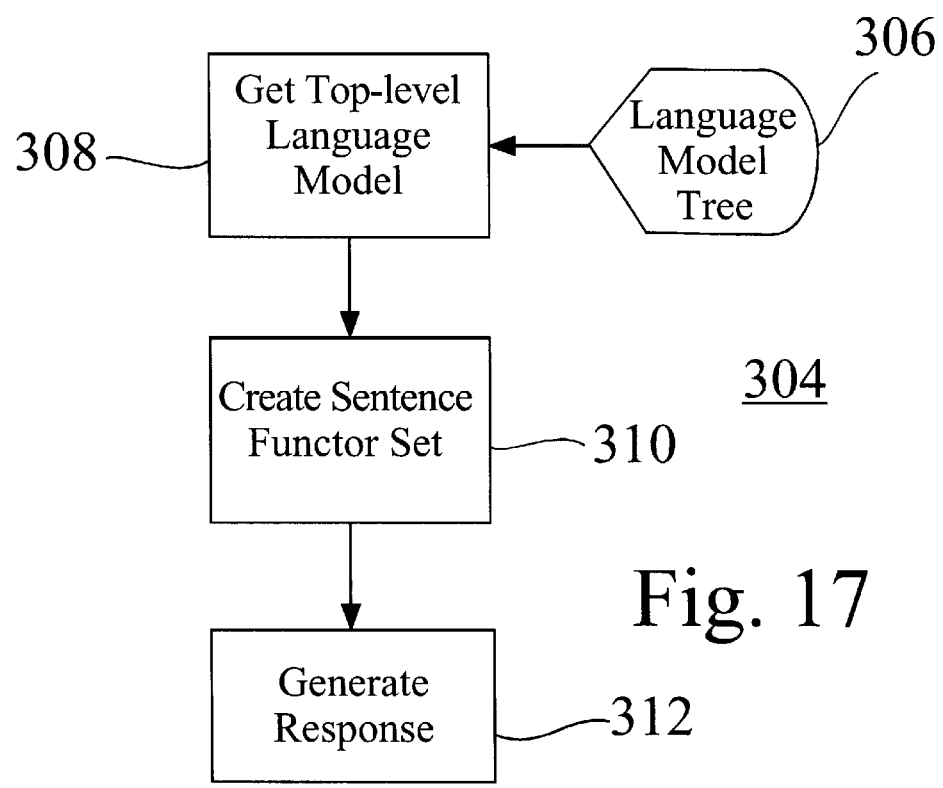

FIG. 17 shows how the Recognition Event is handled by ADAM, generating a response to the user speech.

Figure 18:
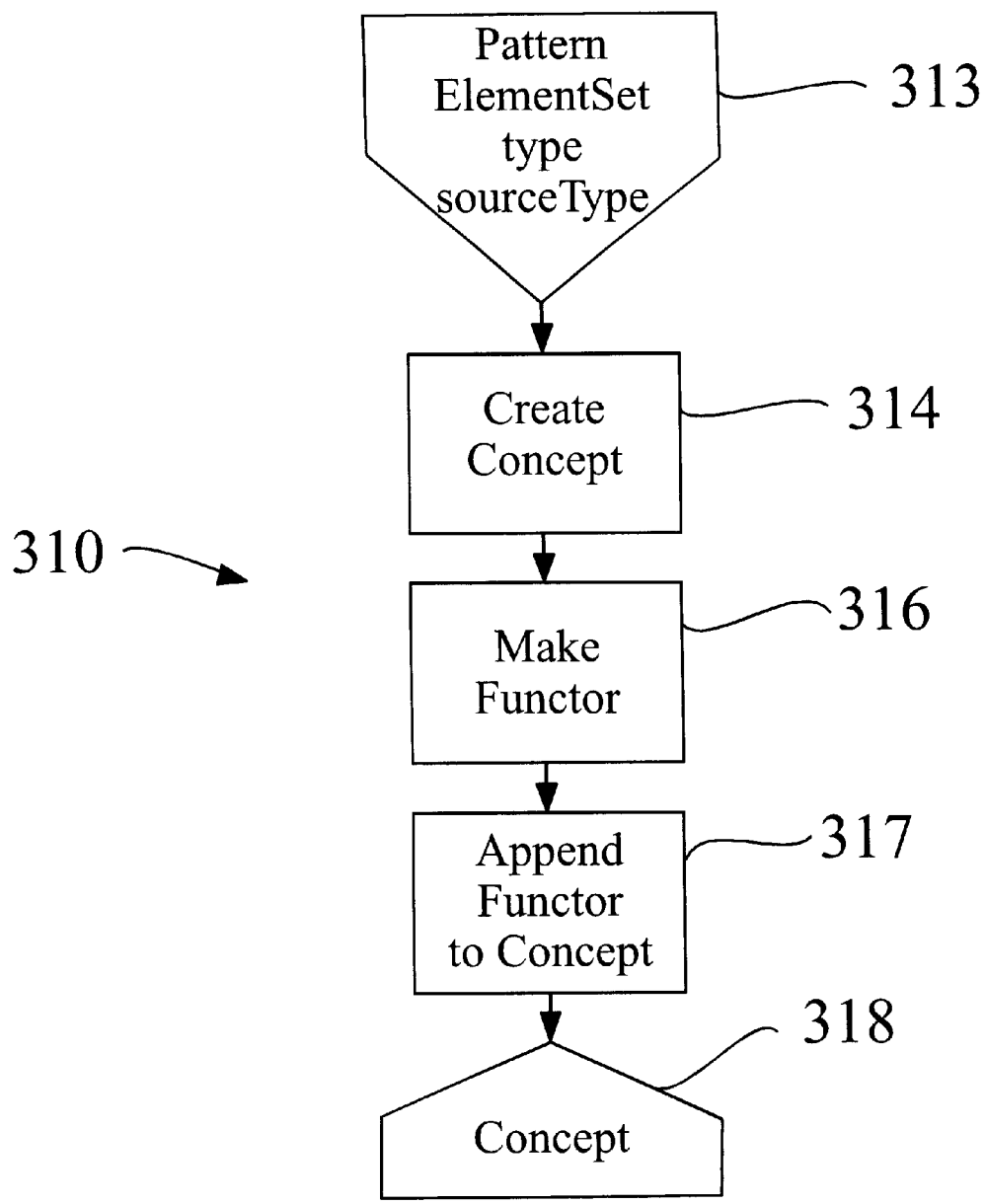

FIG. 18 describes the process flow for creating a sentence Functor set.

FIGS. 18–21 show the process flow which creates a Functor from the user's speech input.

Figure 22:
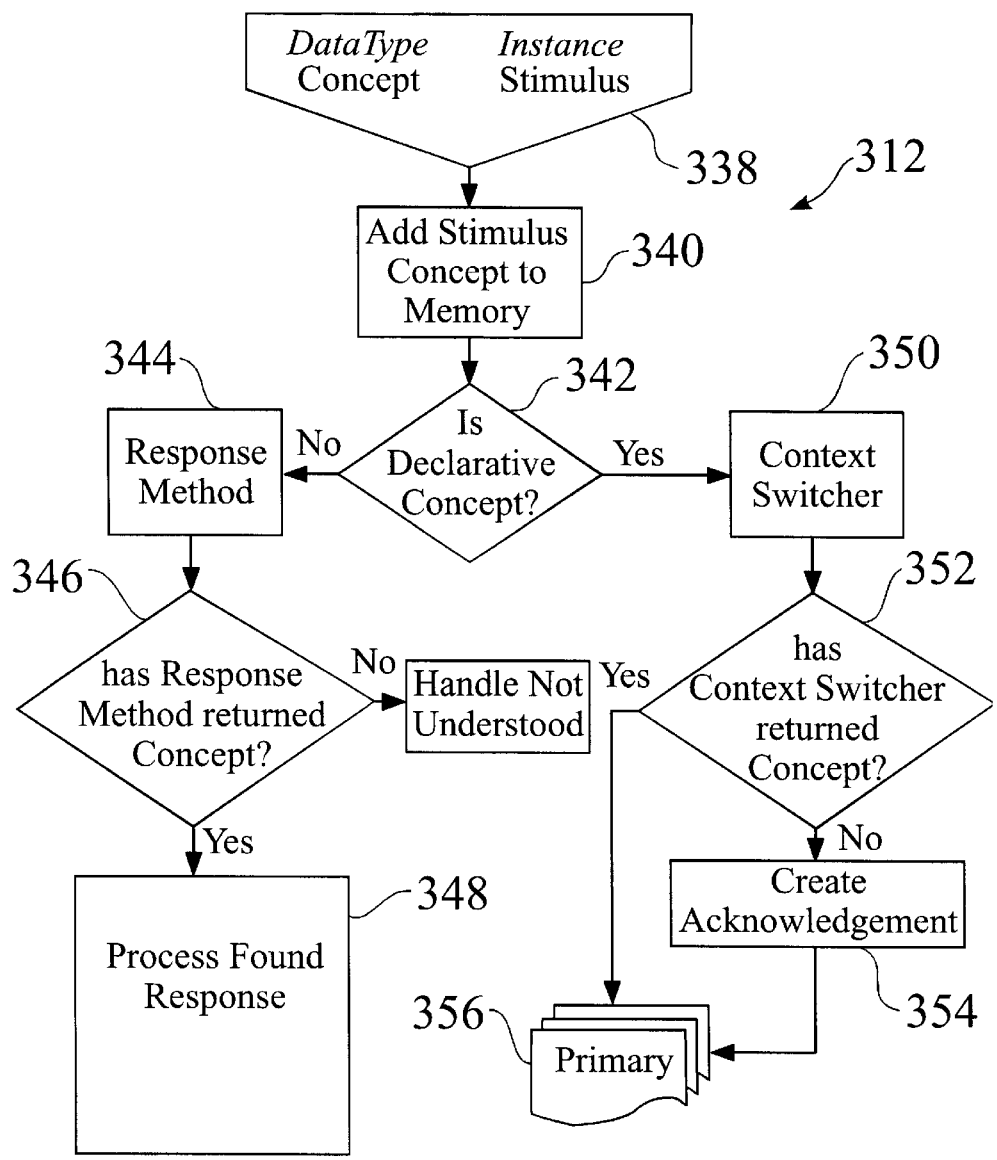

FIG. 22 delineates the Generate Response process in a flow diagram.

Figure 23:
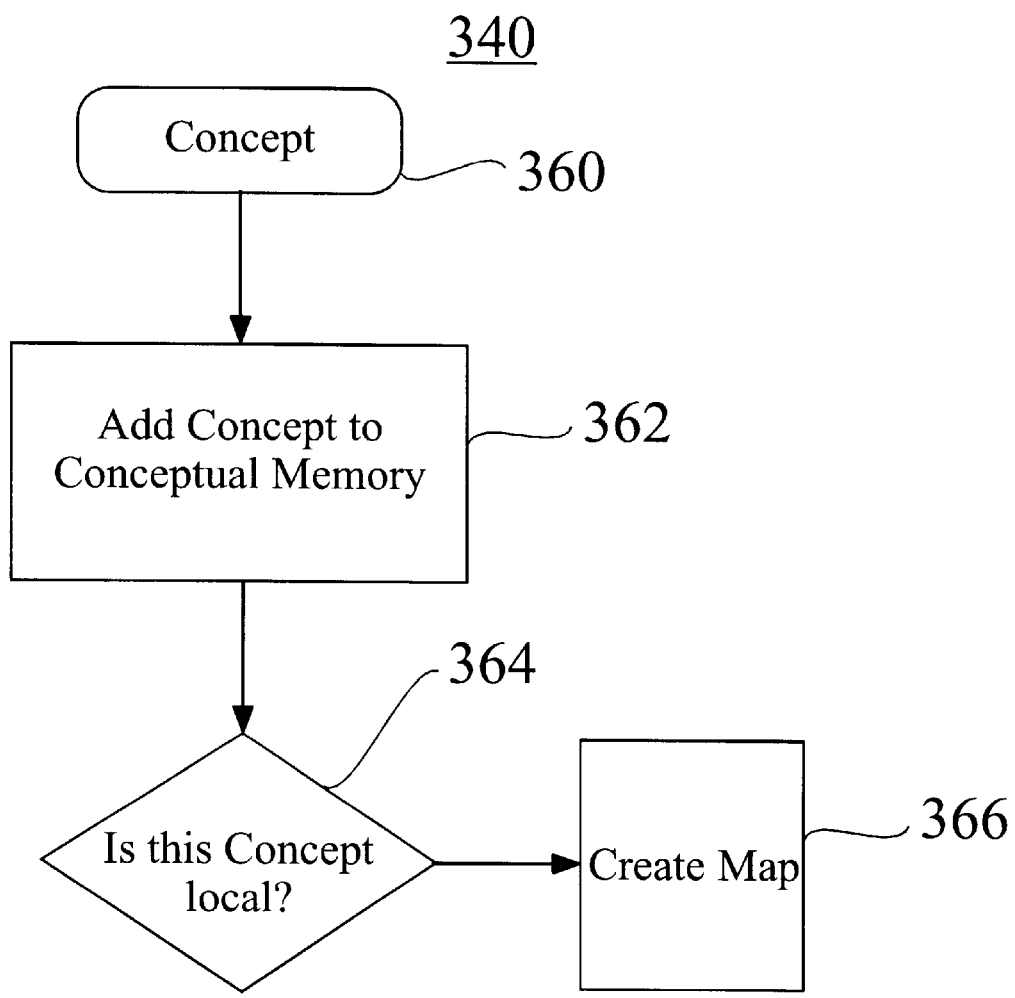

FIG. 23 shows the flow within the Add Stimulus to Memory process.

Figure 24:
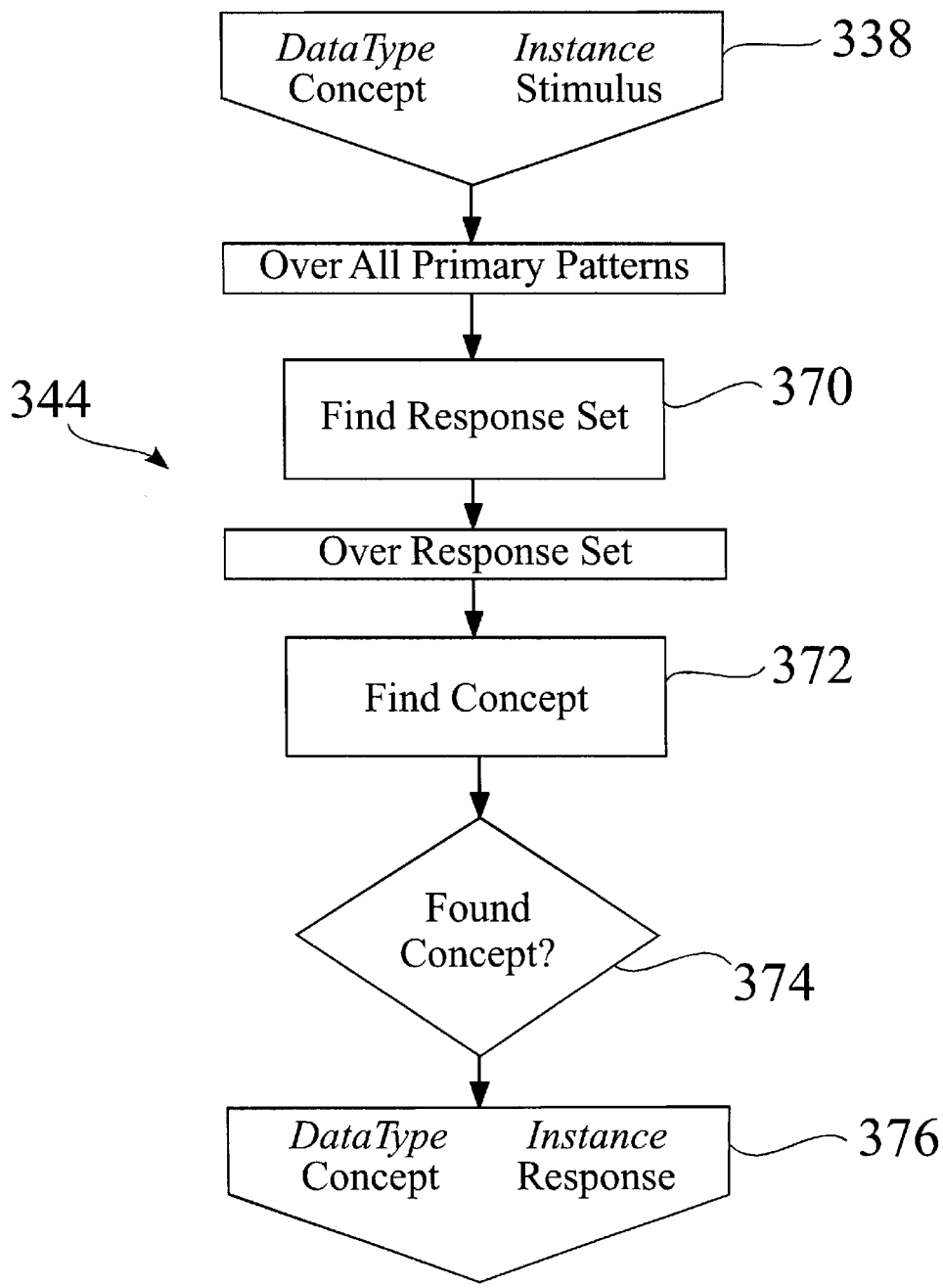

FIG. 24 further describes the Response Method.

Figure 25:
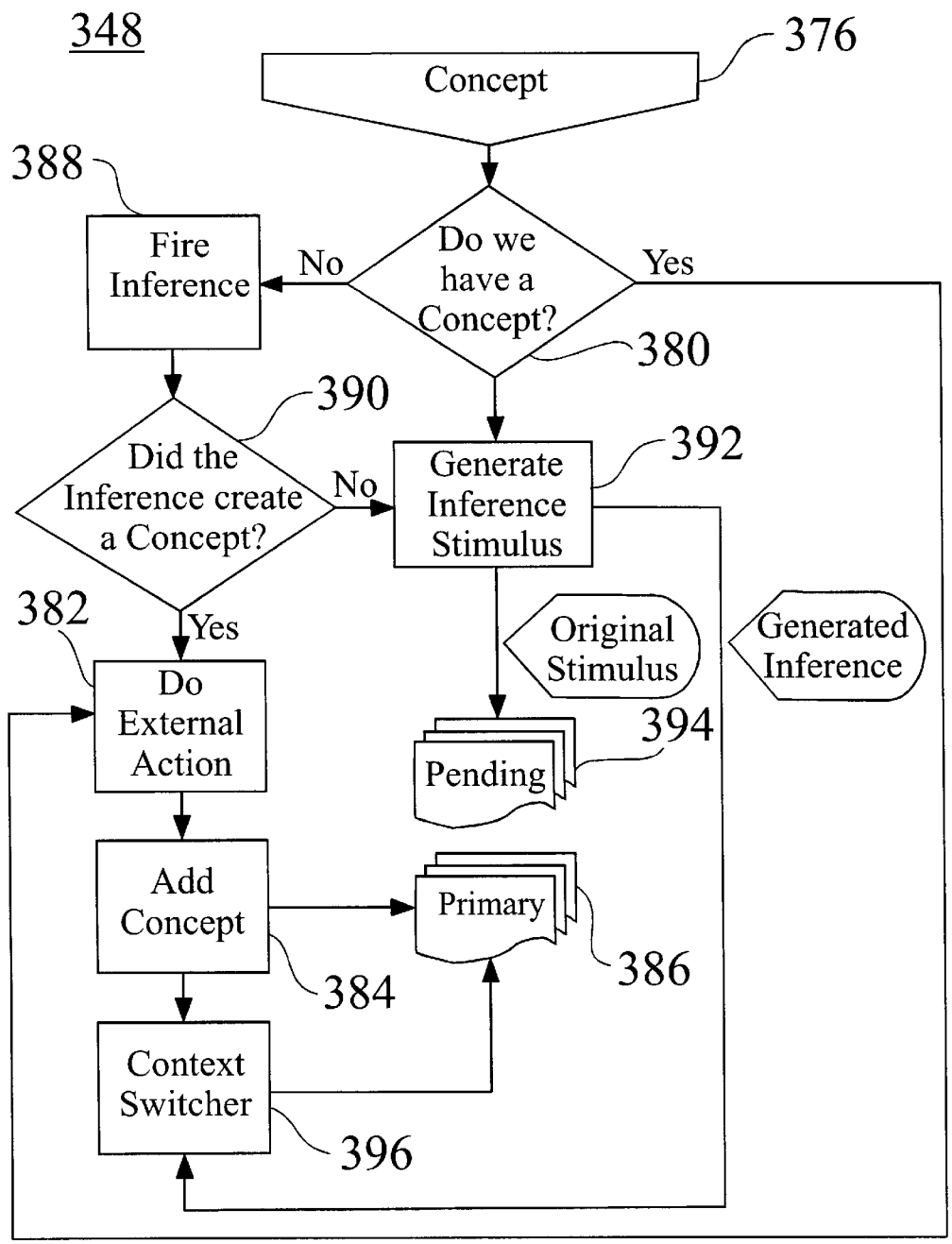

FIG. 25 displays how the Found Concept and Response are passed to a Do External Action process.

Figure 26:
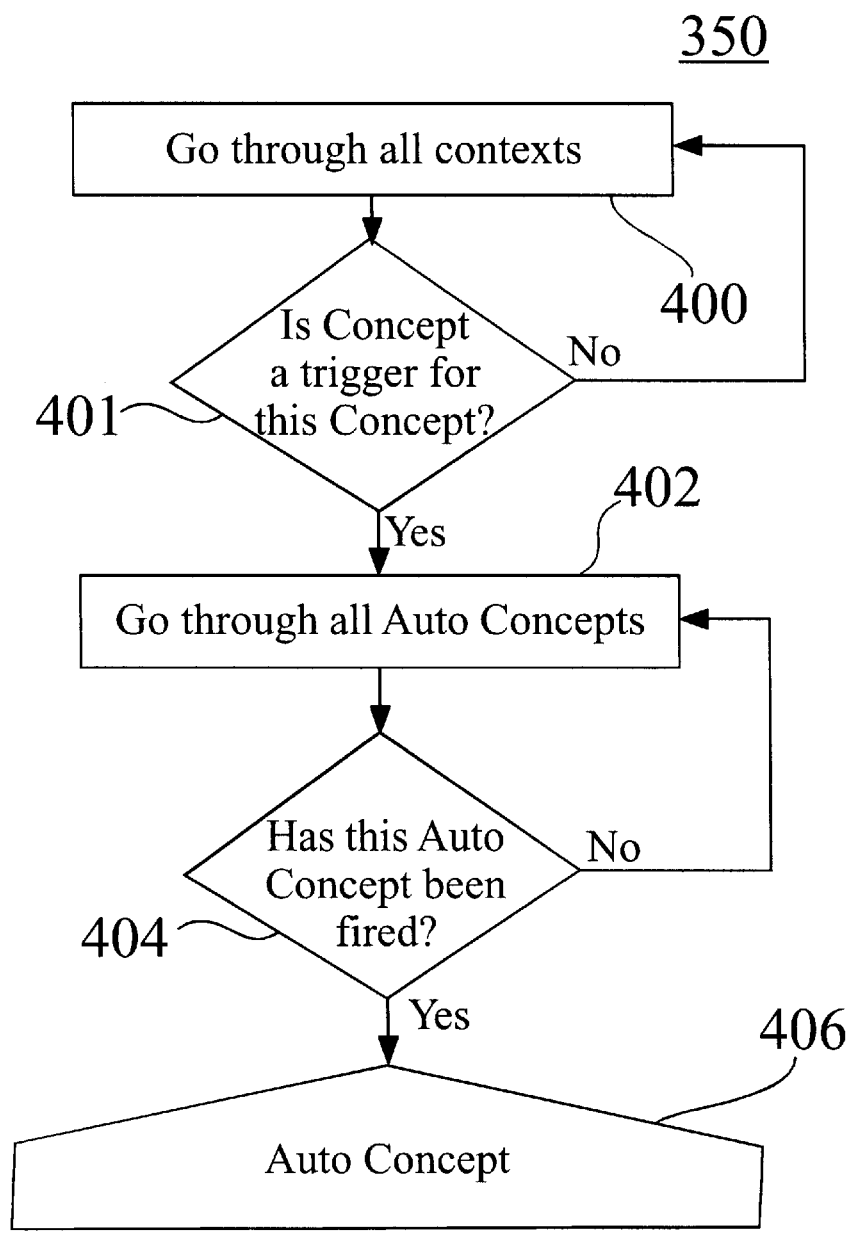
Figure 26A:
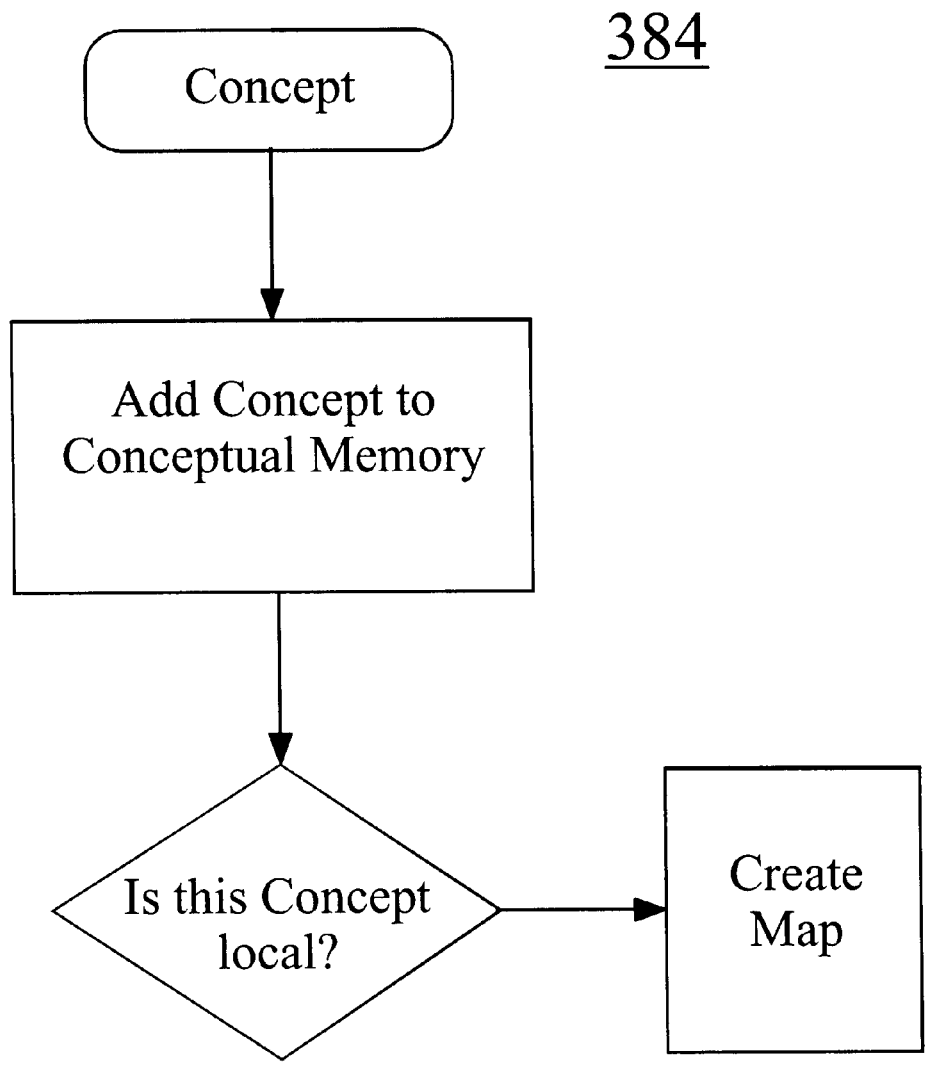
Figure 26B:
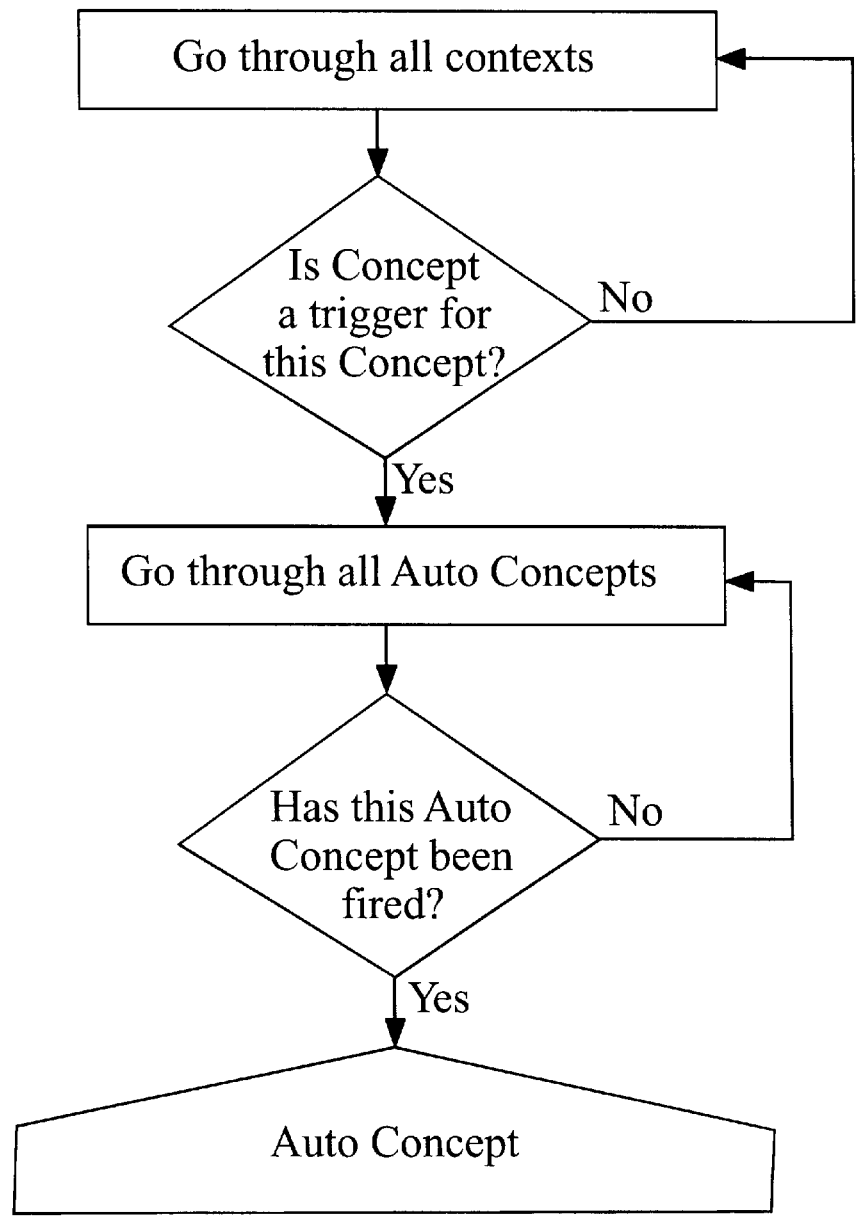

FIG. 26 is a flow diagram revealing the Context Switcher.

FIGS. 27–30 depicts the process for Reading Text Documents, building Concepts therefrom and storing Concepts as Functors.

FIGS. 30 through 36 are flow diagrams which show the process whereby a Functor is created and a Pattern Match is found.

A DETAILED DESCRIPTION OF PREFERRED & ALTERNATIVE EMBODIMENTS

Overview of the Invention

The present invention provides methods and apparatus for constructing and operating a machine that is able to develop and store a set of language patterns for expressing knowledge, acquire specific knowledge, substitute that specific knowledge into recognized language patterns and extract meaning from these patterns. The invention offers efficient retrieval of information using natural language, the production of directed discourse, that is, the machine can be goal-oriented, and the efficient and accurate control of any number of machine tasks by the use of natural language.

Definition of Terms and Notation

The special terms and their notation as used in this Specification are defined below. An understanding of this terminology is particularly useful in understanding the cognitive model of human learning upon which the methods and apparatus of the present invention are based.

Sentence: any string of words that might be used to either stimulate a thought, respond to another sentence that is used as a stimulus, or to declare information.

For the purposes of the invention, there are three categories or types of sentences: (a) stimulus, (b) response and (c) declarative. Four examples of a sentence are: "What's up?;" "My Goodness;" "Socrates is a man;" and "What is the purpose of an education?" The four example sentences above are in these categories, in order: stimulus, response, declarative and stimulus. Some declarative sentences can also be responses. Whether a sentence is declarative or a response depends upon when the sentence occurs in a dialog. For example, if it occurs after a question is asked, it is a response. If before, it is a declaration. A stimulus sentence can never be a response or a declarative type. The following notation is used: Ss—a stimulus sentence; Sr—a response sentence; Sd—a declarative sentence.

There are other possible types of sentences: St—an acknowledgment of success; Sf—an acknowledgment of failure. While in a sense St and Sf could be definitions of a type of response, these definitions are somewhat arbitrary and are defined this way because it facilitates the description of the model and also aids in creating a computer implementation.

Together, this set of sentence types is complete. That is, no other types of sentences are needed to completely describe any conceivable dialog.

Dialog: a sequence of sentences created alternatively by a human and a machine.

The beginning sentence type in a sequence is always stimulus or declarative, by definition. As noted above, a response sentence used as the beginning sentence in a sequence would be classified as a declarative. The reason for this careful separation of definitions is to never confuse the declaration of information with a request for information. Using the definitions above, a dialog is defined as consisting of a legitimate sequence of a pair of sentence types defined as: Ss: St; Sd: Sf; Ss: Sr; Sd: St; Sd: Sf; or Sd: Sd. In particular, (Ss: Sr) is called a stimulus-response pair and (Sd: Sd) is called a logical inference or deduction.

Eigen words and eigen vectors: An eigen word is a word that can be replaced by another word in the same sentence without changing the conceptual basis of the sentence. For example in the sentence "Red is a color," Red could be replaced by blue giving: "Blue is a color."

Both the word red and blue are eigen words. Both sentences can be represented by the following notation: {Red Blue} is a color.

By differentiating similar sentences, vectors of words can be created. The quantity {Red Blue} is called an eigen vector. The set of all names for colors is called the eigen vector space for color. {Red Blue Green . . . } is a color is an eigen vector space representation of all of the possible sentences that can be generated about the concept of names of a color.

Abstraction, Patterns, Set Variables and Abstract Spaces:

A related notation to the eigen vector space representation above is the following: ( ).en is a color. This notation is a way of expressing the pattern inherent in the eigen vector space for color.

Pattern: A pattern is an expression of the type: ( ).en is a color. In this expression, n is an integer, e.g., ( ).e23

SetVariable: The expression ( ).en is a setVariable. This notation is a way of expressing the idea of a pattern.

Instantiated pattern: (Red).en is a color is an "instantiated" pattern and is equivalent to a sentence.

Instantiated setVariable: An example of an "instantiated" setVariable is: (Red).en.

Abstraction: The process of pattern creation. Consider the sentence: John went to school. An abstraction of this sentence is ( ).e23 went to ( ).e89. The integers 23 and 89 have been selected only as examples.

Pattern Space: Patterns also can create a vector space. In the sentence above, ( )e23 is the setVariable of all male first names and ( ).e89 is the setVariable {school lunch dinner}. This sentence is an example of a vector space chosen to be called a "pattern space." Assume another expression, for example: ( ).e45 which is the setVariable of all female first names is also present. Then, the expression {( ).e23 ( ).e45} went to ( )e.89} denotes another pattern space.

Real Space: Ordinary words can also form vector spaces in what has been named "real space." The {Red Blue} eigen vector example above is a vector space that exists in real space. By definition a vector cannot exist in both pattern space and real space.

Complete pattern: All the patterns used in this section so far are examples of "complete" patterns. A complete pattern is one that does not rely on external information to complete its meaning.

Incomplete patterns: Incomplete patterns are ambiguous and in themselves do not contain a concept. Examples of "incomplete" patterns are: It was ( ).e56; That was a good ( ).e49; etc. Making an incomplete pattern into a complete one is a type of "disambiguity."

Concepts and Functors

Concept (C): In the AAS model, a Concept is defined as a set of "Functors" (f). As an example:

$$C=(f1\ f2\ \ldots) \qquad \text{Equation 1}$$

Functor: A Functor is as a construct with two components: a pattern and an argument list, as in the following example:

$$f=<(\text{argument list})p> \qquad \text{Equation 2}$$

or $$f=<(sv)> \qquad \text{Equation 3}$$

where sv is a setVariable. Equation 3 is used when a concept contains a simple pattern with no arguments and is equivalent to <( ) p >where p=sv.

The argument list is any list of set variables and functions. Thus a Concept is a list, tree structure that can contain any amount of complexity. The argument list serves as potential instantiations of a pattern. Thus the Concept that red is a color can be written:

$$C=(f) \qquad \text{Equation 4}$$

where $$f=<((\text{red}).e23)p1> \qquad \text{Equation 5}$$

and $$p1 = (\ ).e23 \text{ is a color.} \qquad \text{Equation 6}$$

The Associative Abstraction Sensory Model Theory of Intelligence

The AASM theory recognizes two distinct components of intelligence: language capability; and the ability to use language for directed tasks. In human beings, these are primary but it is recognized there are other components of intelligence. Thus intelligence in this model is not one thing, but rather a series of interlocking capabilities.

Language Capability

Traditionally, language capability has been defined as the ability to decode a list of words into a deep-knowledge representation and back into language. Unfortunately, this definition assumes the model, which is a logical error. We need a better way of defining language capability.

Language is composed of many combinations of simple patterns. Language capability in AASM is defined as the ability to "transform"sentences (symbol strings) and the ability to create and instantiate abstractions, that is, the process of creating patterns represented by concrete examples. These processes are defined in the following sections.

Transformations: Sentence Transformations

A transformation relationship simply describes how one sentence can produce another sentence. As an example, consider the transformations between a stimulus and a response:

$$Ss(i) \Rightarrow Sr(i, j); j=1, 2, n \qquad \text{Equation 7}$$

In another form, the stimulus and response can be written as pairs:

$$(Ss(i): Sr(i, j))$$

In Equation 7, i and j are integers and represent all possible transformations between ith stimulus to the jth response. This means for the ith stimulus there are n possible responses where n can be any number. There are similar expressions for all legitimate (legal) sentence transformation pairs. Only legitimate (legal) sentence transformations are allowed but there may be any number of transformations possible.

It is not practical to generate responses by storing sentence pairs in a memory since the maximum value of i and j could be near-infinity in a real-world situation. Not only that, but simply generating responses from any stimulus is not very useful in itself. For this to be useful we need to introduce the ideas of abstraction and context which will be covered later.

While the transformation relationship describes how one sentence can produce another, there is an important type of transformation called inferences that needs to be noted separately. Inferences are the subset of all legal transformations between declarative sentences given by $$Sd(i) \Rightarrow Sd(j) \qquad \text{Equation 8}$$

where j=1, 2, n.

These types of transformations can be read to mean that if the sentence Sd(j) exists, it implies that Sd(i) exists. (The case of i equal to j is the trivial case.) For example if Sd1=Socrates is mortal and Sd2=Socrates is a man, we can say (Sd2: Sd1). That is, because Socrates is a man it is inferred that Socrates is a mortal. Thus, in the present invention model, the capability of logical deduction becomes a natural subset of the capability to make associations between strings of symbols.

This is not to say that any declarative sentence represents absolute truth. The mere existence of a particular string of words does not imply that a human interpretation of that symbol sequence represents a universal fact. All knowledge in the AASM model is relative and contradictory abstract information is allowed. The judgement of whether a particular sentence should be represented as accurate or truthful is the function of another, higher-level process called the Dialog Supervisor which is covered below in another section. Still, only a "judgement" or selection of alternatives can be produced with this higher-level process. There is no mechanism within the AASM for producing absolute truth. This restates the old cliche of "garbage in, garbage out."

Transformations: Abstract Transformations

As stated earlier, a sentence can be abstracted by replacing eigen words with corresponding uninstantiated set variables. Thus in the earlier example, Red is a color is replaced by ( ).e23 is a color.

We say that the sentence has been abstracted. Recall that the number 23 is just an example; the actual number is arbitrary. The notation provides a way to distinguish individual set variables in memory. This notation, is an extension of the conventions used in algebra. The algebraic expression X=2 means that out of the set of all integers, we have assigned to X a specific value of 2. Similarly, (red).e23 means that out of the set of all words that indicate recognizable points in the visible spectrum, we have assigned the value of red. Thus, the sentence "red is a color" can be thought of as a single point in an abstract vector space and the abstraction represents the extent of the total space that is defined. Since any number of set variables, say n, can be in a single sentence, the space defined can be said to be a n-dimensional vector space.

In abstract terms we could write an example stimulus-response pair as (Ss1: Sr2), where Ss1=What is ( ).e23? and Sr2=( ).e23 is a color.

By combining the idea of sentence transformation and abstraction, an Abstract Association is produced. The ability to store abstract associations is a key part of the intelligence model. When the abstractions are deductive, the subset of Abstract Association is termed a Deductive Association.

The AAS Model Applied to Human Intelligence

The Associative Abstraction Sensory Model describes how humans learn language and are able to produce intelligent dialogs. The latter is more than just memory and association. Human beings respond differently in different situations, solve problems and even have their own agendas. The following discussion begins by introducing the model for cognition. That is followed by an explanation of how language is learned, and finally how this model is extended to produce directed dialogs.

Cognitive Model

Figure 1:
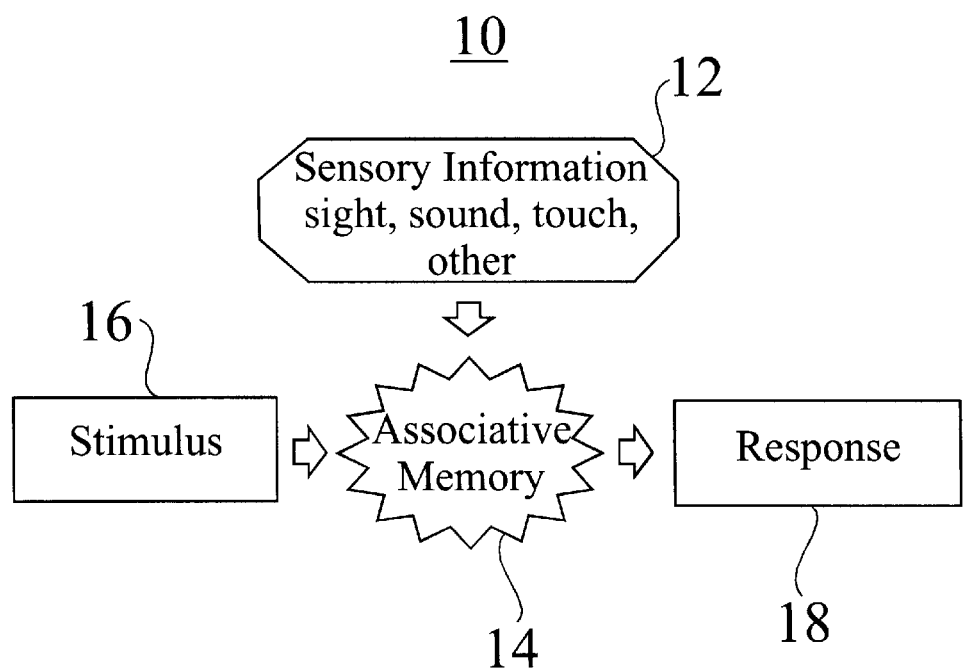
FIG. 1 is a schematic diagram of the Cognitive Model—a model of the process of "knowing" used as a basis for the present invention.

FIG. 1 schematically describes the Cognitive Model 10 of learning used in the present invention. Human beings learn language at an early age, at first by simply mimicking the adults or older children around them. Parrots can do the same thing. Parrots can learn that when they hear a certain pattern of sounds, another pattern of sounds is expected. What differentiates humans at a very early age is the ability to detect patterns in the sequence of sounds and to associate those patterns with real-world objects and situations (although many mammals and birds apparently have some pattern-using capability).

This ability is illustrated in FIG. 1. Sensory information 12, e.g., sight, sound, touch, etc., is associated with things in the real world and stored in a person's associative memory 14. For example, if a parent points at a chair and says "this is a chair" the child associates that sentence with sensory information, in this case a mental picture of the chair, how it feels to the touch etc.

Soon the child notices something else. When the parent does the same thing with a table instead of chair and says "this is a table," the child (unconsciously) notices that it is almost the same sentence with the word chair replaced by the word table. The brain, ever on the lookout for ways to store information compactly, stores the pattern "this is a X." He or she notes that X can be either a chair or a table.

If a question is asked (stimulus 16) such as: "What is this?" and the parent points to the table, the child will respond 18 with "this is a table."

The capability to store patterns, i.e., to abstract and to associate those abstractions with sensory memory is a primary basis for human intelligence. This implies that the greatest invention of humankind, language, is also the basis of intelligent thought. One cannot have human intelligence without a way of storing complex ideas and it is the combination of language, abstraction and its association with sensor memory that is the basis of that capability. In a mathematical model, X is an uninstantiated setVariable over the vector space {chair table}. The possible values of X are eigen words.

This model explains why a smell can evoke a specific memory. Of course seeing a picture or touching a surface can evoke memories too, but we are especially surprised when a smell can do this since we normally don't think of sensory memory as a part of intelligence.

An advocate of "deep knowledge" theories of intelligence might object that this model is too superficial to explain the capability of humans to comprehend complex subjects. There are two observations to be made here. First, this model is realistic precisely because it allows for superficial abstract associations. Second, it is realistic because it allows any level of complexity of knowledge to be built up through abstract association and, in particular, abstract deduction.

For example, consider an abstract stimulus-response pair (Ss1: Sr1), where Ss1=What is ( ).e23? and Sr1=( ).e23 is a color. In this case, ( ).e23 is the set of all colors. The visual memory 14 of colors completes the associative triad 12, 14, 18 shown in FIG. 1. A human being needs only this information to associate the word "red" as a word that can be used in a pattern. With only this much information one knows how to describe reality in the context of language. Deep knowledge, such as the fact that red is associated with a particular frequency in the optical spectrum, is not required for every day conversation, but can be added as a series of deductive associations. Thus human knowledge is a combination of inductive knowledge about language and deductive associations that connect language elements.

In general, there are many declarative patterns that can be used in association with any piece of knowledge. In recognition of this fact, the AAS model organizes information in bundles called the "context" that allows information on specific subjects to be efficiently processed by grouping together related associations and patterns. It might be that this is an unnecessary step and a disadvantage of the model, but experiential knowledge suggests that this is the process the brain uses to organize information. Everyone has had the experience of being deep in a conversation and had the context abruptly switch away to a new subject. There is a definite feeling of energy being expended to bring this new context to the fore so that cognition can take place effectively. The processes of the present invention are not merely methods for processing information efficiently but, with extension, also serve as a way of directing comprehension and discourse.

Every algorithm in the AAS model is also an information compression and retrieval method. If intelligence is the outcome (perhaps inevitable) of evolution finding ways of storing and retrieving large amounts of information necessary for survival in the brain, the AAS model simulates that. It may be that life develops intelligence only when situations arise that give a survival advantage to processing and storing large amounts of information.

Learning Language

After linguist Noam Chomsky suggested that language might be unlearnable, linguist-philospher E. Gold produced a logical proof which concluded that natural language grammar could not be inductively discovered, even in theory. This has led to a widespread belief that human natural language ability is innate, implying the human brain has detailed knowledge of grammar at birth—the so-called Universal Grammar.

What Gold failed to realize was that his proof is only true if learning is unstructured. Clearly, sending a six year old child into a graduate class in quantum physics would not result in the child learning anything about physics. Likewise, a child cannot learn grammar if he or she is simply handed one of the classics in literature. Learning requires structure and the hallmarks of that structure or two-fold. First, there must be a period initially in which there is interaction with a teacher. Second, simple structures and ideas must precede complex structures and ideas. Gold's proof fails when the actual mechanisms of human learning are introduced. The fact that learning in children always starts with interaction with other human beings is not merely an accident of convenience. From the viewpoint of the theory of this invention, it is of profound significance. It is at this stage that stimulus-response pairs are being learned. The association between stimulus and response that is the basis for comprehension.

Implementation of the AAS Model

FIG. 2 is schematic diagram depicting the overall processes which implement the AAS model 20. Discussion and figures presented later describe a preferred embodiment of ADAM program flow in a computer.

FIG. 2 shows inputs as speech 40 to a speech recognizer 41. A person skilled in the art will appreciate that a keyboard or other reader may be used as an input device. FIG. 2 is helpful in understanding the process by which a learned stimulus is able to produce an intelligent response from the invention. The speech recognizer 41 and the (text to speech) speech synthesizer 26 are generally known and not part of this invention. Therefore, they are not described in detail in this Specification. However the effectiveness of these modules are increased by ADAM technology. A speech recognizer can understand more words if it has an expectation of what is to be said, based on the current context. Likewise, a Speech Synthesizer can be made more understandable by subtle modifications of the words, such as emphasis, that is possible through understanding of the meaning contained in the language provided by ADAM technology.

The upper part of the diagram in FIG. 2 is concerned with producing a Concept and placing it on the Stack 24. A Stack 24 is simply a list of Concepts, which are normally accessed from the top-down. This process is driven by (1) the text string 50 produced by the Speech Recognizer and (2) a module called the Dialog Supervisor 36.

When a text string 50 is received from the Speech Recognizer 41 it is converted 42 to an instantiation of an abstract concept (or Concept) and handed to the Dialog supervisor 36. A primary function of the Dialog Supervisor 36 is to recognize the current context of the dialog. It does this by searching the Contextual Database 32. The Contextual Database 32 (which can be edited by an external program called the Context Editor) contains information that the Dialog Supervisor 36 can use to actively direct the flow of the dialog. The default action is simply to respond to a stimulus 16, for example in answering a question. The Dialog Supervisor 36 can use its knowledge of context to load the Speech Recognizer 41 with words and grammars that are expected in the current context.

To respond to a stimulus 16, the stimulus 16 is abstracted from the input text string 50 and the Pattern Buffer 34 is searched for an identical abstract stimulus 16. When one is found, a copy of the associated response pattern is created and instantiated with any words found in the original stimulus 16. (The Pattern Buffer 34 contains information about which words are identical in both the abstract stimulus and the abstract response patterns.) At this point, a response 18 has been created with usually only a partial instantiation.

The Pattern Buffer 34 also contains inferences as abstractions, although there are stricter rules about what can be abstracted as an inference in the Pattern Buffer 34. If the response pattern is not completely instantiated, the inference patterns are instantiated and "fired." Firing an inference means that the Conceptual Database 30 is searched to see if the instantiated inference is contained there. This mechanism is very useful because it can resolve ambiguities and simulate deductive reasoning.

Another mechanism used is called "mapping." Mapping 44 is the association of patterns of instantiation with stimulus-response pairs. For example the question "what is 2 plus 3?" is a mapping problem since it maps 2 and 3 into 5 by associating it with a certain pattern. The program stores a large selection of mapping algorithms and "learns" how to map by finding the best algorithm during training.

Another mechanism is called an "Action." This is a facility for associating an abstraction with an action that can be performed by a computer such as reading a file.

Once the Concept is generated, disambiguated and any actions implemented, it is placed on the Stack 24.

Supervising the total process is a Goal Processor 22. The Goal Processor normally takes concepts off of the Stack 24, translates them into a text string 50 (with any instructions on emphasis and timing) and hands them to the Speech Synthesizer 41. The Goal Processor 22 handles timing issues involved in producing a natural dialog. It also can interrupt human-machine dialogs when external issues arise such as low battery power or meta-goals such as a need for certain kinds of information. Many applications require that ADAM have a self identity, and that has implications for goals that are handled by the Goal Processor 22.

FIG. 3 reveals a flow diagram depicting a process 51 by which a computer system, for example ADAM, "reads" an input text stream 50. In the current invention, a computer system learns by reading written language or hearing spoken language. This action simulates the interactive learning phase of humans. In the instant AAS model, comprehending language is a process that drives the stimulus-response pairings 16, 18 in reverse.

In FIG. 3, the input text stream 50 from a speech recognizer 41, or other input device, is converted to sentences 52. As each sentence is read by the system, a search is made of a conceptual data base 30, comprising an eigen directory 54 and a pattern directory 56, to find a learned stimulus 16 that would produce that sentence. That is, the reading process 51 interprets each sentence as an answer to a question, simulating an early interactive learning experience and bringing forth sensory associations made at that time. Once that link is completed the computer can "understand" the input speech 40 or written material in terms of links already learned. One can see from this why reading material on a totally unfamiliar subject is difficult. In that case, there are few links, even on an abstract level, that lead back to a stimulus 16. The process of following these links backwards enables one to answer the question "what was the topic of this material?" Without some links to follow back to a stimulus 16, the question is almost impossible to answer. This observation serves to refute the common AI theory that reading is just a translation process from strings of symbols into "mentalese." It also serves to explain why reading can be such an enjoyable and vivid experience. As shown in FIG. 2, following association pairs backwards can trigger sensory memories.

Besides obtaining a response 18 to a link back to a stimulus 16, a response 18 to a response link, that is, a deductive association link, can also be stimulated from reading. This experience may not be nearly as emotionally rewarding since there is no sensory memory attached. The AAS model 20 uses deductive association to make knowledge unambiguous and to make it declarative and explicit. This process eliminates the sometimes "shorthand" characteristic of language (e.g., the use of pronouns) and makes the conceptual knowledge contained in language explicitly available in memory as Concepts (recall the definition of a Concept from above).

Learning Language

Language learning in the AAS model is accomplished by structured, interactive induction. Early training of a computer to implement the model consists of inputting sentence pairs which are analyzed to produce abstract information about language. No specific world knowledge is stored in the computer at this stage since it is later abstracted from input patterns.

It is at the early training stage that eigen vector sets are produced by noticing similarities between sentences. Once eigen vector sets are created, the next step is to create and store simple patterns using eigen vectors as markers. As with humans, it is important that only simple grammatical patterns are used at this stage. The simple patterns are used as the basis of creating more complex patterns later. This structured way of learning grammar is what makes Golds "proof," that inductive learning of grammar is impossible, invalid.

Following the early learning stage, more complex grammars are introduced. The AASM automatically uses the simple patterns to build more complex patterns. The patterns are stored in memory as tree structures with a pattern representing the central abstract concept of the sentence, being the root of the tree. Complex patterns are created from simple patterns by using two simple rules: (1) No pattern can exist twice in memory and, after the first version is created, only a unique symbol for that pattern can be used; and (2) no pattern can contain a sub-pattern without explicitly containing the unique symbol for that pattern.

The last learning stage is creation of a data base of world knowledge. Since grammar is now learned, inputting world knowledge is done either by human interaction or reading in text. The result is a list of Concepts called the Conceptual Database 30. The stages of learning are summarized in Table One. Note that this method does not require any pre-existing knowledge of language or grammar.

TABLE 1

Stages of Computer Learning

| Stage | Method |
|---|---|
| Eigen vector creation | Sentences of the same type are differentially compared to produce eigen vectors. |
| Grammatically simple abstraction | Eigen vectors are used to abstract sentences into patterns that contain simple grammars |
| Complex grammar abstraction | Eigen vectors and simple grammars are used to produce abstractions that contain complex grammars. |
| World-knowledge concept creation | Interaction with humans or reading text to create a conceptual database that contains world knowledge. |

Abstract Association

The mechanism for association is explained below. The idea of transforming one sentence into another was described above. It is not practical to store links between sentences themselves because that would result in a near-infinite number of links. However, if the association were made between abstractions, the number of links necessary would be dramatically reduced. Consider the following example in which the notation for a stimulus sentence has been simplified from Ss to S and notation for a response sentence has been simplified from Sr to R:

S1=What is a rose? R1=A rose is a flower.

If the link (S1: S2) is stored, then every time the question "What is a Rose?" is asked, it could be answered. That's not very useful if one wants a general understanding, not to speak of the memory required. But if the following were stored:

S1=What is a ( ).e34? R1=A ( )e.34 is a ( )e.56;

now the association (S1: R1) applies in a large number of cases, especially if each setVariable is allowed to be instantiated with anything included sub-patterns. (S1: R1) could apply to the following: S1=What is the name of a large prehistoric lizard? R1=A large prehistoric lizard is a dinosaur; and to any number of sentence pairs that ask "what is."

Mathematical Theory

In language, the smallest atom of meaning is a single word. Since the present invention is based on a language-independent theory, a word can be any series of characters or a symbol. The theory does not depend on the particular words that are chosen, but how those words are used to convey meaning. As discussed before, the meaning is captured by abstraction and association. If the set of all possible words in any particular language is S then a particular sentence is an ordered set, or vector, in the space given by S.

A key concept is the idea of sentence "differencing." From a mathematical point of view, this simple concept allows one to transform grammar from a process into a well-defined series of "rotations" in a vector space. Let us represent an ordered list of words of length k by the following equation:

$$S_n = (M_{1ij}W_{1j}, M_{2ij}W_{2j}, \ldots Mk_{ij}Wk_j)$$ Equation 9

Where $M_{1ij}$ is a matrix rotation and $W_{1j}$ is a word vector. We use the convention that $M_{1ij}W_{1j}$ is a sum over j; that is, repeated indices are summed. The elements of M can only have the value 1 or 0. Thus for each value of n, M selects a word from its vector space. The $Wk_j$ word can be a "null word"—that is, no word—but there are restrictions of how many null words are allowed. See below.

Using the above expressions, a sentence is defined as a set of k orthogonal rotations in k vector spaces. Some vectors spaces only contain one word. In that case the associated matrix is equal to 1. It is important to note that the vector spaces are dynamically modified by extending the number of dimensions. This reflects the fact that this is a learning model.

The first objective of this mathematical theory is to find a way to represent similar sentences. The definition of a similar sentence is: N sentences can be described as a series of rotations given by Equation 9.

It is important to represent a similar sentence because through this mechanism, we can represent changes in close meanings as simple mathematical operations. For example, buying a yellow car is similar to buying a red car (yellow red). The fact that a human has two eyes is similar to the fact that a monkey has two eyes (human monkey). Thus we can rotate through humans into monkeys while keeping the number of eyes constant. Of course, there are many possible rotations that relate humans to monkeys. It is the sum total of all rotations that provide a basis for machine understanding. A key part of understanding is the ability to do abstraction and analogy. If (humans monkeys) can have two eyes and are bipeds, the machine can reason that perhaps birds have two eyes by noticing that birds occupy the same vector space as human and monkeys while the number of legs is kept constant.

If only one word vector has a null member, all sentences are stored as similar sentences. The space in which the rotations take place is called "real space" as differentiated from "pattern space."

In the computer, there is a "working memory" that stores raw input as lists of similar sentences. It is from this raw material that abstract knowledge is created.

Creating Eigen Vectors

If, in the pair of stimulus-response sentences (Sn: Rm) there is one and only one unique rotation matrix, then the vector space associated with that rotation matrix is called an eigen vector space. Eigen vector spaces form a preferential orientation in the word space. It is the existence of a way to create these vectors that allow us to separate language from content. A way of thinking about this is that creating eigen vectors creates a set of preferential vectors in an otherwise unstructured data space. The following terms are repeated here again for convenience of the reader:

A setVariable is a variable that varies over a particular eigen vector space and has the notation: ( ).$e_n$ where n=nth eigen vector space.

A particular value w of the setVariable is represented by (w).$e_n$

A pattern is created by replacing the eigen value by its corresponding setVariable. Recall that this process is called Abstraction.

A Functor (f) is a way of expressing a sentence by explicitly separating eigen values and patterns. A "complete" sentence expressed as one or more functions is called a Concept (C).

$f$=<(argument list)$p$>*

*The less than and greater than signs are used as delimiters, not as logic symbols.

Element p is a pointer to a pattern. The argument list can be either eigen values or functions. The expression is called the canonical form for representing concepts.

The Conceptual Database 30 contains Concepts created by reading in text or processing speech input 40. Concepts are created by de-constructing sentences into patterns and eigen words. The Conceptual Database 30 is a repository of knowledge.

The Pattern Buffer 34 though not a repository of knowledge, is as important. The Pattern Buffer 34 does not have specific knowledge about the real world. That information is relegated to the Conceptual Database 30. The Pattern Buffer 34 contains information about how to extract information from the Conceptual Database 30. It contains information on the following topics:

1. How to express a response to an abstract input.
2. How to look up logical inferences to remove ambiguity or substantiate a statement.
3. How to perform an action if one is required.

The separation of language in the pattern buffer 34 and knowledge in the conceptual database 30 has the following benefits: 1) it allows knowledge about language to be applied to multiple domains; 2) it drastically lowers memory requirements since knowledge is independent from methods of relating that knowledge to language.

Referring to FIG. 3, an example of construction of a concept follows. The following text is read into the computer (ADAM):

Jack and Jill went up the hill to fetch a pail of water.

Reading consists of the following process: dividing the text string 50 into sentences 52; converting the sentences into concepts. In this example the above sentence is converted into a concept having a set of two functions, C1: (f1 f2) which is abstracted as follows (the digits identifying the eigen vector spaces and pointers being arbitrary):

$C1:(<((Jack Jill ).e6 (went).e14 (hill ).e13)p2.1><((pail ).e16 (water).e8)g1.1>)$ In the above expression, the pointer g1.1 in the second Functor refers to the following pattern:

$g1.1: (<(( ).e16)c2.1><(( ).e8)c3.1>)$ which also contains the following pattern for c3.1: c3.1: ((of).c ( ).e8).

The pattern referred to by the first pointer p2.1 in the first Functor is:

$p2.1: (( ).e6 ( ).e14$ up the $( ).e13)$

Each of these patterns are stored only once in a pattern dictionary. Concepts can be stored in memory very efficiently in the Conceptual Data Base by only noting their pattern and eigen values.

In order to retrieve the information now stored in the Pattern Buffer 34 and the Conceptual Database 30, a stimulus 16 is entered into the computer, for example, by a person:

Stimulus: What is in the pail? Computer (ADAM): The pail contains water.

ADAM "knows" that the pail contains water because it recognized the pattern g1.1 which embodies the concept of an object containing something and, in addition, can generate a way of verbalizing that concept as a response to the question.

If this seems confusing, remember that g1.1 can also be part of a S-R pair. It is the information contained in the S-R pairs that allows the program to know how to answer questions even when information is embedded inside sub-units of the language. Compare this method with traditional parsing methods which depend on static identification of parts of speech. In real language, the part of speech of any particular work can change by simply embedding the sentence it is contained within inside a larger unit. For example, in the sentence "IBM plans to buy a plant in Kansas," the word "plans" is a verb. In the sentence "IBM plans to buy in plant in Kansas were cancelled," the word "plans" is a noun. And yet the fact that IBM had plans to build a plant is true in both sentences. Thus, the identification of the part of speech of "plans" was no help at all.

In this example the sentence What is in the pail? was converted to a Concept. the necessary information to answer the question given the example concept was in the Pattern Buffer 34. Of course, the specific information in the pattern buffer could also be applied to many different sentences and situations. Note that in the pattern example $p2.1: (( ).e6 ( ).e14$ up the $( ).e13)$ The pointer p2.1 represents the abstraction of someone doing something up the something. The program has abstracted the specific details of identification, motion and place. This may seem an odd way of abstracting the idea, but the particular form of the abstraction in the computer does not matter. It only matters that it has found a way to store how to use language separate from the specific details. The abstraction process is completely automated. Once the program has found a way to abstract a particular idea, it will use that method consistently.

Those that have studied other methods of determining meaning may expect there to be a representation of knowledge somewhere. In this theory there is no representation. Meaning and knowledge comes from the process of responding to stimulus—not as a static computer representation. Anyone who has ever taken a test should understand this. The correct answers are generated as a process—not by simply opening a tap and letting them flow out.

An objection might be made that the same idea can be expressed in may ways. For example, Fran hit Mary and Mary was hit by Fran contain exactly the same idea and yet the patterns are different. One of the functions of the Pattern Buffer 34 is to obviate the differences. The Pattern Buffer 34 stores lists of patterns, not just a single pattern. From the Pattern Buffer 34, the program knows that either sentence is the answer to the stimulus Who hit Mary? In other words, one of the functions of the Pattern Buffer 34 is to record the duality of language.

Example of Implementation of the AAS Model

Referring again to FIG. 2 which shows an overview of the entire implementation of the AAS model works, the Goal Processor 22 is the highest level process. It takes sentences on the Stack 24 and hands them to the Speech Synthesizer 26. It is the responsibility of the Goal Processor 22 to mange real-time response to stimulus 16. The Goal Processor 22 can override verbal response if necessary.

There are three main databases that are maintained by the system. The Conceptual Database 30 contains real-world knowledge, the Contextual Database 32 can direct discourse in certain circumstances and the Pattern Buffer 34 which contains information about how to extract knowledge from the Conceptual Database 30.

FIG. 3A further expands the "Find Response Pattern" process 48 of FIGS. 2 and 3. An input sentence 110 obtained from the convert-to-sentences process 52 is handed to a routine 120, 122 which identifies all the eigen words $\{e_n \ldots e_m\}$ and patterns $\{( )p\}$ from the Conceptual and Contextual Databases 30, 32. The result is a Functor 122 or set of functions. The concept is abstracted by removing the eigen words and a search 124 is performed in the Pattern Buffer 34 for a matching abstraction. When a match is made, an abstract response is generated by following the links in the Pattern Buffer 34. Once found, a search 128 is made of the Conceptual Database 30. The eigen argument list 130 is created for the search. Some of the eigens $\{e_r \ldots e_s\}$ can come from the stimulus 16 and the rest are filled in by the found Concept 132. A sentence is created 134 from the eigen argument list and pattern 132. A test 126 is made to see if the sentence 110 is complete, i.e., all set variables have been instantiated. If true, an output sentence 112 is generated.

The output sentence 112 is placed on the stack 24, passed through the goal processor 22 to the speech synthesizer and delivered to the user by audio. Of course, the output sentence 112 may also be printed or reproduced by most known means.

Programming ADAM

FIG. 4 shows the modules describing three broad areas of capability and operability of the Automated Dialog Adaptive Machine (ADAM) 200, a preferred embodiment of this invention. The first module, Training 201, reveals how ADAM "learns" information input by a user. A second module, Interactive Dialog 202, describes ADAM's capability to do interactive, goal-driven dialog. Read Text Documents 203 module describes machine 200 reading and comprehension.

ADAM 200 is intended to simulate the human capability to converse and understand in a practical, efficient and useful way. The inventor views human intelligence as the result of several interlocking simulation processes that can be on programmed on a computer. The inventor does not claim that the described processes can simulate all capabilities of human intelligence, only that enough of this capability can be simulated to perform useful tasks.

ADAM 200, as does human intelligence, rests on six major pillars of information processing and together are the major innovations of this invention. These are: (1) Abstraction of information into patterns; (2) Association of stimulus and response patterns; (3) Abstraction of logical Inference; (4) Mapping of objects and abstract concepts into concrete reality; (5) Reasoning by analogy; and (6) Learning language and knowledge through training, reading and human interaction Training: Process Inputs FIG. 4A shows how natural language information 50, input in training mode 201, interfaces with the data base 30, 32, 34 and is retrieved for use in ADAM 200.

FIG. 4B depicts how questions about information in the data base, input in natural language 50 in interactive dialog mode 202 interface with the data base 30, 32, 34 to produce an output of answers and data forms 206 from ADAM 200.

FIG. 5 shows that user inputs may be a stimulus 211, a response 212, an "if statement" 213 or an "else statement". The inputs may be conditioned in time 217. The user selects 218 the time 217 in which the condition should be applied relative to the time of the response. Note that this is not the tense of the condition, which can be different. This selection allows a comprehension engine to make an inference that takes into account the passage of time.

Link 220 allows creation of a data structure that defines how each of the user inputs 211, 212, 213, 214 link together.

The user selects 216 any external action 215 associated with a response 18. This ultimately creates an association between an abstraction and an action 215. For example, if an associated response 18 is "a wrench has been selected," the action 215 selected should be able to deal with the abstract notion of selecting something. The action 215 should deduce from a particular stimulus 16, the statement "select a wrench." This statement is the one which would elicit the response 18 "a wrench has been selected."

The user selects 223 between non-local and several choices of locality 225. "Locality" 225 relates to identifying a concept as finite in space and time. A person is "local" because the concept of a specific human being is local to where that person is in space and time. On the other hand the concept of a human being is non-local. That is, the attributes of a human being are independent of space and time. If the response was "Jane has blue eyes," this is a local statement since it is only true for a particular point in space and time, that is, where Jane is. However, if the response was "humans have two legs," that is a non-local statement since it is true for all humans everywhere.

Statements that should be labeled "local" are only statements that define a particular type of locality. The most important of these is the concept of a person. Example stimulus-response pairs that define the differences between people should be input in the training process. The main purpose of this is to allow ADAM 200 to disambiguate references. It also serves the purpose of being able to separate things in time and space.

The program should be established by the user in a practical language to identify reference tags for each locality. In English the non-local tags are: he, she, it, they. The user can create new information at any time associated with each of these tags but the tag names should be used consistently. This is important since the program keeps maps for different non-local objects for the purpose of disambiguation.

This aspect of training substitutes for the human experience of being able to map concrete objects with human senses as a part of reality. A baby learns to associate "mommy" with only one local object, for example, and that learning is eventually integrated into language about local objects.

Maps

During training, information about how to create a type of data object called a Map is created. A Map that describes how to create a Map is called a Meta Map. A Map is created when the user indicates he or she is introducing stimulus-response pairs 16, 18 about a local object or an external action 215. The user is allowed to identify a locality with a tag such as "he", "she", or "it" for convenience, although that is not necessary for proper functioning of the program. The information needed by the program is that stimulus-response pairs 16, 18 are about local objects and what kind of external action 215 is associated with the patterns being created.

During training, the user can "lock in" a particular locality. All examples then input while the training is "locked" are about one particular local object. The program uses this information to create an array of setVariable indexes called "discriminators." For example, if the user should input several stimulus-response pairs 16. 18 about someone named John, the program sees the setVariable for a male first name is being repeated while locked on a local object. It stores this information. Later, when the program detects any male first name, it creates a unique Map for this local object. The Map collects indexes into the Pattern Buffer 34 for a local object. This information is used to generate questions about a particular locality. For example, it could generate questions about a persons wife and children.

Another kind of Map is also created. When the program recognizes that it can predict a number in a pattern from another number stored in the same pattern, it associates the pattern with an algorithm for calculating the number. together with the position in the pattern the result should be stored. A routine called MapProcessor is called during comprehension. See the later discussion about the Read Text Documents 203 module. The routine can resolve automatically mathematics questions based on learned algorithms.

Database Applications

The technique used to create Maps is extended to data base applications. The program has tested algorithms until it could predict the results of examples it was given. A sentence input was "2 plus 3 is 5". The program applied a list of algorithms stored in memory until it succeeded in predicting the result. The program associates the correct algorithm with the pattern associated with the input sentence. Once it has found the way to return a correct answer, the program recalls the method when a similar sentence is entered. This technique is extended to any type of data.

Referring again to FIG. 4A, the data base application technique produces methods to extract data from a data base 30, 32, 34 based on examples given to ADAM 200 during training. FIG. 4B indicates that users can take advantage of this feature to find new relationships in their data bases.

Meta Maps

As shown in FIGS. 5 and 5A, when the user has identified a "local" object, it is stored in a Locality Meta Map 226. As previously discussed, examples of local objects are people, places and things. While a Map 228 is a data structure for storing an instance of an object, a Meta Map 226 stores data about how to differentiate between different kinds of mapping situations and how to tell the difference between different kinds of maps 228.

FIG. 5A contains a structure diagram for Meta Maps 226. Locality Meta Maps 226 have two kinds of data structures. Type (1) structure has indexes to Pattern Buffer entries that were made in training while in the "local" mode. These are stored to allow ADAM 200 to ask questions about local objects. The Pattern Buffer 34 contains abstracted stimulus-response pairs which have "locality". For example, upon being accessed by a new user, the program can access its Meta Map 227 about people to ask question about the user's marriage, family etc. It can do this because the Meta Map 227 tells ADAM 200 that a person has all these possibilities that are "local" to him or her. A second type (2) is a list of patterns, (empty set variables) and eigen words. Every time a Concept is added to memory (see Add Concept below) the locality maps are checked to see if there is a matching eigen word or setVariable. If there is a match, the Concept is added to a Map 228. The Maps 228 keeps track of particular instances of local objects. For one thing, this provides for efficient pronoun disambiguation.

Locality Meta Maps 226 are a specialized subclass of Meta Maps 227. Meta Maps 227 in general are used when there is a need to simulate a capability to predict. As described earlier, there are additional built-in maps 228 for mathematics and counting. For example, if a user asks "what is the square root of three?" the program may not at first know. But using the Meta Map's math algorithms, after shown examples, the program can predict the answer. In effect, ADAM 200 can learn to do math, on its own, in any language.

Another type of problem that Maps 228 can help solve is a counting problem. Suppose the program has been told there are three peas in a cup and now one has been taken out. How many peas are in the cup? This is a trivial problem for a person. A Map 228 can store the number of peas as a "local" characteristic of a cup and associate the change in this characteristic with the concept of taking something out of the cup. This process combines locality mapping with mathematical mapping.

The following examples concentrate on names and gender as a main way to disambiguate certain references. The example uses the notation S, R, %I where: S=stimulus 16; R=response 18; and %I=inference. ADAM 200 automatically abstracts the training examples input, so only representative S-R pairs 16, 18 need be entered.

An example in Table 2 below of a stimulus-response pair is labeled "She":

TABLE 2

| Stimulus-S | Response-R | Inference- % I |
| --- | --- | --- |
| What is your name? | My name is Jane. | Her name is Jane. |
| What is her name? | Her name is Jane. | Jane is female. |
| What is your gender? | I am female. | She is female. |
| What gender is Jane? | Jane is female. | |
| What gender is she? | She is female. | |

If the tag "She" is changed, the program will present the user with a list of eigens and asked which ones are constants for this type of non-locality. For this case the result would be as shown in Table 3 below.

TABLE 3

| Eigen | Constant |
| --- | --- |
| your | no |
| name | yes |
| Jane | no |
| her | yes |
| female | yes |
| gender | yes |
| she | yes |

Table 3 tells the program that the specific name (e.g., Jane) can change, but words like name, her, female, gender and she are fixed for this locality Meta Map 227. ADAM 200 uses this information to decide if a reference is being made. In the sentence "her pride was hurt," Adam would associate this sentence with a "she" Map that could contain other information about the local object—in this case a female human. If the question were asked, "whose pride was hurt," ADAM 200 would look for a statement like "X's pride was hurt," and it would look in the most recent "she" Map for an instantiation of X.

Training in this way results in a Meta Map 227 being created for each type of locality. Each Meta Map 227 can spawn a Map for a particular instance. In the example of "X" above, a Meta Map 227 is created which, among other things, establishes a list of eigen types for human names and gender. When these words are part of an input stimulus 16, a Meta Map 227 is created. ADAM 200 knows that two Maps refer to two different things because the specific eigen values are different. In the example above, the eigens that are not constant are used to differentiate between different objects of the same locality. Note in the example that this automatically handles names and points of view.

Process and Store Into Working Memory

Process and Store in Working Memory 219, causes user text strings to be tokenized and stored as lists of objects. The various types of text strings 50, that is, stimulus 16, response 18, "if . . . " 213, etc., are linked together in working memory. Working memory is temporary and serves to store user examples of stimulus-response links 220 and associated logic and action statements 215. These examples are used to build abstractions in pattern memory 30,32 and the pattern buffer 34.

FIG. 6 discloses a flow diagram for the processing and storing into working memory of user inputs 211–214. The user input string 230 is matched 231 to existing working memory 237. If there is no match, the user input string 230 is added working memory 237. If the difference 235 between the input string 230 and stored memory 237 is small, the user input string 230 is forced 236 to be equal to the closest match.

FIG. 7 shows the flow diagram describing the detailed process of working memory storage. User input 230 is compared with existing memory 237 and one data structure is created from both. The resulting structure replaces discrete words with rotation matrices that select individual words from a vector space. This is stated in equation form as follows:

$$w(i)=R(i, j)*E(j) \qquad \text{Equation 10}$$

where w(i) is a discrete word, R(i, j) is a rotation matrix and E(j) represents an eigen vector space.

As an example, assume E(j) is the vector space (Jane Alice Paula). If the program encountered the following two sentences: "Alice went to the store" and "Jane went to the store," the program would represent both sentences as the following three by three matrix:

$$\begin{matrix} 0 & 1 & 0 \\ 1 & 0 & 0 \\ 0 & 0 & 0 \end{matrix}$$

One can represent the idea of "someone" going to the store as a concept and with a simple, economic mathematical representation we can "rotate." The first row represents "Alice went to the store." The second row represents "Jane went to the store." The third row represents someone going to the store, but since no statement has been made about any of the three persons named, the row contains all zeros. The advantage of this representation is that it allows for abstraction and reasoning by analogy to an specific example. The matrix is stored in Working Memory 242.

Working memory 242 is a list of raw input data created during training. In working memory 242, sentences and clauses have been converted to arrays of objects containing hashed integers representing individual words. In addition, Working Memory 242 contains a rich set of links that give information on how to associate stimulus 16, response 18 and conditional links. Working Memory 242 is the raw data from which the abstract data in the Pattern Buffer 34 is created.

Pattern Seeker

Referring again to FIG. 5, the Pattern Seeker 240 finds simple patterns and stores them, leaving the stimulus: response pattern in the Pattern Buffer 34. For a given stimulus 16, the Pattern Seeker 240 finds responses 18 that have the following patterns: (1) the pattern contains one or more eigen sets; (2) the pattern has one or two words bounded by an eigen set and an eigen word.

The Pattern Buffer maintains the association lists between patterns. Patterns are categorized and flagged as stimulus, response, inference and action. The following convention is used:

s—stimulus
r—response
i—inference
a—action

A single element of a pattern buffer can be noted by:

$$((s(i,j)) (r1(m,n) i(p,q) A(s,t) \ldots ))$$

which mirrors closely the way it is stored in memory. Parentheses indicate a list, i.e., (a b) is a list of the subjects a and b. The integer indexes indicate the pattern and pattern level.

Any number of responses and inferences can be associated with a stimulus. For example:

$$((s45.2) (r23.1 \: r \: 35.3))$$

means that stimulus 45, second level is associated with two responses. Logically, this means that, in an abstract sense, that if the pattern s45.2 is detected, the "form" of the response (meaning not the actual content) can either be r23.1 or r35.2. However, if the association was actually $$((s45.2) ((r23.1 \: r \: 35.3)))$$

this means that the form of the response is r23.1 AND r35.2. In other words, both response are indicated for this response at the same time. Likewise, if an extra pair of parentheses surround a pair of inferences, this indicates that both must be true for the response to be true.

FIG. 8 depicts. in a flow diagram how Working Memory 242 is abstracted by the Pattern Seeker 240 into another form. The two sentences used as rotational matrix examples above are replaced by a pattern such as "( ).e34 went to the store." The ".e34" means that the variable ( ) is a member of a particular eigen set, in this case (Jane Alice Paula). This pattern is stored, not in Working Memory 242, but in the Pattern Buffer 34 or "pattern space."

Assume the user input 211–214 was the sentence "my family went to the store." "My family" is not a member of the eigen set .e34. In this case the Pattern Seeker 240 program would create the pattern {( ).e34 ( ).e56 } went to the store. Here, the postulated pattern ( ).e56 is the vector space ({my family}{my relatives} . . . ). The expression in brackets is called a vector set and is represented by the same rotational matrix structure. However, instead of being a rotation in eigen space, this is a rotation in "pattern" space. The word "pattern" is used to mean an empty setVariable and also lists of empty set variables.

There is a higher level of abstraction in which patterns having empty set variables can be represented as rotations in pattern space. Rotations in this higher space are called "analogies" because they may not always be true. These kinds of rotations can result in the program "speculating" about new relationships which can lead to interesting machine-human dialog. An early question put by ADAM 200 (in an early prototype) was "are Humans intelligent?"

Figure 9:
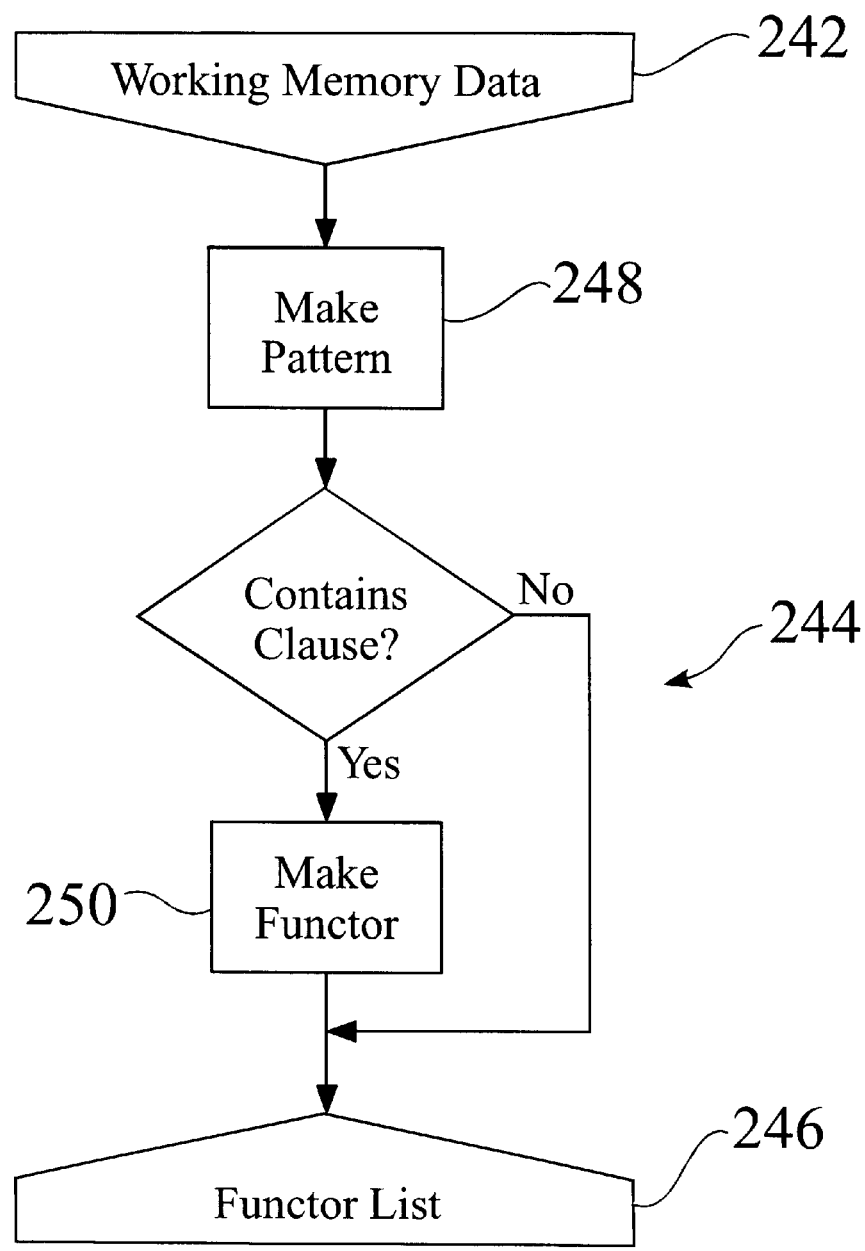

FIG. 9 is a further detailed flow diagram of Creating a Pattern process 244 shown in FIG. 8 flow diagram. As described above, a pattern is abstracted (made) from Working Memory 242 data. The abstracted pattern is searched for a "clause". A clause is defined as a sub-pattern within a sentence. Clauses are detected in two ways: (1) by comparing with known simpler patterns; (2) by recognizing that many clauses start with certain words like to, from and about. If the pattern "X is a Y" is known and the sentence "to the left is a house," is detected, it can be assumed that "to the left" is a clause. The program keeps a list of these words as a special type of eigen.

A Functor List 246 is an abstract form of a segment of Working Memory 242. It is similar to a Concept in that it can contain sub-patterns in the form of a Functor but is in an abstract form. Unlike a Concept, it does not contain eigen words, only the patterns for eigen words. A pattern is an empty setVariable and lists of empty set variables.

Following is an example of the creation of a Functor List 246 from a Working Memory segment 242. Working Memory segment: "The pail is full of water." This is abstracted to the Functor List: "The ( ).e4 is full <(( ).e7) p2.3>" where ( ).e4 is an empty setVariable and <(( ).e7) p2.3> is a Functor containing an empty setVariable.

Figure 10:
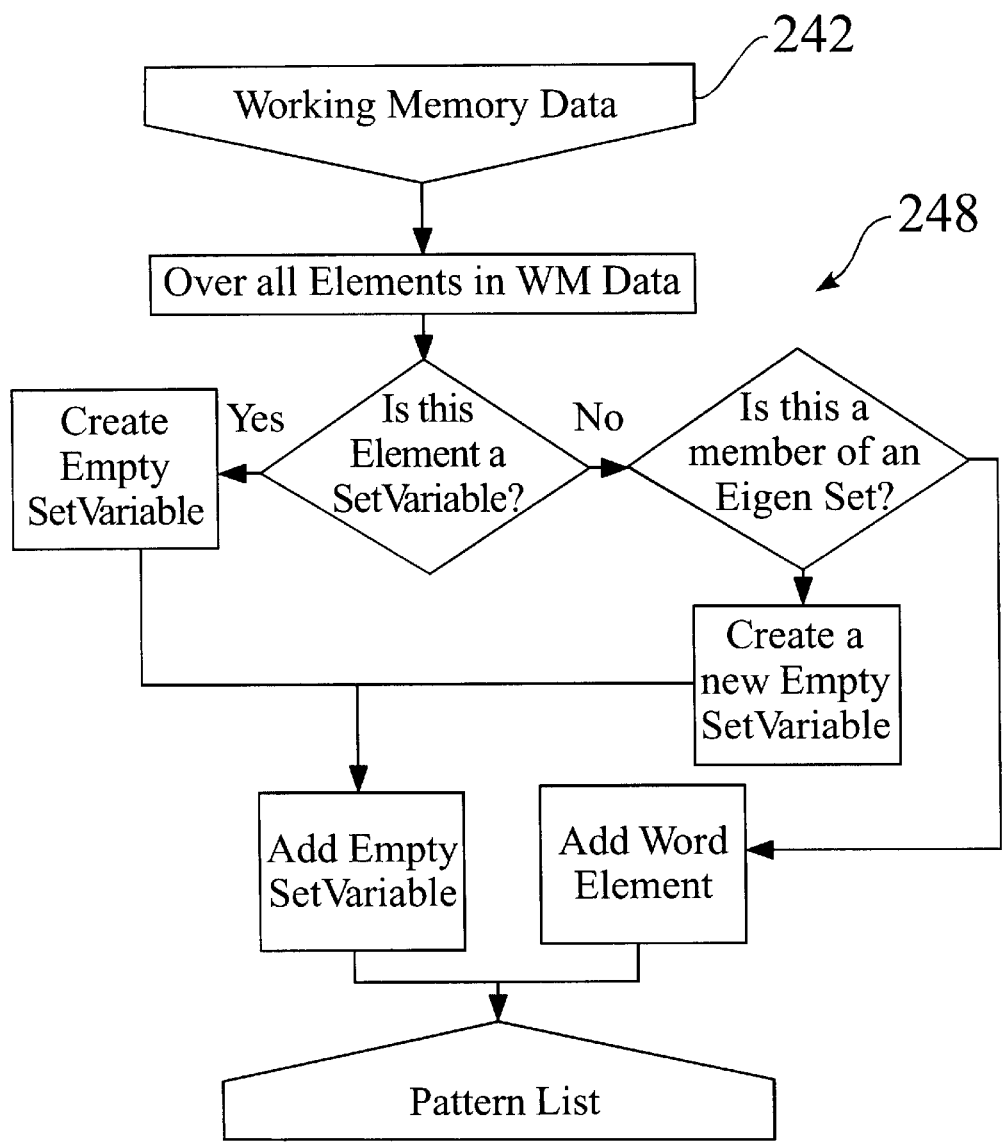

FIG. 10 is a further detailed flow diagram of the process of making a pattern 248 from a Working Memory 242 segment shown in FIG. 9.

Figure 11A:
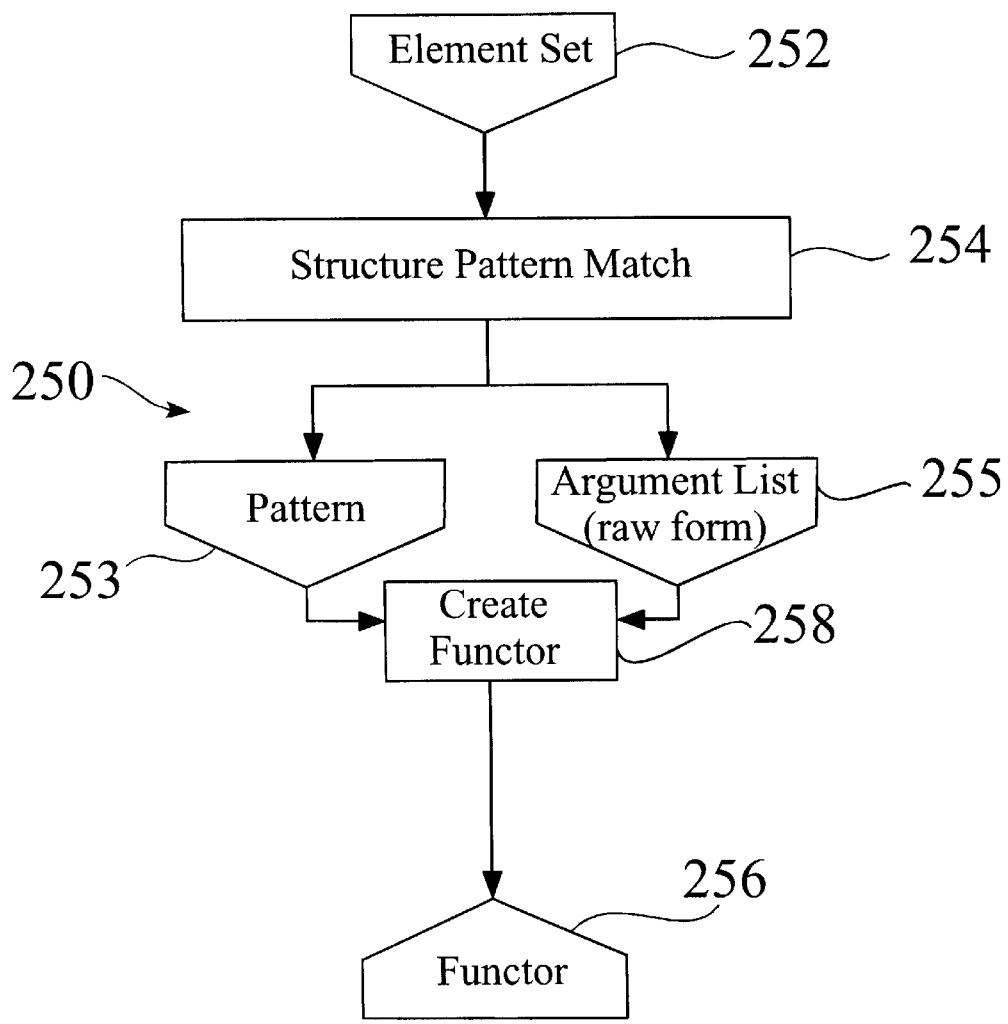
Figure 11B:
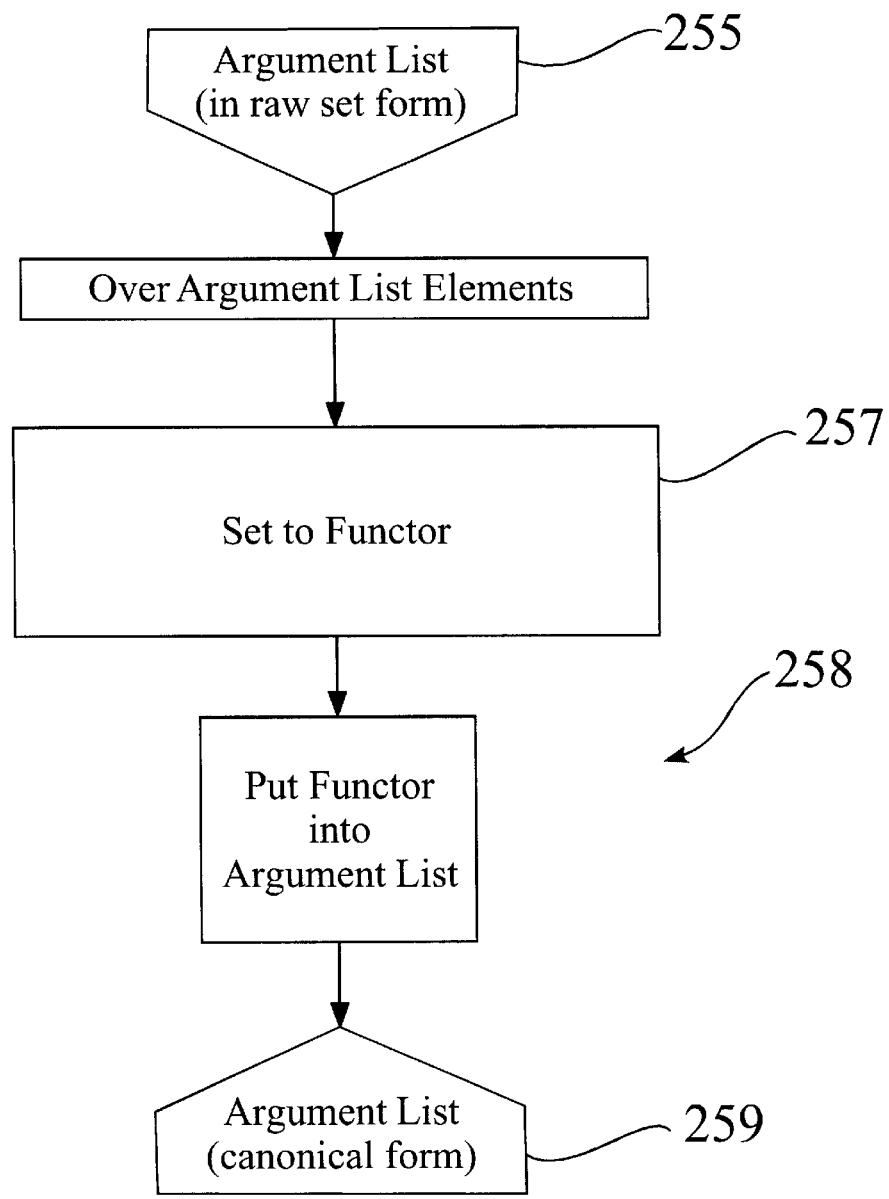

FIG. 11 is a further detailed flow diagram of the process 250 of making a Functor 256 as shown in FIG. 9. The element set 252 of the memory segment is processed by the Structure Pattern Match 254 to find an existing pattern that best matches the element set 252 or install a new pattern if no match is found. The objective of the Structure Pattern Match 254 is to create the raw form 256 of the Functor argument list 246 using the pattern found.

Creating a Functor 258 comprises the process depicted in FIG. 11A. The argument list 255 in raw set form is converted to Functors 257 and put into a canonical form of Argument List 259.

Figure 12:
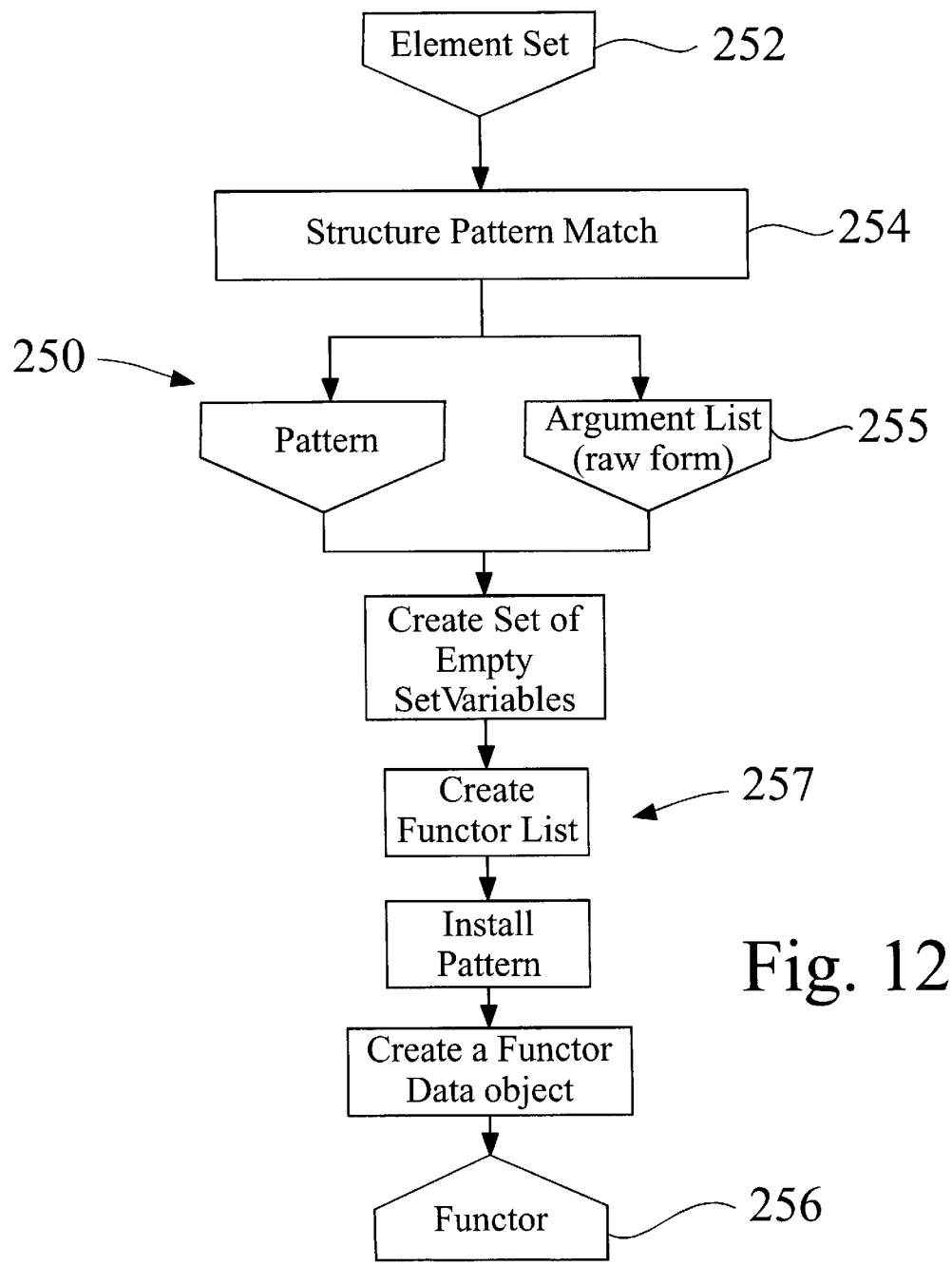

FIG. 12 presents additional detail of the process of creation of a Functor 256 from the element set 252 of the memory segment. FIG. 13 depicts details of the Structure Pattern Match 254 process. The best match 260 to the element set 252 is checked for a pattern 262 already existing. If one exists, the pattern and the element set 252 is kept as part of a raw argument list 266. If no pattern exists, a pattern is created and installed 264 with the element set 252 and then stored as a raw argument list 266.

Further details of the Structure Best Match 260 process are found in the flow diagram of FIG. 14. The best match patterns from the element set 252 are found 267. These best match patterns 267 are partitioned 268 into matching non-eigen words and sets of everything else. This "raw" argument list 266 is then converted into a Functor argument list 258 by substituting Functors 256 for the sets created by the partitioning 268. Continuing with the detailing of finding the best match pattern 267, FIG. 15 describes the flow leading to selection of the pattern 269.

Interactive Dialog

FIG. 4 reveals the Interactive Dialog module 202 of ADAM 200. FIG. 16 shows a diagram which describes the flow of interactive voice input 300 to a speaker-independent, continuous speech recognizer 302, external to ADAM 200. The person skilled in the art will recognize that other types of textual input devices may be used in place of verbal devices, for example, keyboard entry, scanned text, etc. The speech recognizer 302 returns a "Recognition Event 304."

The Recognition Event 304 is handled by ADAM 200 in a process that is described in FIG. 17. The Process Recognition Event 304 generates a response 312 to the user speech input 300, 302. The response 312 is in the form of a Concept data structure which is then placed on the stack 24.

In FIG. 18, the process flow for creating a sentence Functor set 310 is depicted. The elements 313 of the user's input 300, 302 are obtained by comparison to the language model 306. From these elements 313 a Concept is created 314. A Functor is made 316 which describes the Concept. The Functor is appended to the Concept.

Figure 19:
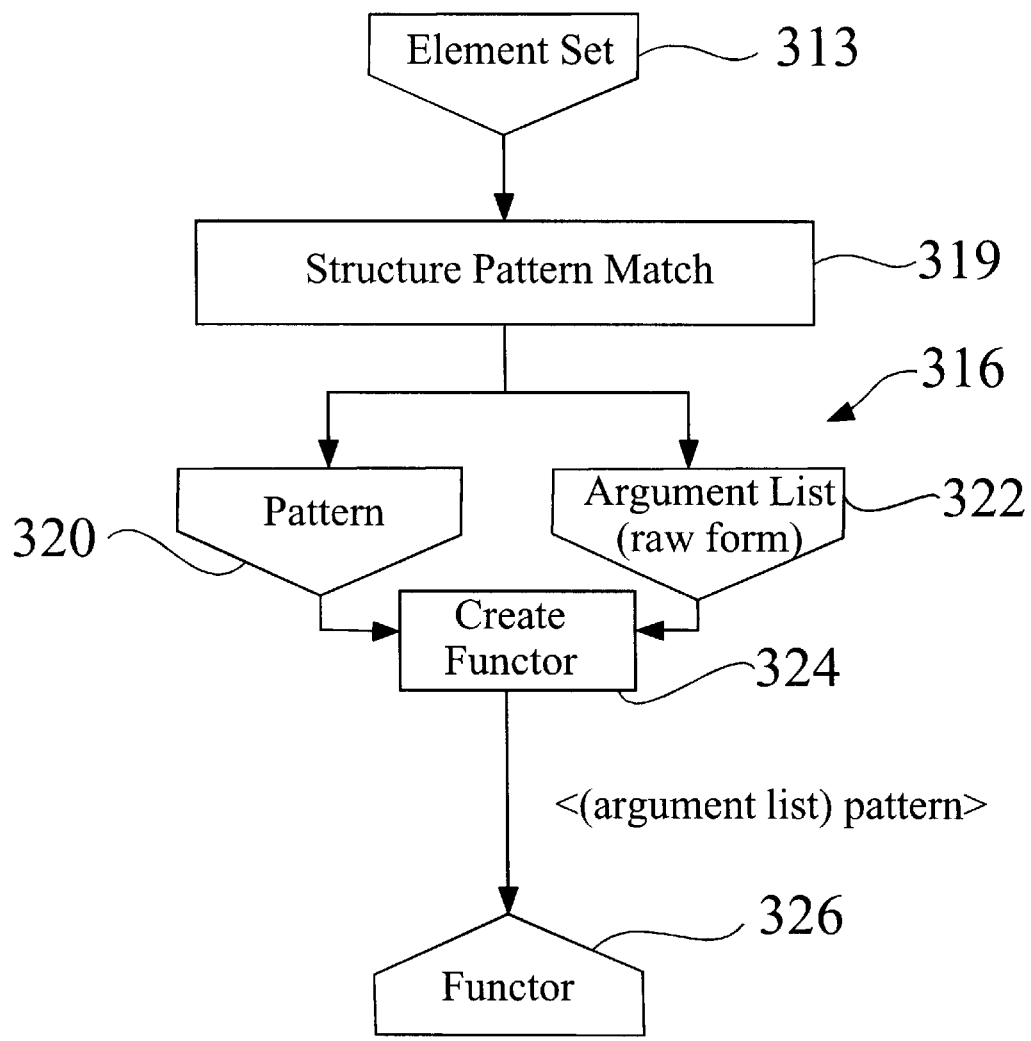
Figure 19A:
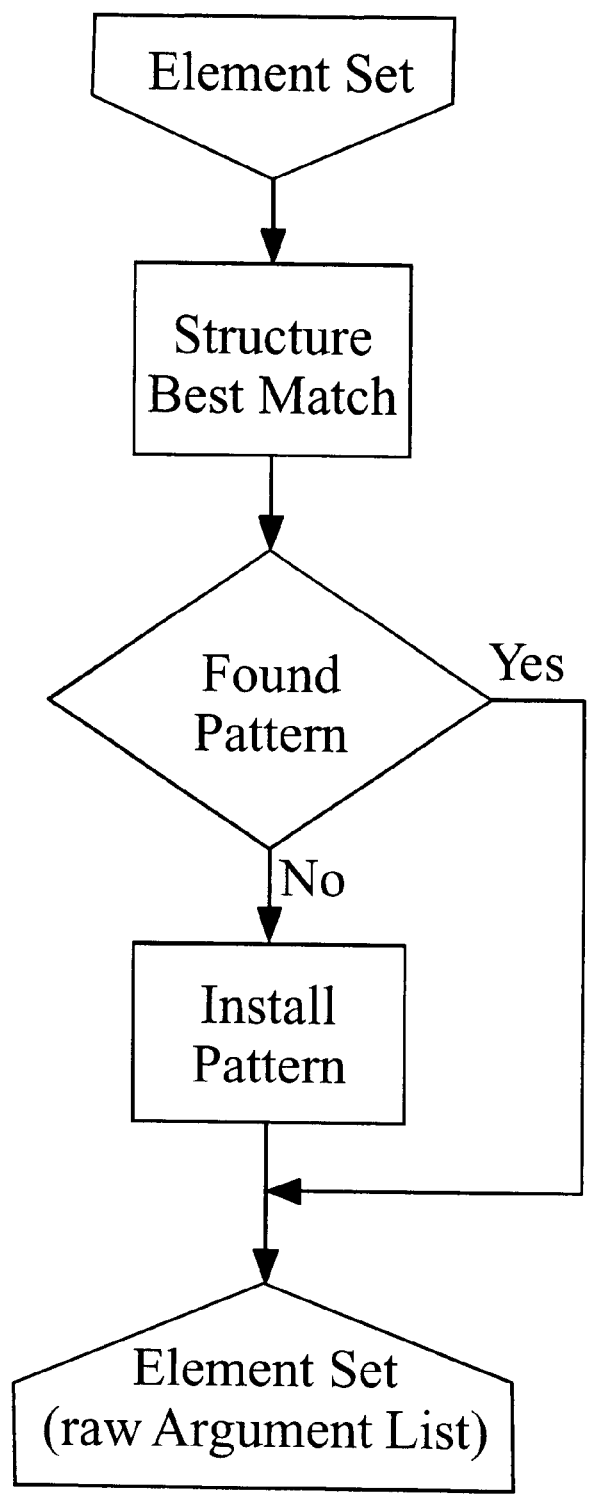
Figure 19B:
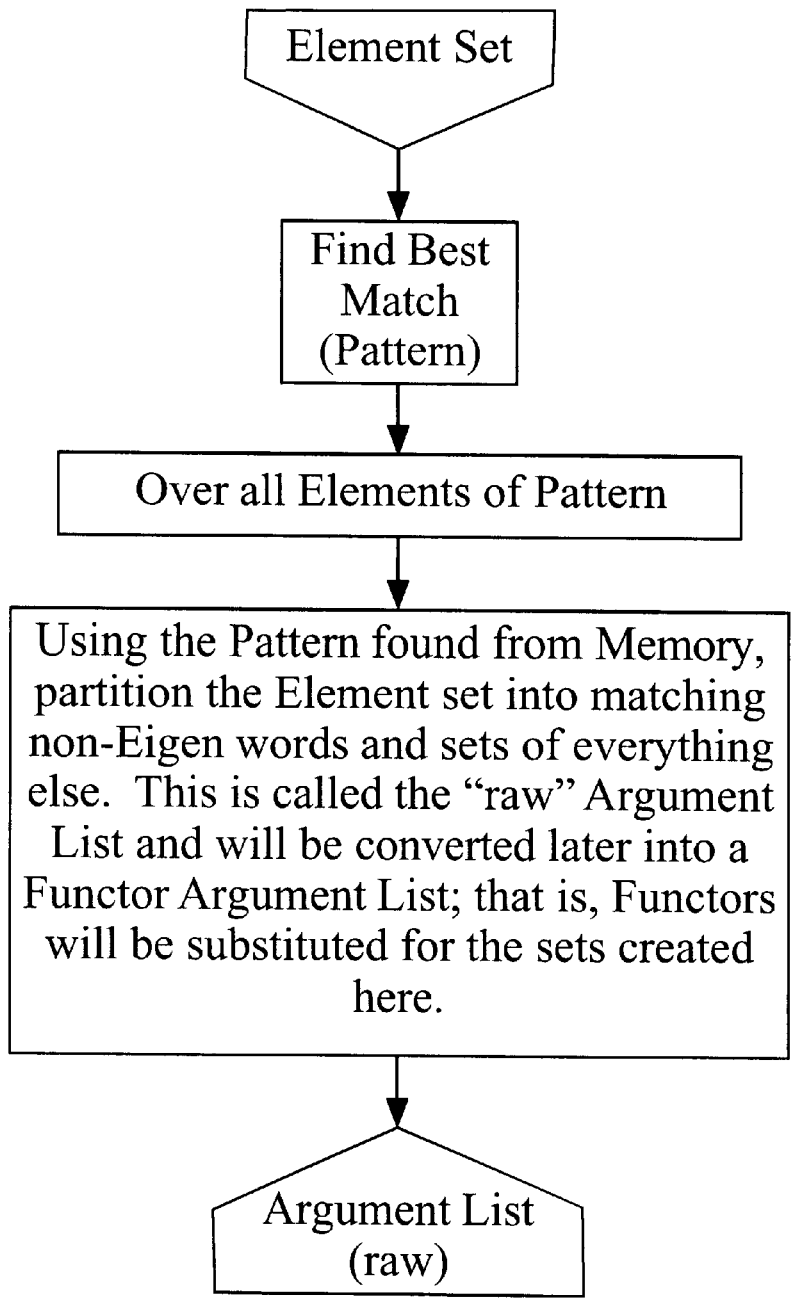
Figure 19C:
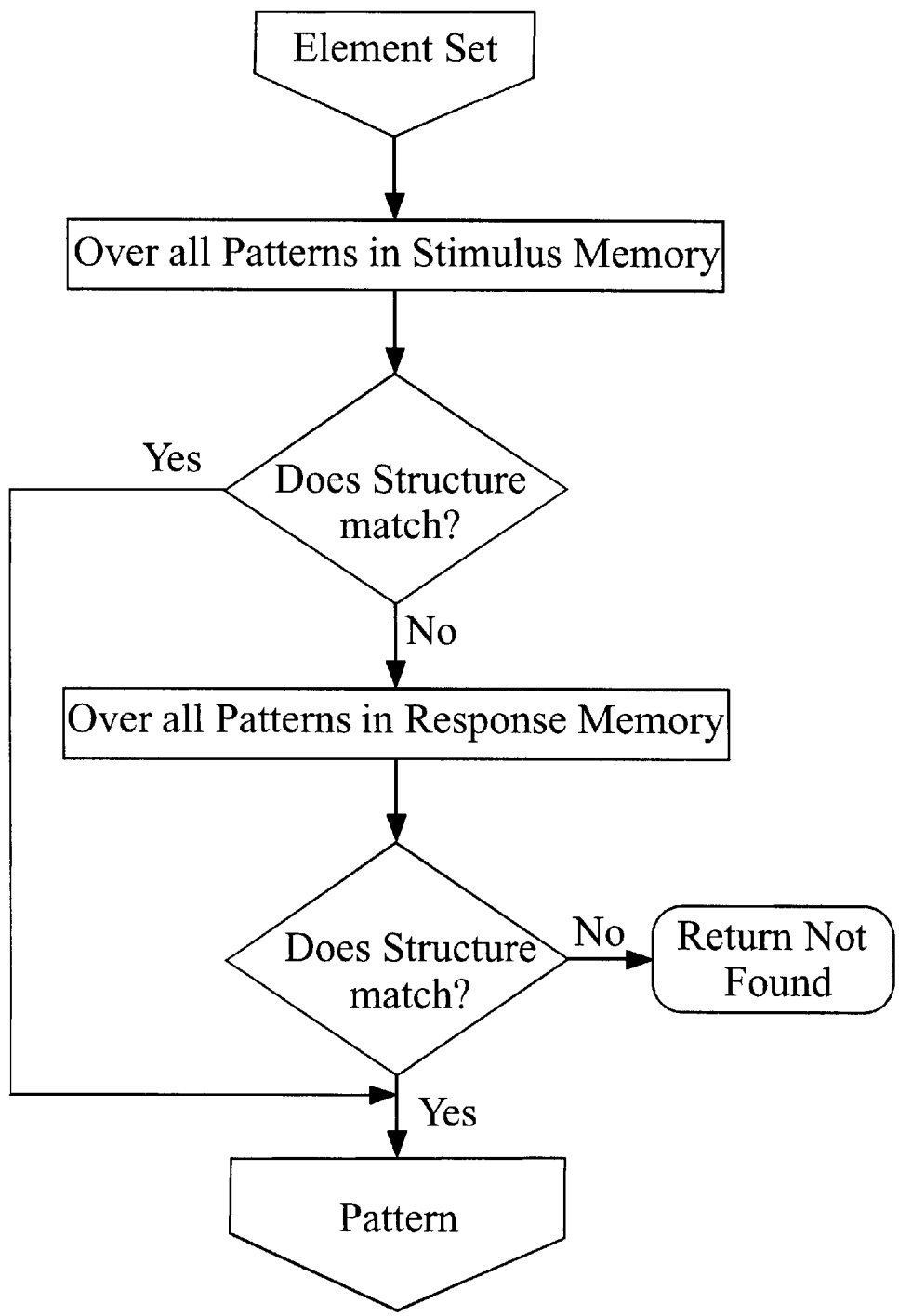
Figure 20:
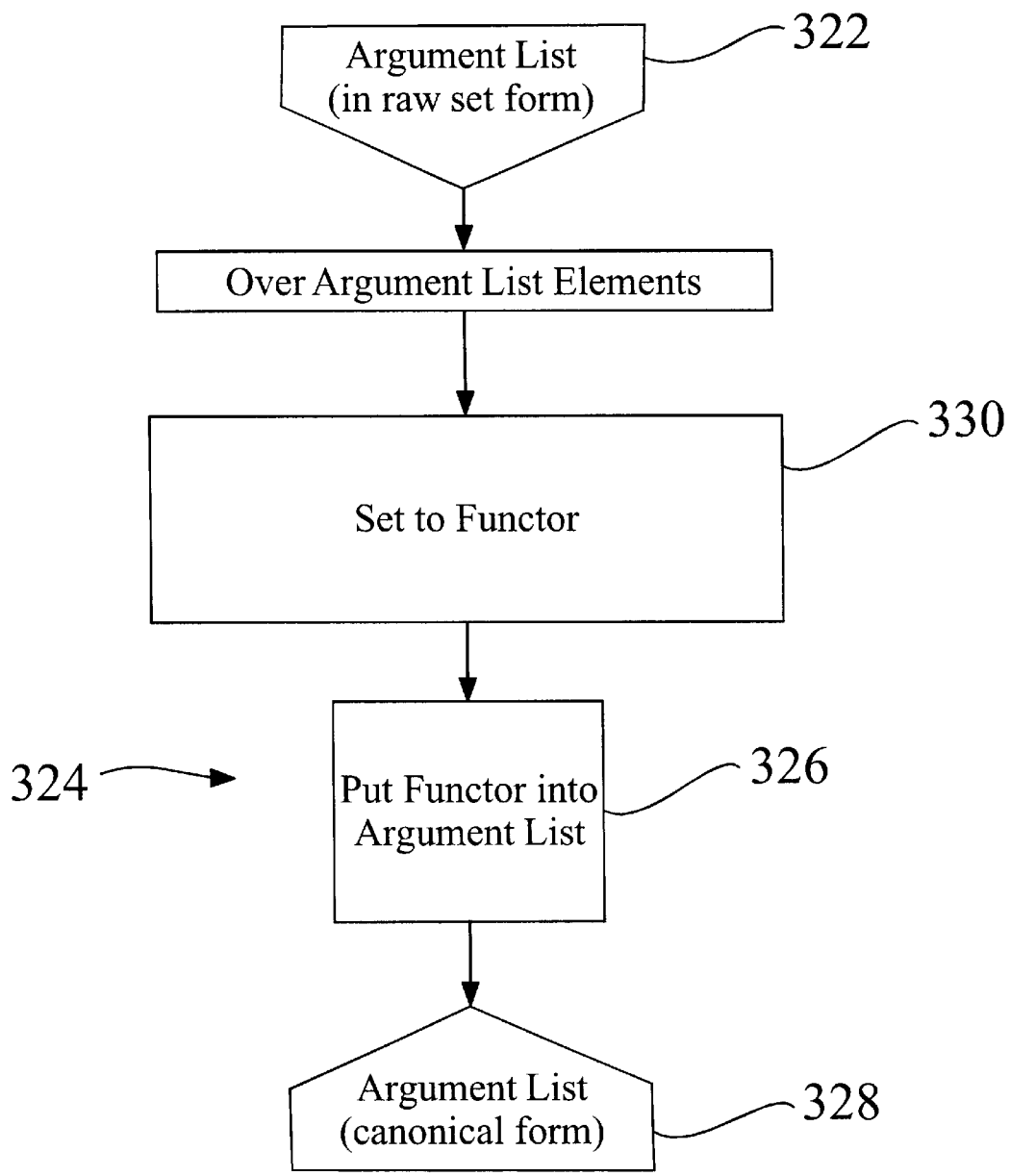

The process of making a Functor 316 from user input 313 is further detailed in FIG. 19. The process at this level is the same as for the Training module Make Function process 250 shown in FIG. 9. The further detail of Functor Creation 324 diagramed in FIG. 20, is the same process shown in FIG. 11 and 11A. The raw Argument List 322 is converted 326 to Functors and a canonical form of the Argument List 328 results.

Figure 21:
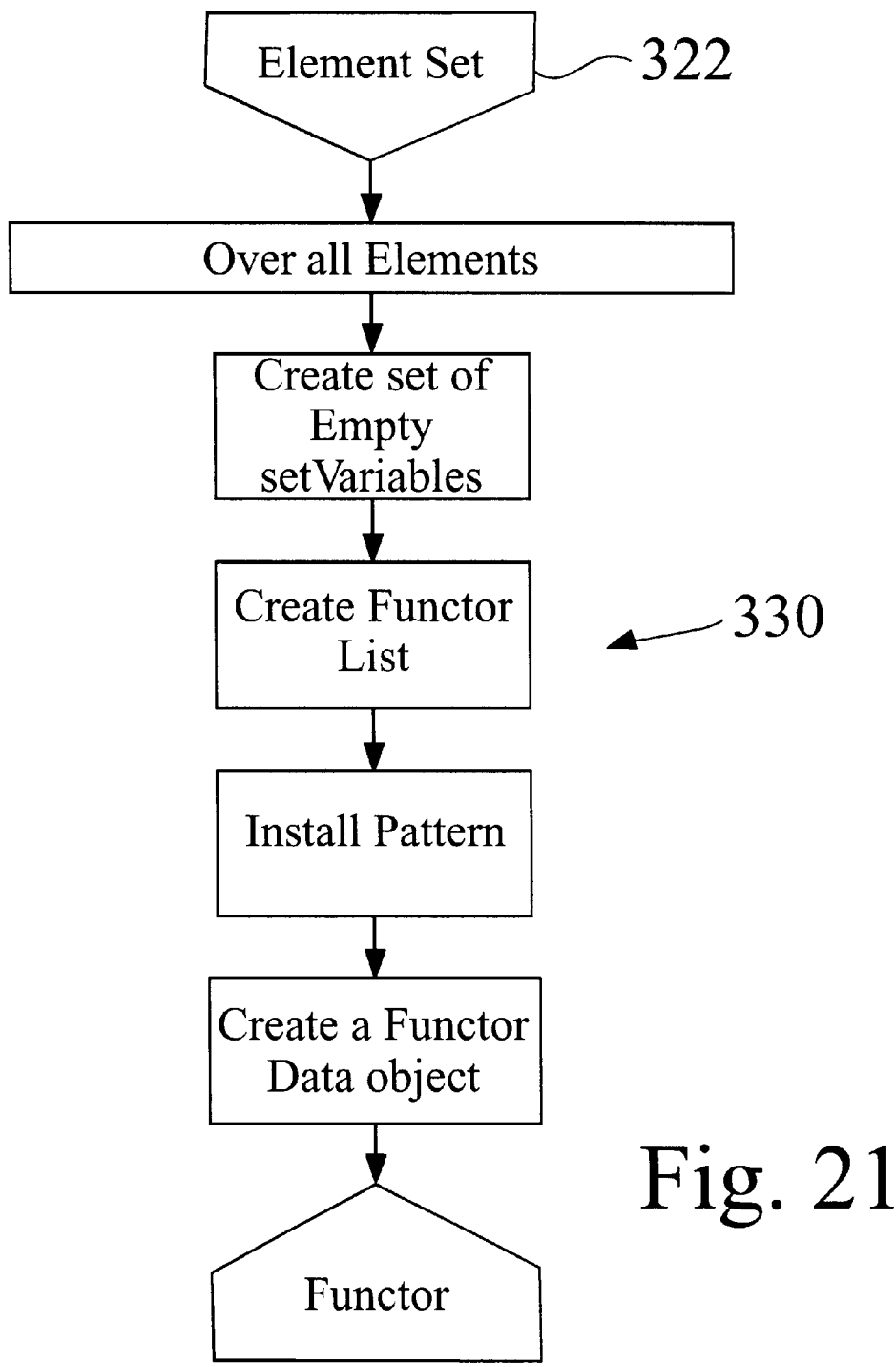

In FIG. 21, more detail of the Set to Functor block 330 is shown. This process is identical to the process used in the Training module 201.

The Generate Response process 312 is further delineated in the flow diagram of FIG. 22. When a Stimulus 16 statement is entered by the user, the Stimulus Concept 338 is added to memory 342. FIG. 23 shows the continuation of flow within the Add Stimulus to Memory process 340. A Concept 360 created from user input 300 is added to the Conceptual Memory 362 data base . A decision is made 364 about the "locality" of the Concept 360 and a Map is created 366.

Referring again to FIG. 22, an interrogative statement requires a response. A declarative statement is information to be learned and stored. Therefore, the Stimulus Concept 338 is examined 342 to determine which case it is. If it is not declarative statement, a Response Method is determined 344. If the Response Method 344 returns a Concept from the data bases 30, 32, the Response is found and can be processed 348.

The Response Method is further described in FIG. 24. A search is undertaken over all of the primary patterns in memory for a Response Set 370, a pattern like that of the Concept Stimulus 338. From the found Response Set 370, the Conceptual data base 30 is searched for a matching Concept. The Concept and Response are retained 376 for further processing 348.

The Found Concept and Response 376 are passed to a Do External Action process 382 as displayed in FIG. 25. Some Responses 376 held in memory may have had an external action attached to them. For example, a robotic application has as a possible Response "the wrench is selected." That Response has an action code associated with it that implements the external action. On successful completion of the action 382, the input Concept 376 is returned and eventually placed 384 on a primary stack 386 and output as speech, text or both. In the case of an unsuccessful action 382, this code returns an appropriate Concept as a Response 376.

The Response 376 may not contain a Concept but only an inference. The Conceptual Database 30 is then searched to see if the instantiated inference is contained there 388. This step is called "Firing an Inference" 388. If an inference did create a Concept 376, the Concept 376 is passed through the Do External Action process 382, described above. If an inference did not create a Concept, one is generated 392 and passed to a "Context Switcher" 394. The original stimulus 300, 302 is also put on the Pending stack 394 to wait for more information.

The Context Switcher 396 flow is depicted in FIG. 26. The program searches the Contextual Data base 32 for a Concept whose context would suggest the Concept 376 in question. If such a Concept is found there, the Conceptual Database 30 is searched 402 to see if the Concept, that is, the instantiated, generated inference has been stored there. If so, that Concept is placed on the primary stack 386, preparatory to processing for output.

Reading Text Documents

Figure 27:
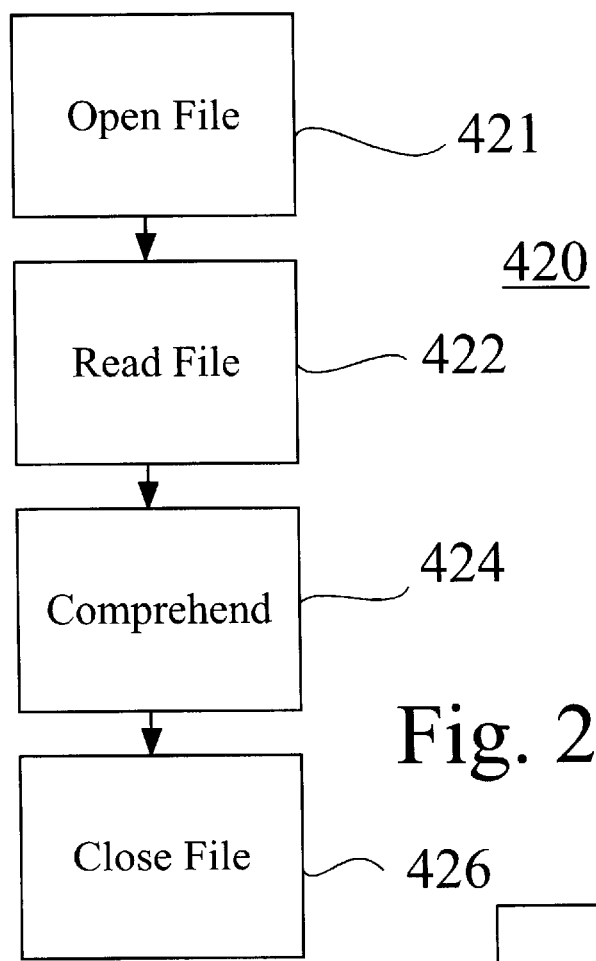

The third module comprising ADAM 200 is Reading Text Documents 203. As seen in FIG. 27, he text file is handled 420 in a conventional way in respect of opening 421, reading 422 and closing 426. In respect of comprehension 424 of the textual input 422, the program proceeds in much the same way as the Training 201 and Interactive Dialog 202 modules.

Figure 28:
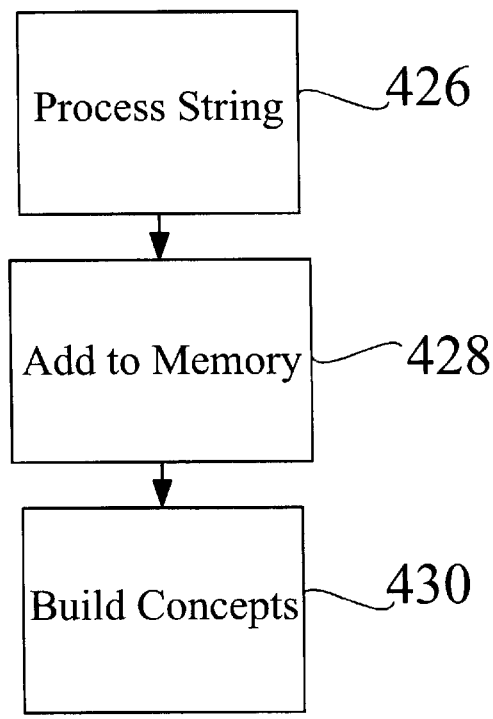
Figure 29:
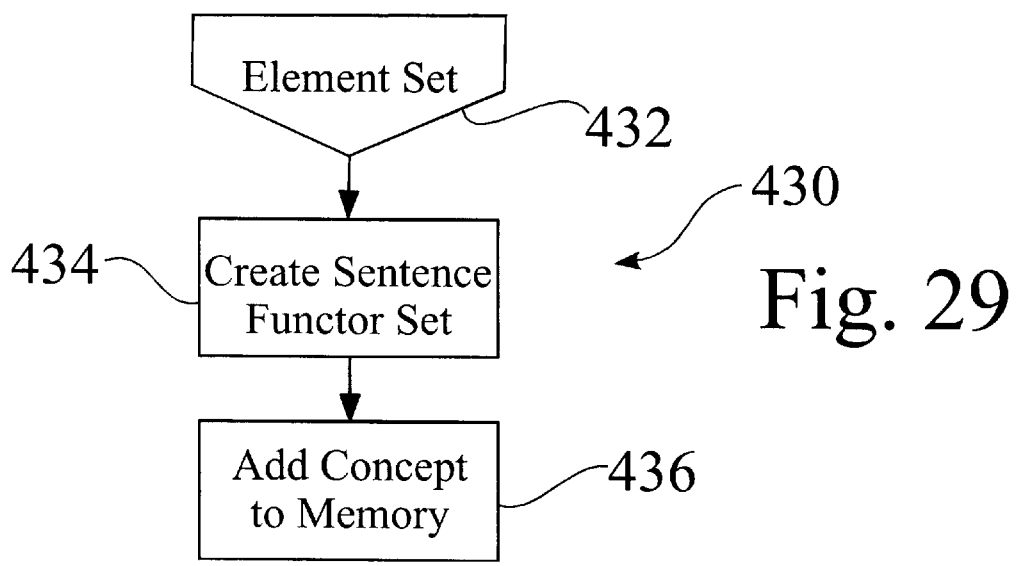

FIG. 28 expands the textual input 422 Comprehend process 424. The input text string 426 is added to memory 428 and concepts are constructed 430 from the statements input. In FIG. 29, the Building of Concepts process flow is shown. A set of Functors is created 430 from the element set 432 contained in the processed text string 426. The prior discussion of FIGS. 18, 19, 20, 21, 14 and 15 support the flow diagrams depicted in FIGS. 30 through 36, respectively. The flow diagrams show the process whereby a Functor is created 438, 450, 452 and a Pattern Match is found 440, 460 and 462.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the Claims that follow. The various hardware and software configurations that have been disclosed above are intended to educate the reader about preferred and alternative embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

FIG. 1

10 Cognitive model of human intelligence
12 Sensory Information input
14 Associative memory
16 Stimulus input
18 Response output

FIG. 2

20 AAS model: Overview of major modules of ADAM
22 Goal processor
24 Stack
26 Output speech synthesizer
28 Speech output
30 Conceptual database
32 Contextual database
34 Pattern buffer
36 Dialog Supervisor
38 Current speech context
40 Speech input
41 Speech recognizer (convert to text)
42 Convert speech to Concept (abstract)
44 Inference generation, disambiguity, mapping and special action
46 Generate Concept
48 Find response pattern
50 Text input stream

FIG. 3

50 Input text stream
51 Flow Diagram, conversion of input text stream to Concepts
52 Convert text stream to sentences
54 Search Eigen Directory
56 Search Pattern Directory
58 Parse sub-patterns
60 Create Functors (lists of functions)
62 Store Concepts and associated Functors in a Conceptual Database

Figure 30:
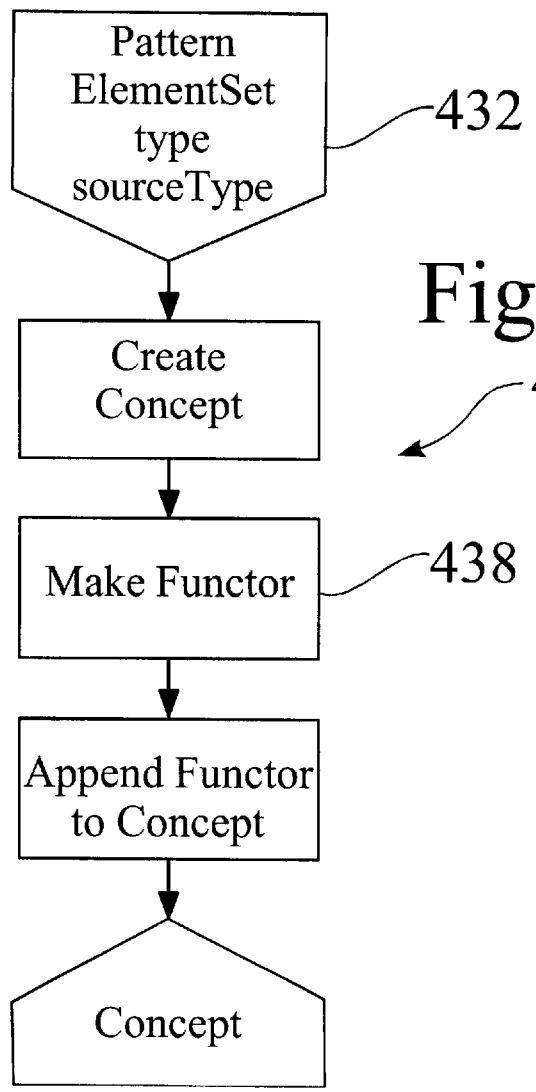
Figure 31:
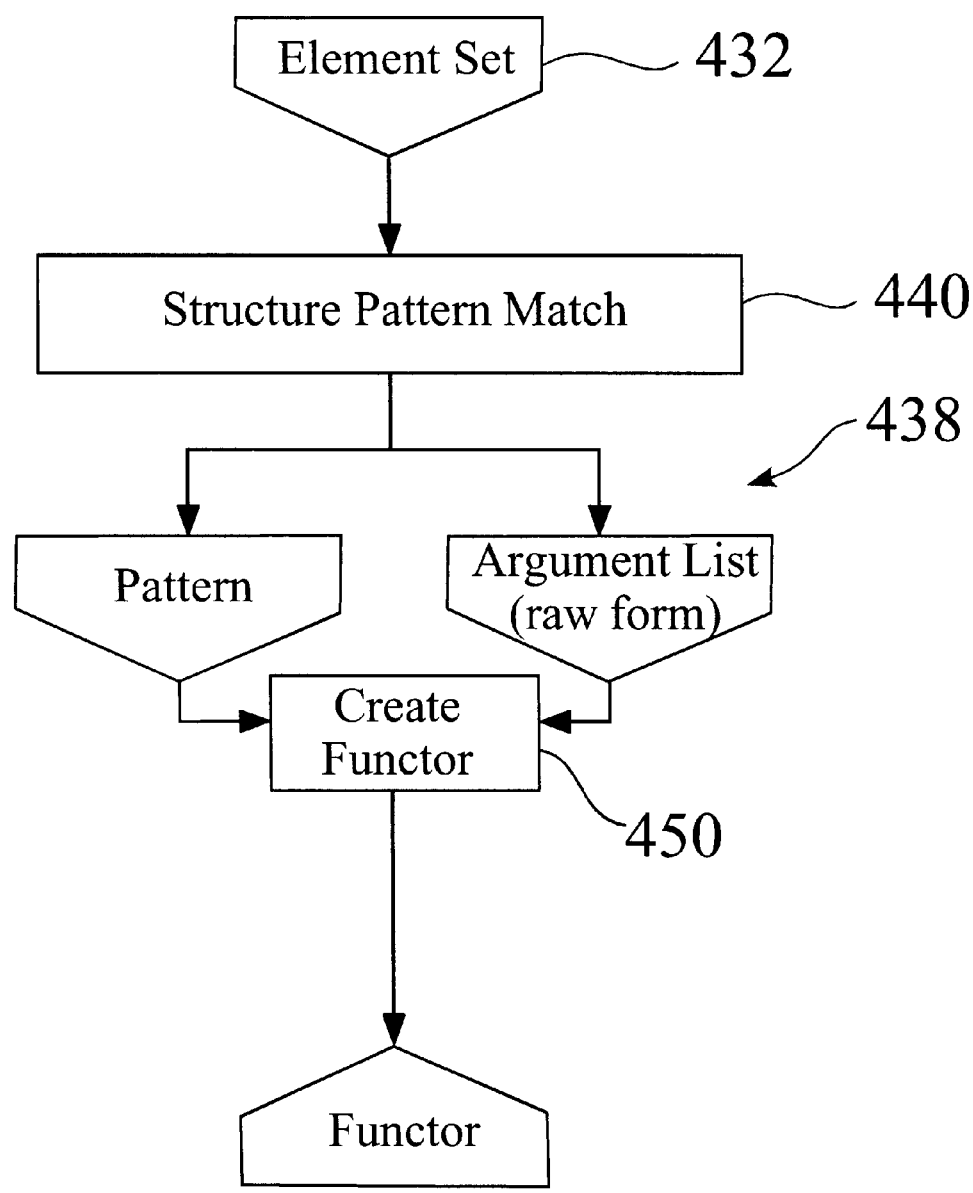
Figure 32:
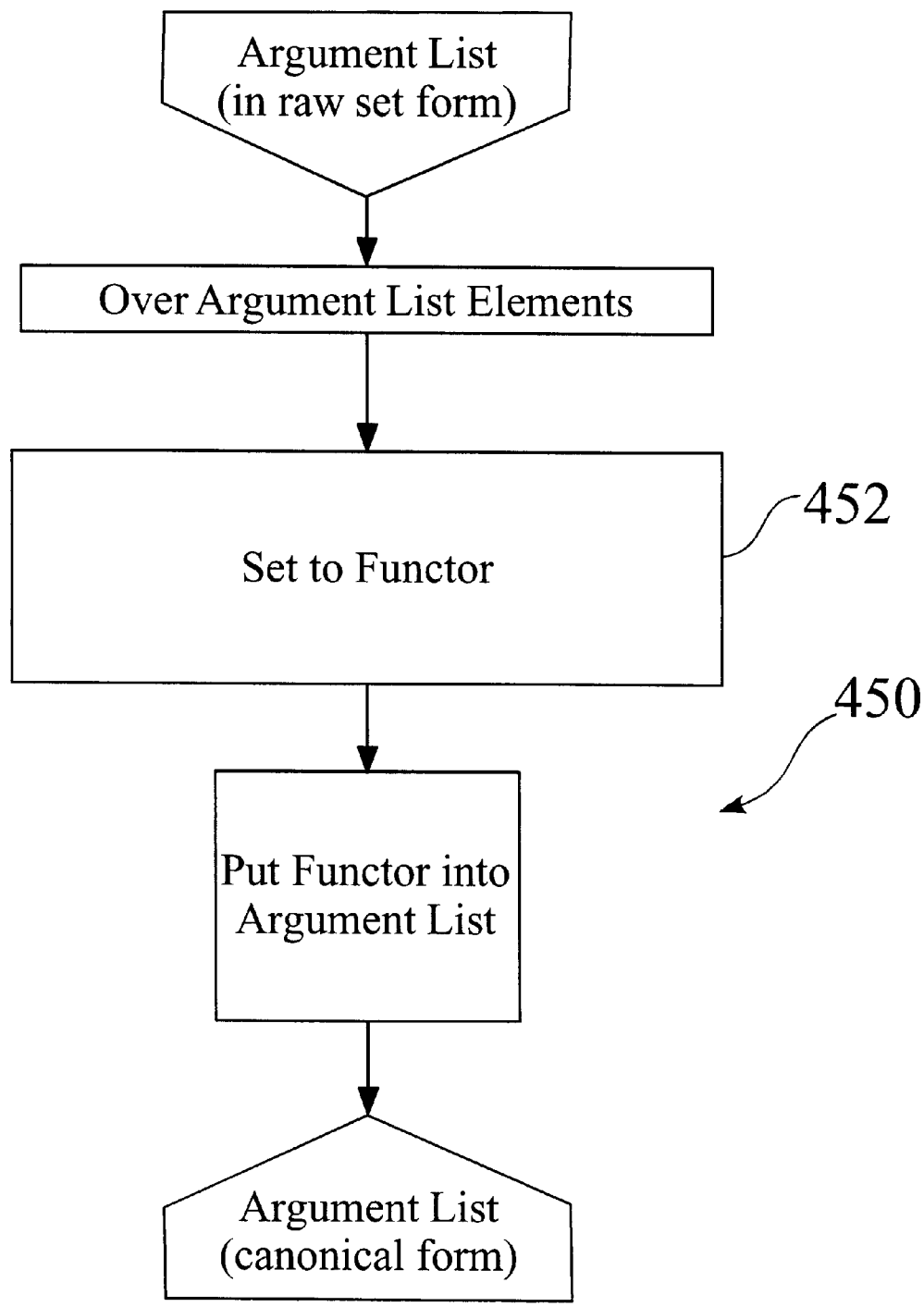
Figure 33:
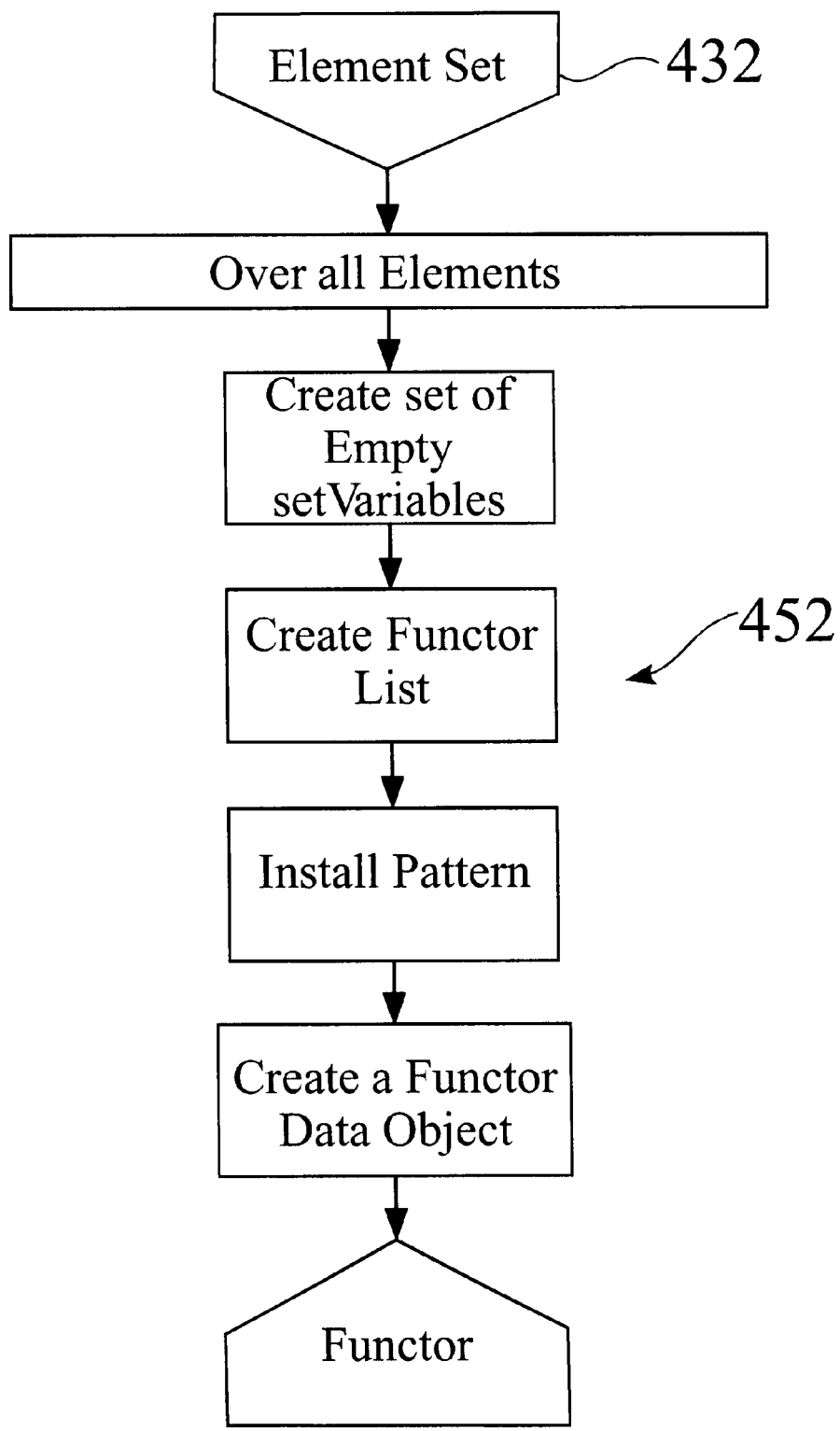
Figure 34:
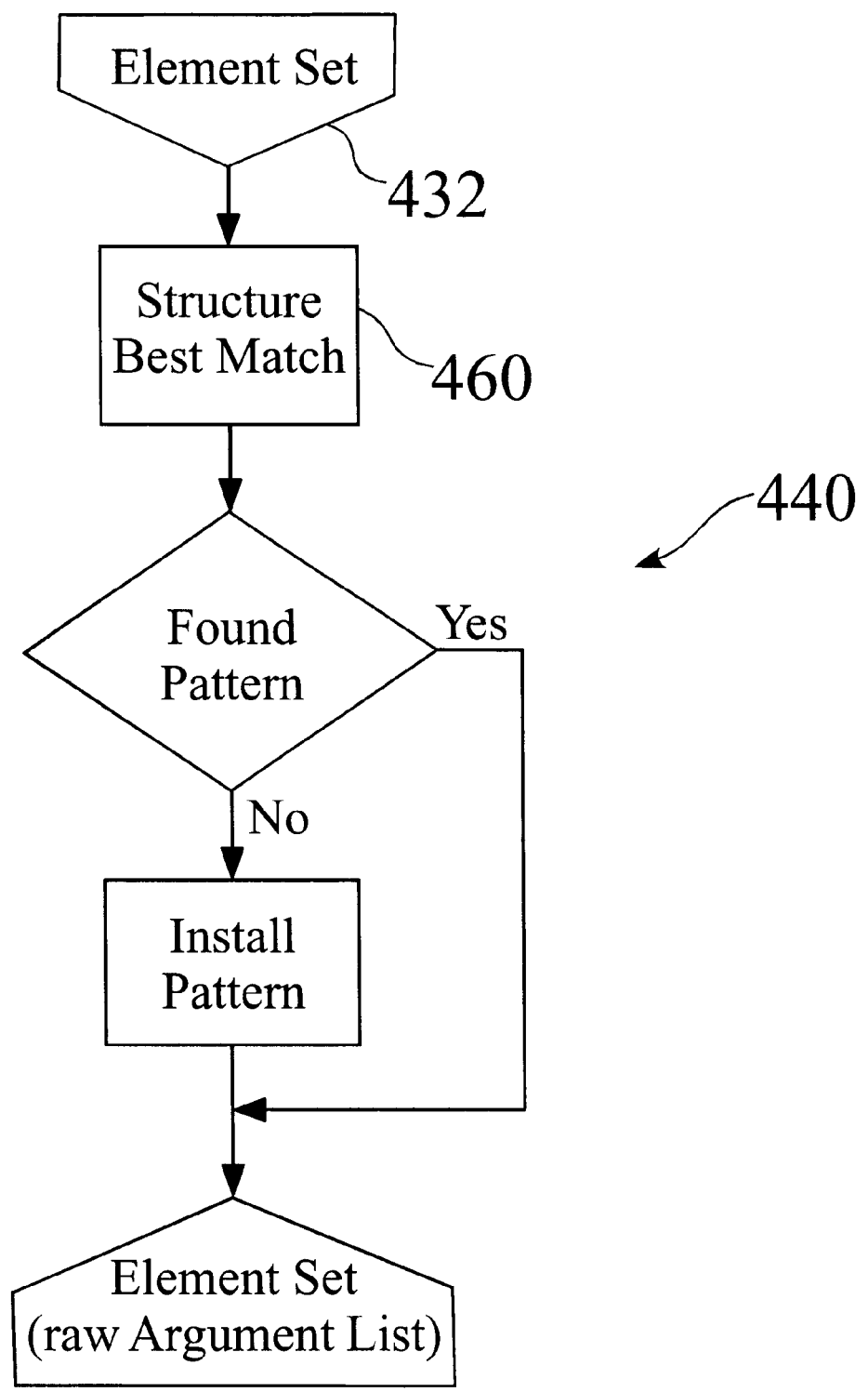
Figure 35:
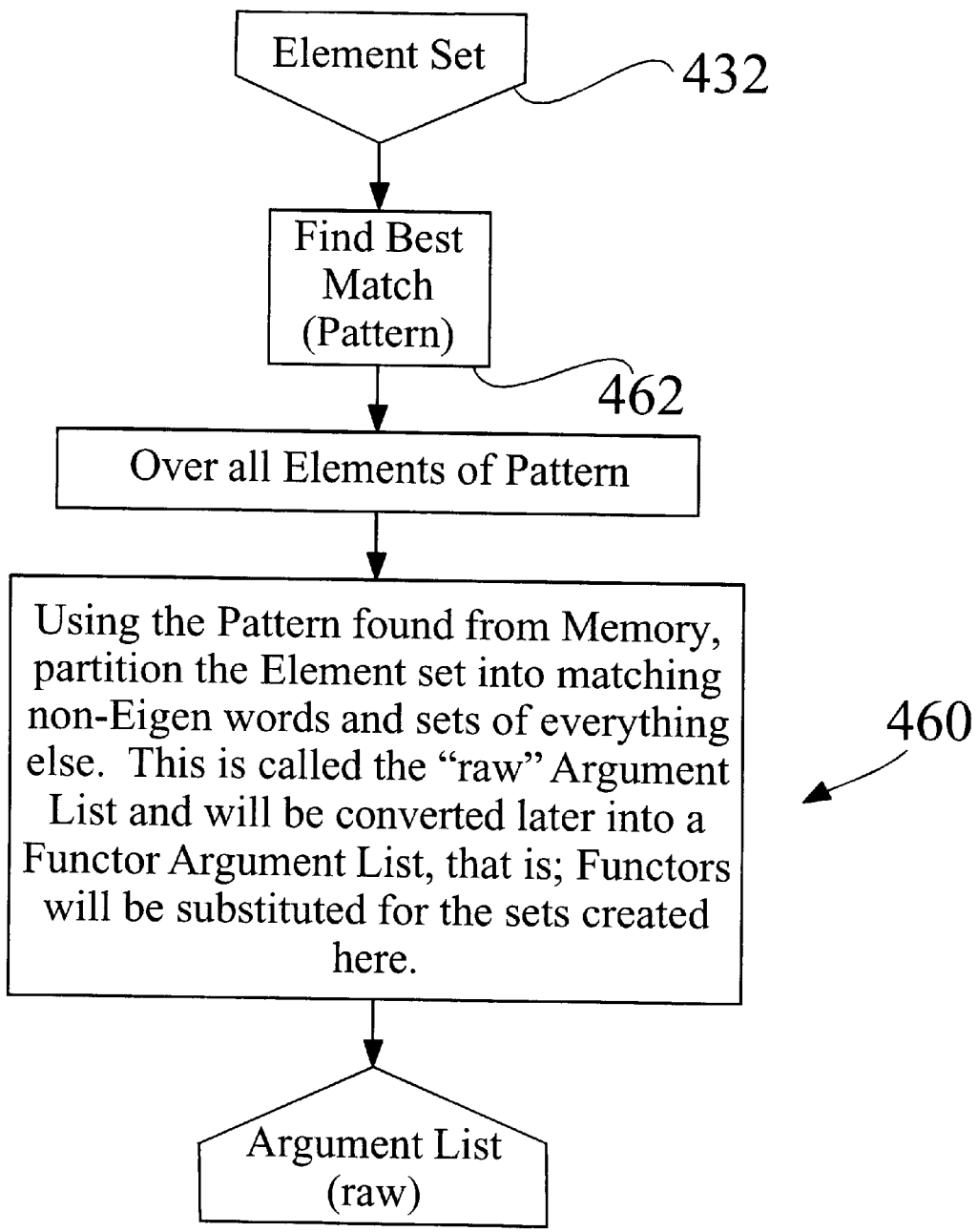
Figure 36:
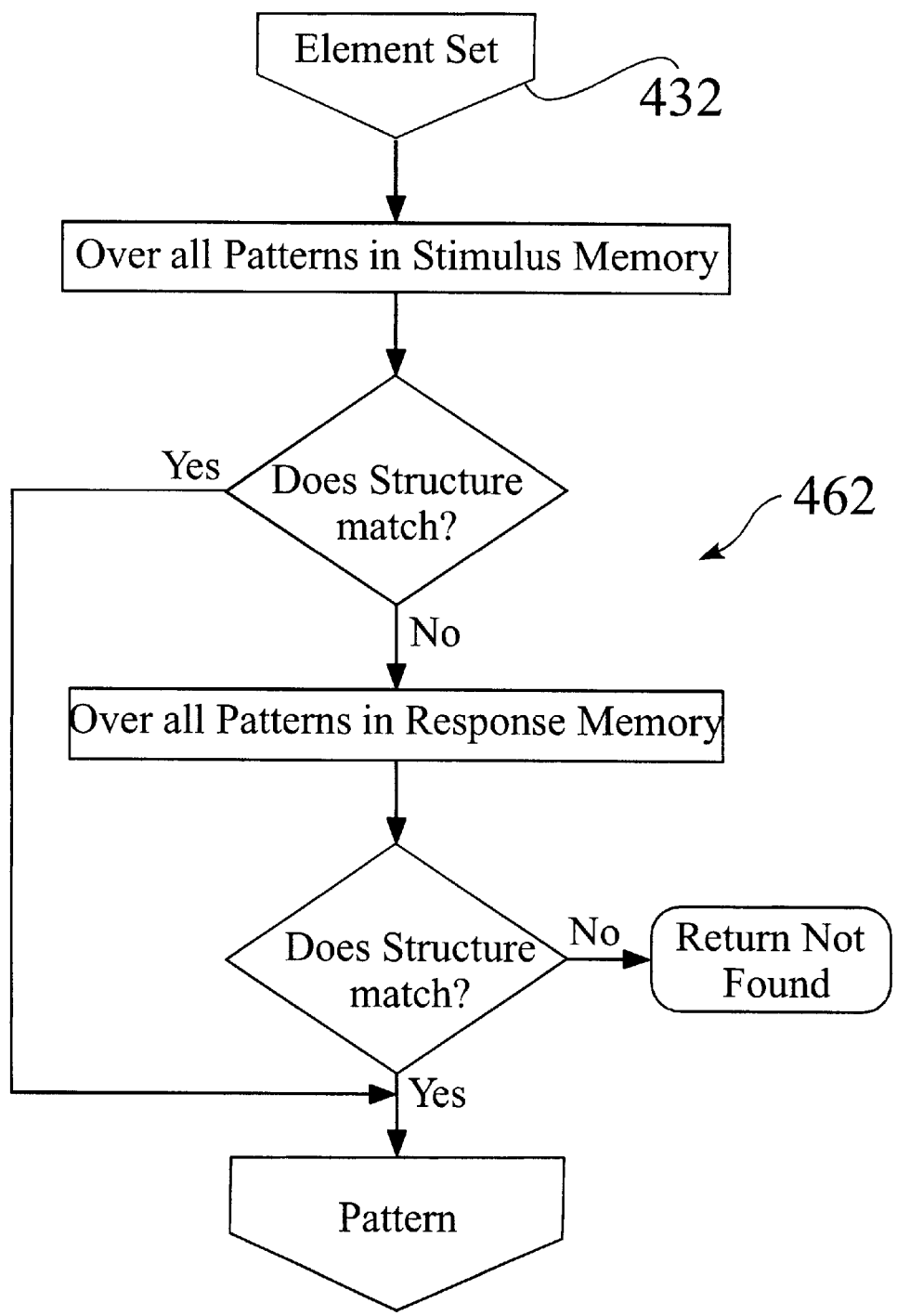

FIG. 3A 30, 32 Conceptual data base, contextual database
34 Pattern buffer
48 Find response patten process
110 Input sentence (from block 52)
112 Output sentence
120 Search for eigens and patterns in input
122 Found Functors (Concept)
124 Abstract Concept and search pattern buffer for matching abstraction
126 Test for complete sentence
128 Search Conceptual database for found matches
130 Create eigen argument list
132 Fill in eigens from stimulus and found Concept
134 Create sentence from eigen argument lists and patterns
$e_n$ Eigen vector
p1 Pattern pointer
w Sentence

FIG. 4

200 Automated Dialog Adaptive Machine (ADAM)
201 Training program module
202 Interactive Dialog program module
203 Read Text Documents program module

FIGS. 4A & 4B

50 Input text stream
30 Conceptual data base
32 Contextual data base
34 Pattern Buffer
200 ADAM
204 Database interface
206 Answers and data forms outputs

FIG. 5

201 Flow diagram of Training module
211 User stimulus input
212 User response input
213 User "if statement" input
214 User "else statement" input
215 List of Actions
216 User selects action associated with response
217 Conditional occurs
218 User input selection of "if" or "else" statements
219 Process & store in working memory
220 Link: Create definition how each of the user inputs link together
222 Action selection process
223 User selection of local/non-local choices
224 Local/non-local selection process
225 List of non-local choices
226 Locality meta maps
227 File of meta maps
230 User input string
240 Pattern Seeker process

FIG. 5A

227 Meta Maps
228 Instance Maps

FIGS. 6 & 7

219 Process and store user input into working memory
230 User input string
231 Match to existing memory
232 Does input match memory, yes/no?
235 Is the difference small, yes/no?
236 Force input to equal closest match
237 Add input to memory

FIGS. 8, 9 & 10

34 Pattern Buffer
240 Pattern Seeker process
242 Working memory
244 Pattern creation process
246 Functor list
248 Pattern construction process
250 Functor construction process

FIGS. 11, 11A & 12

250 Functor construction process
252 Element set from memory
254 Structure Pattern Match process
255 Argument list in raw set form
256 Functor
257 Convert element set to Functor
258 Functor creation
259 Argument list in canonical form

FIG. 13

252 Element set from memory
254 Structure Pattern Match process
260 Structure Best Match process
262 Is a pattern found? yes/no
264 Install Pattern
266 Element set as a raw argument list

FIG. 14

252 Element set from memory
254 Structure Pattern Match process
260 Structure Best Match process
267 Find Best pattern match in memory
268 Partition Element set with found pattern
266 Raw Argument list

FIG. 15

252 Element set from memory
267 Find Best pattern match in memory
269 Found Pattern

FIG. 16

300 Voice input
302 Speech recognizer
304 Process Recognition event

FIG. 18

304 Process Recognition event
306 Language model tree
308 Get top-level language model
310 Create Sentence Functor set
312 Generate Response

FIG. 18

310 Create Sentence Functor set
313 Element set and pattern; type and source
314 Create Concept
316 Make Functor
317 Append Functor to Concept
318 Concept

FIG. 19

313 Element set and pattern; type and source
316 Make Functor
319 Structure Pattern Match
320 Pattern
322 Argument list (raw form)
324 Create Functor
326 Functor

FIG. 20

322 Argument list (raw form)
324 Create Functor
326 Functor-place in argument list
328 Argument list (canonical form)
330 Set to Functor conversion

FIG. 21

322 Element set from memory
330 Set to Functor conversion

FIG. 22

312 Generate Response process
338 Stimulus Concept input
340 Add Stimulus Concept to memory
342 Is the input declarative statement a Concept? Yes/no
344 Response Method process
346 Has the Response Method process returned a Concept? Yes/no
348 Process-Found Response
350 Context Switcher process
352 Has the Context Switcher process returned a Concept? Yes/no
354 Create acknowledgment of NO Concept
356 Primary Stack storage

FIG. 23

340 Add Stimulus Concept to Memory process
360 Concept
362 Add Concept to Conceptual Memory
362 Is this Concept local?
366 Create a Map

FIG. 24

338 Stimulus Concept input
344 Response Method process
370 Find Response set
372 Find Concept
374 Concept found? Yes/no
376 Response Concept

FIG. 25

348 Process-Found Response
376 Response Concept
380 Is there a Concept in the Response? Yes/no
382 Do External Action
384 Add Concept
386 Primary Stack storage
388 "Fire" inference
390 Did the inference create a Concept? Yes/no
392 Generate inference Stimulus 394 Pending stack storage
396 Context Switcher

FIG. 26

396 Context Switcher
400 Search all Contexts in Context data base
401 Is there a Concept which will trigger the instant Concept? Yes/no
402 Search all auto Concepts in Concept database
404 Has the found auto Concept been "Fired?" Yes/no
406 Auto Concept found

FIG. 27

420 Text file input handling
422 Read file
424 Comprehend file
426 Close file

FIG. 28

424 Comprehend file
426 Process input text string
428 Add text string to memory
430 Build Concepts from text string

FIG. 29

430 Build Concepts from text string
432 Element set from memory
434 Create sentence Functor set
436 Add Concept to Memory

FIG. 30

430 Build Concepts from text string
438 Make Functor

FIG. 31

432 Element Set from Memory
438 Make Functor
440 Structure Pattern Match
450 Create Functor

FIG. 32

450 Create Functor
452 Convert Element Set to Functor

FIG. 33

432 Element Set from Memory
452 Convert Element Set to Functor

FIG. 34

432 Element Set from Memory
440 Structure Pattern Match process
460 Structure Best Match

FIG. 35

432 Element Set from Memory
460 Structure Best Match
462 Find Best Match for Element Set pattern

FIG. 36

432 Element Set from Memory
462 Find Best Match for Element Set pattern

What is claimed is:

1. An apparatus comprising:
   a processing means (20) for simulating human capability to understand and to converse; said processing means (20) including automated, interactive dialog and adaptive functions;
   said processing means (20) using as an input a stream of natural language (40); said processing means (20) having a cognitive model (10) of human intelligence; said cognitive model (10) of human intelligence including pattern recognition, association and sensory memory capabilities; and
   said processing means (20) simulating a plurality of human intelligence characteristics in order to perform useful tasks.

2. The apparatus as claimed in claim 1 in which said processing means (20) includes:
   a conversion means (41) for converting a stream of said natural language (40) in electronic format (50) into sentences (w);
   said sentences (w) containing declarative information (12), and a stimulus (16); said stimulus (16) being a said sentence (w) which is a response and a said sentence (w) which requests a response (18);
   associative memory means (14) for storing said natural language (50); said associative memory means (14) storing said electronic format (50) as an abstract Concept (42); said abstract Concept (42) including a pattern (p) of said natural language (40);
   said associative memory means (14) being searched for a same said pattern (p) of said natural language (40); said same pattern (p) being previously stored as a pattern of response (p) to a prior stimulus (16);
   said Concept (42) being abstracted from said associative memory (14) when said pattern (p) matches a pattern of response (p) to said prior stimulus (16);
   a matching knowledge content (30, 32) from said associative memory (14) being attached to said pattern of response (p); and
   said pattern (p) and said knowledge content (30, 32) being converted to an electronic equivalent (28) which can be visually displayed, aurally displayed and printed.

3. The apparatus as claimed in claim 2 in which said associative memory means (14) includes a conceptual database (30), a contextual database (32) and a pattern buffer (34).

4. The apparatus as claimed in claim 3 in which said sentences (w) containing declarative information (12), and said sentences (w) containing said stimulus (16) are processed and stored (219) in a working memory (242), converted to a said pattern (p) and appended to said pattern buffer (34) for long-term storage.

5. The apparatus as claimed in claim 2 in which said abstract Concept (42) is created by de-constructing a sentence (120) into a pattern (p) and eigen words; said eigen word being a word that can be replaced in a same sentence without changing the conceptual basis of said sentence.

6. The apparatus as claimed in claim 2 in which said knowledge content (30, 32) is derived from structured, interactive training (201); said structured, interactive training (201) including inputting sentence (w) pairs which are analyzed by said cognitive model (10) to produce abstract information.

7. The apparatus as claimed in claim 2 in which said cognitive model (10) of human intelligence includes an ability to transform said sentence (w) into a pattern (p) represented by substantive examples.

8. The apparatus as claimed in claim 2 in which said Concept (42) is represented mathematically by a set of Functors (122); said Functor (122) being a construct having two components, namely a pattern (p) and an argument list ($e_n$, $e_m$ . . . ); said argument list ($e_n$, $e_m$ . . . ) including sets of all words in said associative memory means (14) associated with said pattern (14).

9. The apparatus as claimed in claim 1 in which said stream of natural language (40) is speech (40).

10. The apparatus as claimed in claim 1 in which said stream of natural language (40) emanates from a text document (203).

11. The apparatus as claimed in claim 1 in which said stream of said natural language (40) is independent of characteristics common to a particular nation, tribe and other speech community.

12. A method of simulating human intelligence comprising the steps of:

providing a processing means (20) for simulating human capability to understand and to converse with a cognitive model of human intelligence including automated, interactive dialog and adaptive functions;

providing pattern recognition and sensory memory association capabilities in said cognitive model of human intelligence;

using natural language (50) as an input (40) to said processing means (20); and simulating a plurality of human intelligence characteristics with said processing means (20) to perform useful tasks.

13. The method as claimed in claim 12 in which the step of simulating human intelligence with a processing means (20) includes the steps of:

converting a stream of said natural language (40) into sentences (w) in an electronic format (50) with a conversion means (41);

said sentences (w) containing declarative information (12), and a stimulus (16); said stimulus (16) being a said sentence (w) which is a response and a said sentence (w) which requests a response (18);

storing said sentences (w) in electronic format (50) as an abstract Concept (42) in an associative memory means (14);

including a pattern (p) of said natural language (40) in said abstract Concept (42);

storing a pattern (p) of said natural language (40) as a pattern (p) in response to a stimulus (16);

storing a knowledge content (30, 32) associated with said pattern (p) in said associative memory means;

searching said associative memory means (14) for a same said pattern (p) previously stored as a pattern (p) in response to an earlier applied stimulus (16);

abstracting said Concept (42) from said associative memory (14) when said pattern (p) matches said pattern (p) in response to said earlier applied stimulus (16);

attaching said matching knowledge content (30, 32) from said associative memory (14) to said pattern (p); and converting said pattern (p) and said knowledge content (30, 32) to an electronic equivalent (28) which can be visually displayed, aurally displayed and printed.

14. The method as claimed in claim 13 in which the step of converting a stream of said natural language (40) into sentences (w) in an electronic format (50) with a conversion means (41) includes converting a stream of speech (40).

15. The method as claimed in claim 13 in which the step of converting a stream of said natural language (40) into sentences (w) in an electronic format (50) with a conversion means (41) includes converting text emanating from a document (203).

16. The method as claimed in claim 13 in which the step of searching said associative memory means (14) for a same said pattern (p) of said natural language (40) includes the steps of searching a conceptual database (30), searching a contextual database (32) and searching a pattern buffer (34).

17. The method as claimed in claim 13 in which the step of abstracting said Concept (42) from said associative memory (14) when said pattern (p) matches a pattern of response (p) to said prior stimulus (16), includes the step of:

creating said abstract Concept (42) by de-constructing a sentence (120) into a pattern (p) and eigen words; said eigen word being a word that can be replaced in a same sentence without changing the conceptual basis of said sentence.

18. The apparatus as claimed in claim 13 in which the step of storing a knowledge content (30, 32) associated with said pattern (p) in said associative memory means includes the steps of:

deriving said knowledge content (30, 32) from structured, interactive training (201); and inputting sentence (w) pairs in said structured, interactive training (201), which are analyzed by said cognitive model (10) to produce abstract information.

19. The method as claimed in claim 13 in which the step of converting a stream of said natural language (40) into sentences (w) in an electronic format (50) with a conversion means (41) includes the step of:

converting said stream of said natural language (40) sentences (w) being independent of characteristics common to a particular nation, tribe and other speech community.

20. A method of simulating human intelligence comprising the steps of:

storing patterns of language (40) and specific knowledge electronically in an associative memory (14) database (30, 32, 34) and creating therein patterns (p) of natural language (40) having specific knowledge content;

comparing a new pattern (p) of natural language to (40) said patterns of language electronically in said associative memory (14) database (30, 32, 34);

selecting a previously stored, same said pattern (p) of language from said data base (30, 32, 34);

extracting electronically a set of words associated with said pattern (p) and said specific knowledge content from said data base (30, 32, 34); and converting said set of words into human comprehensible form.

* * * * *